United States Patent
Rubanovich et al.

(10) Patent No.: US 10,157,059 B2
(45) Date of Patent: Dec. 18, 2018

(54) INSTRUCTION AND LOGIC FOR EARLY UNDERFLOW DETECTION AND ROUNDER BYPASS

(71) Applicant: Intel Corporation, Santa Clara, CA (US)

(72) Inventors: Simon Rubanovich, Haifa (IL); Thierry Pons, Hadera (IL); Zeev Sperber, Zichron Yackov (IL); Amit Gradstein, Binyamina (IL)

(73) Assignee: Intel Corporation, Santa Clara, CA (US)

( * ) Notice: Subject to any disclaimer, the term of this patent is extended or adjusted under 35 U.S.C. 154(b) by 56 days.

(21) Appl. No.: 15/280,324

(22) Filed: Sep. 29, 2016

(65) Prior Publication Data

US 2018/0088940 A1    Mar. 29, 2018

(51) Int. Cl.
G06F 7/499 (2006.01)
G06F 9/30 (2018.01)
G06F 7/00 (2006.01)

(52) U.S. Cl.
CPC ............ *G06F 9/30014* (2013.01); *G06F 7/00* (2013.01)

(58) Field of Classification Search
None
See application file for complete search history.

(56) References Cited

U.S. PATENT DOCUMENTS

| | | | | |
|---|---|---|---|---|
| 6,631,392 B1 * | 10/2003 | Jiang | ..................... | G06F 7/4991 708/498 |
| 8,106,914 B2 * | 1/2012 | Oberman | ............ | G06F 9/30014 345/503 |
| 9,348,557 B1 * | 5/2016 | Langhammer | .......... | G06F 7/483 |
| 2009/0150654 A1 * | 6/2009 | Oberman | ............ | G06F 9/30014 712/221 |

OTHER PUBLICATIONS

Intel Corporation, "IA-32 Intel® Architecture Software Developer's Manual—vol. 2: Instruction Set Reference", 978 pages, 2003.
Zuras, Dan, et al. "IEEE Standard for Floating-Point Arithmetic." IEEE Std 754™—2008, 70 pages, 2008.

* cited by examiner

*Primary Examiner* — David H Malzahn
(74) *Attorney, Agent, or Firm* — Alliance IP, LLC

(57) ABSTRACT

A processor for floating point underflow detection includes circuitry to decode a first instruction and a floating point unit. The decoded instruction, when executed by the processor, may be for performing a fused multiply-add (FMA) operation. The floating point unit includes circuitry to determine a non-normalized result of the first instruction based on a first input, a second input, and a third input. The floating point unit further includes circuitry to determine whether underflow exists in the non-normalized result based on a first exponent of the first input, a second exponent of the second input, and a third exponent of the third input.

17 Claims, 27 Drawing Sheets

| 127 | 112 111 | 96 95 | 80 79 | 64 63 | 48 47 | 32 31 | 16 15 | 0 |
|---|---|---|---|---|---|---|---|---|
| HALF 7 | HALF 6 | HALF 5 | HALF 4 | HALF 3 | HALF 2 | HALF 1 | HALF 0 | |

PACKED HALF
341

| 127 | 96 95 | 64 63 | 32 31 | 0 |
|---|---|---|---|---|
| SINGLE 3 | SINGLE 2 | SINGLE 1 | SINGLE 0 | |

PACKED SINGLE
342

| 127 | 64 63 | 0 |
|---|---|---|
| DOUBLE 1 | DOUBLE 0 | |

PACKED DOUBLE
343

FIG. 3B

```
 127    120 119   112 111   104 103              24 23    16 15    8 7     0
| bbbb bbbb | bbbb bbbb | bbbb bbbb |  •  •  •  | bbbb bbbb | bbbb bbbb | bbbb bbbb |
```
UNSIGNED PACKED BYTE REPRESENTATION 344

```
 127    120 119   112 111   104 103              24 23    16 15    8 7     0
| sbbb bbbb | sbbb bbbb | sbbb bbbb |  •  •  •  | sbbb bbbb | sbbb bbbb | sbbb bbbb |
```
SIGNED PACKED BYTE REPRESENTATION 345

```
 127              112 111                                    16 15         0
| wwww wwww wwww wwww |          •  •  •          | wwww wwww wwww wwww |
```
UNSIGNED PACKED WORD REPRESENTATION 346

```
 127              112 111                                    16 15         0
| swww wwww wwww wwww |          •  •  •          | swww wwww wwww wwww |
```
SIGNED PACKED WORD REPRESENTATION 347

```
 127                              92 91   32 31                            0
| dddd dddd dddd dddd dddd dddd dddd dddd | • • • | dddd dddd dddd dddd dddd dddd dddd dddd |
```
UNSIGNED PACKED DOUBLEWORD REPRESENTATION 348

```
 127                              92 91   32 31                            0
| sddd dddd dddd dddd dddd dddd dddd dddd | • • • | sddd dddd dddd dddd dddd dddd dddd dddd |
```
SIGNED PACKED DOUBLEWORD REPRESENTATION 349

INSTRUCTION AND LOGIC FOR EARLY UNDERFLOW DETECTION AND ROUNDER BYPASS

FIELD OF THE INVENTION

The present disclosure pertains to the field of processing logic, microprocessors, and associated instruction set architecture that, when executed by the processor or other processing logic, perform logical, mathematical, or other functional operations.

DESCRIPTION OF RELATED ART

Multiprocessor systems are becoming more and more common. Applications of multiprocessor systems include dynamic domain partitioning all the way down to desktop computing. In order to take advantage of multiprocessor systems, code to be executed may be separated into multiple threads for execution by various processing entities. Each thread may be executed in parallel with one another. Instructions as they are received on a processor may be decoded into terms or instruction words that are native, or more native, for execution on the processor. Floating point numbers may be added, subtracted, or multiplied. Such floating point operations may be used in mathematical simulations. Processors may be implemented in a system on a chip.

DESCRIPTION OF THE FIGURES

Embodiments are illustrated by way of example and not limitation in the Figures of the accompanying drawings:

FIG. 3B illustrates possible in-register data storage formats, in accordance with embodiments of the present disclosure;

FIG. 3C illustrates various signed and unsigned packed data type representations in multimedia registers, in accordance with embodiments of the present disclosure;

FIG. 3D illustrates an embodiment of an operation encoding format;

FIG. 3E illustrates another possible operation encoding format having forty or more bits, in accordance with embodiments of the present disclosure;

FIG. 3F illustrates yet another possible operation encoding format, in accordance with embodiments of the present disclosure;

DETAILED DESCRIPTION

Figure 1A:
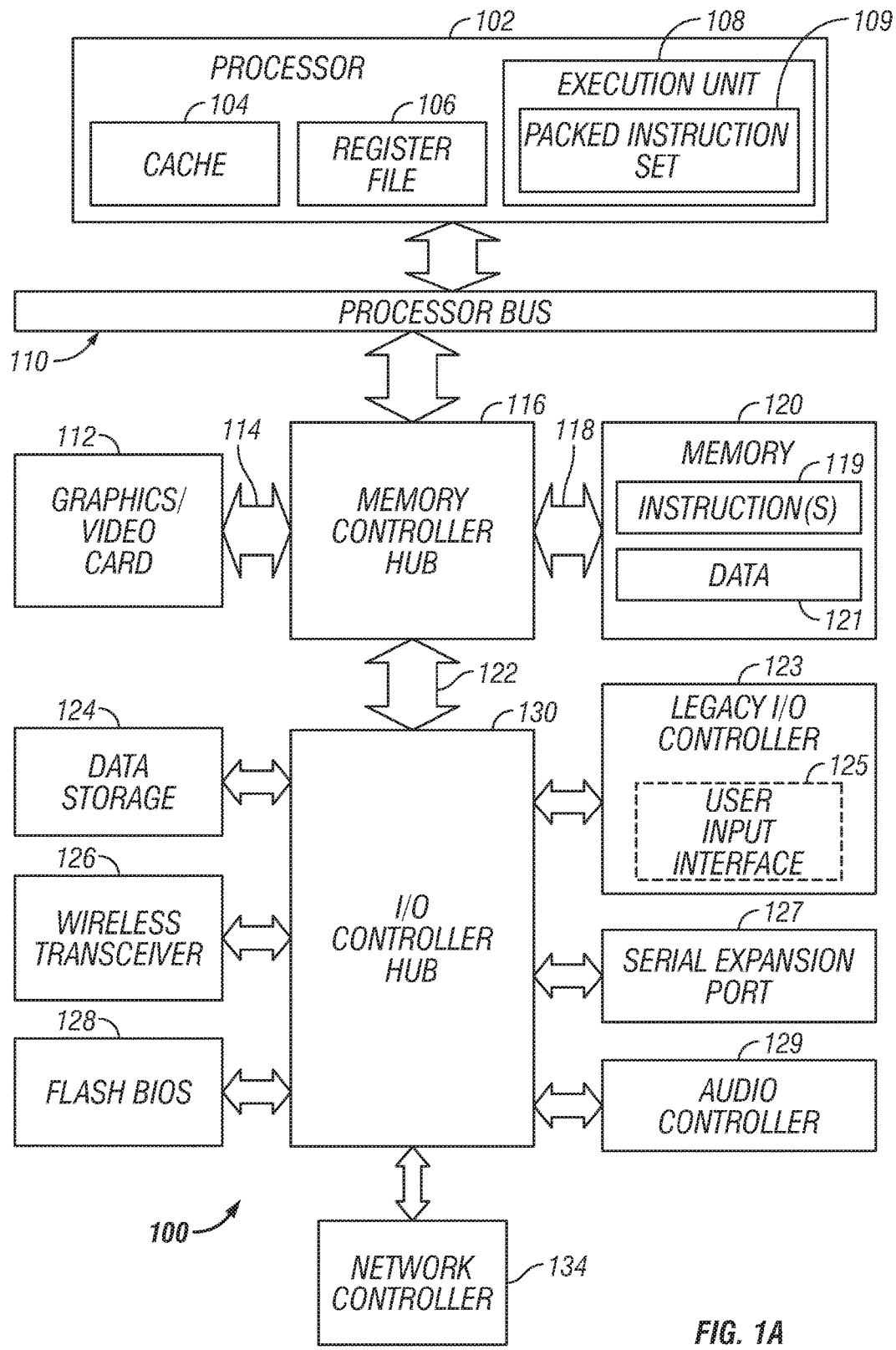
FIG. 1A is a block diagram of an exemplary computer system formed with a processor that may include execution units to execute an instruction, in accordance with embodiments of the present disclosure.

The following description describes an instruction and processing logic for early underflow detection and rounder bypass. The instruction and processing logic may be implemented on an out-of-order processor. In the following description, numerous specific details such as processing logic, processor types, micro-architectural conditions, events, enablement mechanisms, and the like are set forth in order to provide a more thorough understanding of embodiments of the present disclosure. It will be appreciated, however, by one skilled in the art that the embodiments may be practiced without such specific details. Additionally, some well-known structures, circuits, and the like have not been shown in detail to avoid unnecessarily obscuring embodiments of the present disclosure.

Although the following embodiments are described with reference to a processor, other embodiments are applicable to other types of integrated circuits and logic devices. Similar techniques and teachings of embodiments of the present disclosure may be applied to other types of circuits or semiconductor devices that may benefit from higher pipeline throughput and improved performance. The teachings of embodiments of the present disclosure are applicable to any processor or machine that stores data to memory. However, the embodiments are not limited to processors or machines that perform 512-bit, 256-bit, 128-bit, 64-bit, 32-bit, or 16-bit data operations and may be applied to any processor and machine in which manipulation or management of data may be performed. In addition, the following description provides examples, and the accompanying drawings show various examples for the purposes of illustration. However, these examples should not be construed in a limiting sense as they are merely intended to provide examples of embodiments of the present disclosure rather than to provide an exhaustive list of all possible implementations of embodiments of the present disclosure.

Although the below examples describe instruction handling and distribution in the context of execution units and logic circuits, other embodiments of the present disclosure may be accomplished by way of a data or instructions stored on a machine-readable, tangible medium, which when performed by a machine cause the machine to perform functions consistent with at least one embodiment of the disclosure. In one embodiment, functions associated with embodiments of the present disclosure are embodied in machine-executable instructions. The instructions may be used to cause a general-purpose or special-purpose processor that may be programmed with the instructions to perform the steps of the present disclosure. Embodiments of the present disclosure may be provided as a computer program product or software which may include a machine or computer-readable medium having stored thereon instructions which may be used to program a computer (or other electronic devices) to perform one or more operations according to embodiments of the present disclosure. Furthermore, steps of embodiments of the present disclosure might be performed by specific hardware components that contain fixed-function logic for performing the steps, or by any combination of programmed computer components and fixed-function hardware components. Throughout this disclosure, unless explicitly stated otherwise, a compound form of a reference numeral refers to the element generically or collectively. Thus, for example, widget 101A or 101-1 refers to an instance of a widget class, which may be referred to collectively as widgets 101 and any one of which may be referred to generically as widget 101.

Instructions used to program circuitry to perform embodiments of the present disclosure may be stored within a memory in the system, such as DRAM, cache, flash memory, or other storage. Furthermore, the instructions may be distributed via a network or by way of other computer-readable media. Thus a machine-readable medium may include any mechanism for storing or transmitting information in a form readable by a machine (e.g., a computer), but is not limited to, floppy diskettes, optical disks, Compact Disc, Read-Only Memory (CD-ROMs), and magneto-optical disks, Read-Only Memory (ROMs), Random Access Memory (RAM), Erasable Programmable Read-Only Memory (EPROM), Electrically Erasable Programmable Read-Only Memory (EEPROM), magnetic or optical cards, flash memory, or a tangible, machine-readable storage used in the transmission of information over the Internet via electrical, optical, acoustical or other forms of propagated signals (e.g., carrier waves, infrared signals, digital signals, etc.). Accordingly, the computer-readable medium may include any type of tangible machine-readable medium suitable for storing or transmitting electronic instructions or information in a form readable by a machine (e.g., a computer).

A design may go through various stages, from creation to simulation to fabrication. Data representing a design may represent the design in a number of manners. First, as may be useful in simulations, the hardware may be represented using a hardware description language or another functional description language. Additionally, a circuit level model with logic and/or transistor gates may be produced at some stages of the design process. Furthermore, designs, at some stage, may reach a level of data representing the physical placement of various devices in the hardware model. In cases wherein some semiconductor fabrication techniques are used, the data representing the hardware model may be the data specifying the presence or absence of various features on different mask layers for masks used to produce the integrated circuit. In any representation of the design, the data may be stored in any form of a machine-readable medium. A memory or a magnetic or optical storage such as a disc may be the machine-readable medium to store information transmitted via optical or electrical wave modulated or otherwise generated to transmit such information. When an electrical carrier wave indicating or carrying the code or design is transmitted, to the extent that copying, buffering, or retransmission of the electrical signal is performed, a new copy may be made. Thus, a communication provider or a network provider may store on a tangible, machine-readable medium, at least temporarily, an article, such as information encoded into a carrier wave, embodying techniques of embodiments of the present disclosure.

In modern processors, a number of different execution units may be used to process and execute a variety of code and instructions. Some instructions may be quicker to complete while others may take a number of clock cycles to complete. The faster the throughput of instructions, the better the overall performance of the processor. Thus it would be advantageous to have as many instructions execute as fast as possible. However, there may be certain instructions that have greater complexity and require more in terms of execution time and processor resources, such as floating point instructions, load/store operations, data moves, etc.

As more computer systems are used in internet, text, and multimedia applications, additional processor support has been introduced over time. In one embodiment, an instruction set may be associated with one or more computer architectures, including data types, instructions, register architecture, addressing modes, memory architecture, interrupt and exception handling, and external input and output (I/O).

In one embodiment, the instruction set architecture (ISA) may be implemented by one or more micro-architectures, which may include processor logic and circuits used to implement one or more instruction sets. Accordingly, processors with different micro-architectures may share at least a portion of a common instruction set. For example, Intel® Pentium 4 processors, Intel® Core™ processors, and processors from Advanced Micro Devices, Inc. of Sunnyvale Calif. implement nearly identical versions of the x86 instruction set (with some extensions that have been added with newer versions), but have different internal designs. Similarly, processors designed by other processor development companies, such as ARM Holdings, Ltd., MIPS, or their licensees or adopters, may share at least a portion a common instruction set, but may include different processor designs. For example, the same register architecture of the ISA may be implemented in different ways in different micro-architectures using new or well-known techniques, including dedicated physical registers, one or more dynamically allocated physical registers using a register renaming mechanism (e.g., the use of a Register Alias Table (RAT), a Reorder Buffer (ROB) and a retirement register file. In one embodiment, registers may include one or more registers, register architectures, register files, or other register sets that may or may not be addressable by a software programmer.

An instruction may include one or more instruction formats. In one embodiment, an instruction format may indicate various fields (number of bits, location of bits, etc.) to specify, among other things, the operation to be performed and the operands on which that operation will be performed. In a further embodiment, some instruction formats may be further defined by instruction templates (or sub-formats). For example, the instruction templates of a given instruction format may be defined to have different subsets of the instruction format's fields and/or defined to have a given field interpreted differently. In one embodiment, an instruction may be expressed using an instruction format (and, if defined, in a given one of the instruction templates of that instruction format) and specifies or indicates the operation and the operands upon which the operation will operate.

Scientific, financial, auto-vectorized general purpose, RMS (recognition, mining, and synthesis), and visual and multimedia applications (e.g., 2D/3D graphics, image processing, video compression/decompression, voice recognition algorithms and audio manipulation) may require the same operation to be performed on a large number of data items. In one embodiment, Single Instruction Multiple Data (SIMD) refers to a type of instruction that causes a processor to perform an operation on multiple data elements. SIMD technology may be used in processors that may logically divide the bits in a register into a number of fixed-sized or variable-sized data elements, each of which represents a separate value. For example, in one embodiment, the bits in a 64-bit register may be organized as a source operand containing four separate 16-bit data elements, each of which represents a separate 16-bit value. This type of data may be referred to as 'packed' data type or 'vector' data type, and operands of this data type may be referred to as packed data operands or vector operands. In one embodiment, a packed data item or vector may be a sequence of packed data elements stored within a single register, and a packed data operand or a vector operand may a source or destination operand of a SIMD instruction (or 'packed data instruction' or a 'vector instruction'). In one embodiment, a SIMD instruction specifies a single vector operation to be performed on two source vector operands to generate a destination vector operand (also referred to as a result vector operand) of the same or different size, with the same or different number of data elements, and in the same or different data element order.

SIMD technology, such as that employed by the Intel® Core™ processors having an instruction set including x86, MMX™, Streaming SIMD Extensions (SSE), SSE2, SSE3, SSE4.1, and SSE4.2 instructions, ARM processors, such as the ARM Cortex® family of processors having an instruction set including the Vector Floating Point (VFP) and/or NEON instructions, and MIPS processors, such as the Loongson family of processors developed by the Institute of Computing Technology (ICT) of the Chinese Academy of Sciences, has enabled a significant improvement in application performance (Core™ and MMX™ are registered trademarks or trademarks of Intel Corporation of Santa Clara, Calif.).

In one embodiment, destination and source registers/data may be generic terms to represent the source and destination of the corresponding data or operation. In some embodiments, they may be implemented by registers, memory, or other storage areas having other names or functions than those depicted. For example, in one embodiment, "DEST1" may be a temporary storage register or other storage area, whereas "SRC1" and "SRC2" may be a first and second source storage register or other storage area, and so forth. In other embodiments, two or more of the SRC and DEST storage areas may correspond to different data storage elements within the same storage area (e.g., a SIMD register). In one embodiment, one of the source registers may also act as a destination register by, for example, writing back the result of an operation performed on the first and second source data to one of the two source registers serving as a destination registers.

FIG. 1A is a block diagram of an exemplary computer system formed with a processor that may include execution units to execute an instruction, in accordance with embodiments of the present disclosure. System 100 may include a component, such as a processor 102 to employ execution units including circuits with logic to perform algorithms for process data, in accordance with the present disclosure, such as in the embodiment described herein. System 100 may be representative of processing systems based on the PENTIUM® III, PENTIUM® 4, Xeon™, Itanium®, XScale™ and/or StrongARM™ microprocessors available from Intel Corporation of Santa Clara, Calif., although other systems (including PCs having other microprocessors, engineering workstations, set-top boxes and the like) may also be used. In one embodiment, sample system 100 may execute a version of the WINDOWS™ operating system available from Microsoft Corporation of Redmond, Wash., although other operating systems (UNIX and Linux for example), embedded software, and/or graphical user interfaces, may also be used. Thus, embodiments of the present disclosure are not limited to any specific combination of hardware circuitry, programmable circuitry, and software.

Embodiments are not limited to computer systems. Embodiments of the present disclosure may be used in other devices such as handheld devices and embedded applications. Some examples of handheld devices include cellular phones, Internet Protocol devices, digital cameras, personal digital assistants (PDAs), and handheld PCs. Embedded applications may include a micro controller, a digital signal processor (DSP), system on a chip, network computers (NetPC), set-top boxes, network hubs, wide area network (WAN) switches, or any other system that may perform one or more instructions in accordance with at least one embodiment.

Computer system 100 may include a processor 102 that may include one or more execution units 108 to perform an algorithm to perform at least one instruction in accordance with one embodiment of the present disclosure. One embodiment may be described in the context of a single processor desktop or server system, but other embodiments may be included in a multiprocessor system. System 100 may be an example of a 'hub' system architecture. System 100 may include a processor 102 for processing data signals.

Processor 102 may include a complex instruction set computer (CISC) microprocessor, a reduced instruction set computing (RISC) microprocessor, a very long instruction word (VLIW) microprocessor, a processor implementing a combination of instruction sets, or any other processor device, such as a digital signal processor, for example. In one embodiment, processor 102 may be coupled to a processor bus 110 that may transmit data signals between processor 102 and other components in system 100. The elements of system 100 may perform conventional functions that are well known to those familiar with the art.

In one embodiment, processor 102 may include a Level 1 (L1) internal cache memory 104. Depending on the architecture, the processor 102 may have a single internal cache or multiple levels of internal cache. In another embodiment, the cache memory may reside external to processor 102. Other embodiments may also include a combination of both internal and external caches depending on the particular implementation and needs. Register file 106 may store different types of data in various registers including integer registers, floating point registers, status registers, and instruction pointer register.

Execution unit 108, including circuits with logic to perform integer and floating point operations, also resides in processor 102. Processor 102 may also include a microcode (ucode) ROM that stores microcode for certain macroinstructions. In one embodiment, execution unit 108 may include circuits with logic to handle a packed instruction set 109. By including the packed instruction set 109 in the instruction set of a general-purpose processor 102, along with associated circuitry to execute the instructions, the operations used by many multimedia applications may be performed using packed data in a general-purpose processor 102. Thus, many multimedia applications may be accelerated and executed more efficiently by using the full width of a processor's data bus for performing operations on packed data. This may eliminate the need to transfer smaller units of data across the processor's data bus to perform one or more operations one data element at a time.

Embodiments of an execution unit 108 may also be used in micro controllers, embedded processors, graphics devices, DSPs, and other types of logic circuits. System 100 may include a memory 120. Memory 120 may be implemented as a dynamic random access memory (DRAM) device, a static random access memory (SRAM) device, flash memory device, or other memory device. Memory 120 may store instructions and/or data represented by data signals that may be executed by processor 102.

A system logic chip 116 may be coupled to processor bus 110 and memory 120. System logic chip 116 may include a memory controller hub (MCH). Processor 102 may communicate with MCH 116 via a processor bus 110. MCH 116 may provide a high bandwidth memory path 118 to memory 120 for instruction and data storage and for storage of graphics commands, data and textures. MCH 116 may direct data signals between processor 102, memory 120, and other components in system 100 and to bridge the data signals between processor bus 110, memory 120, and system I/O 122. In some embodiments, the system logic chip 116 may provide a graphics port for coupling to a graphics controller 112. MCH 116 may be coupled to memory 120 through a memory interface 118. Graphics card 112 may be coupled to MCH 116 through an Accelerated Graphics Port (AGP) interconnect 114.

System 100 may use a proprietary hub interface bus 122 to couple MCH 116 to I/O controller hub (ICH) 130. In one embodiment, ICH 130 may provide direct connections to some I/O devices via a local I/O bus. The local I/O bus may include a high-speed I/O bus for connecting peripherals to memory 120, chipset, and processor 102. Examples may include the audio controller, firmware hub (flash BIOS) 128, wireless transceiver 126, data storage 124, legacy I/O controller containing user input and keyboard interfaces, a serial expansion port such as Universal Serial Bus (USB), and a network controller 134. Data storage device 124 may comprise a hard disk drive, a floppy disk drive, a CD-ROM device, a flash memory device, or other mass storage device.

For another embodiment of a system, an instruction in accordance with one embodiment may be used with a system on a chip. One embodiment of a system on a chip comprises of a processor and a memory. The memory for one such system may include a flash memory. The flash memory may be located on the same die as the processor and other system components. Additionally, other logic blocks such as a memory controller or graphics controller may also be located on a system on a chip.

Figure 1B:
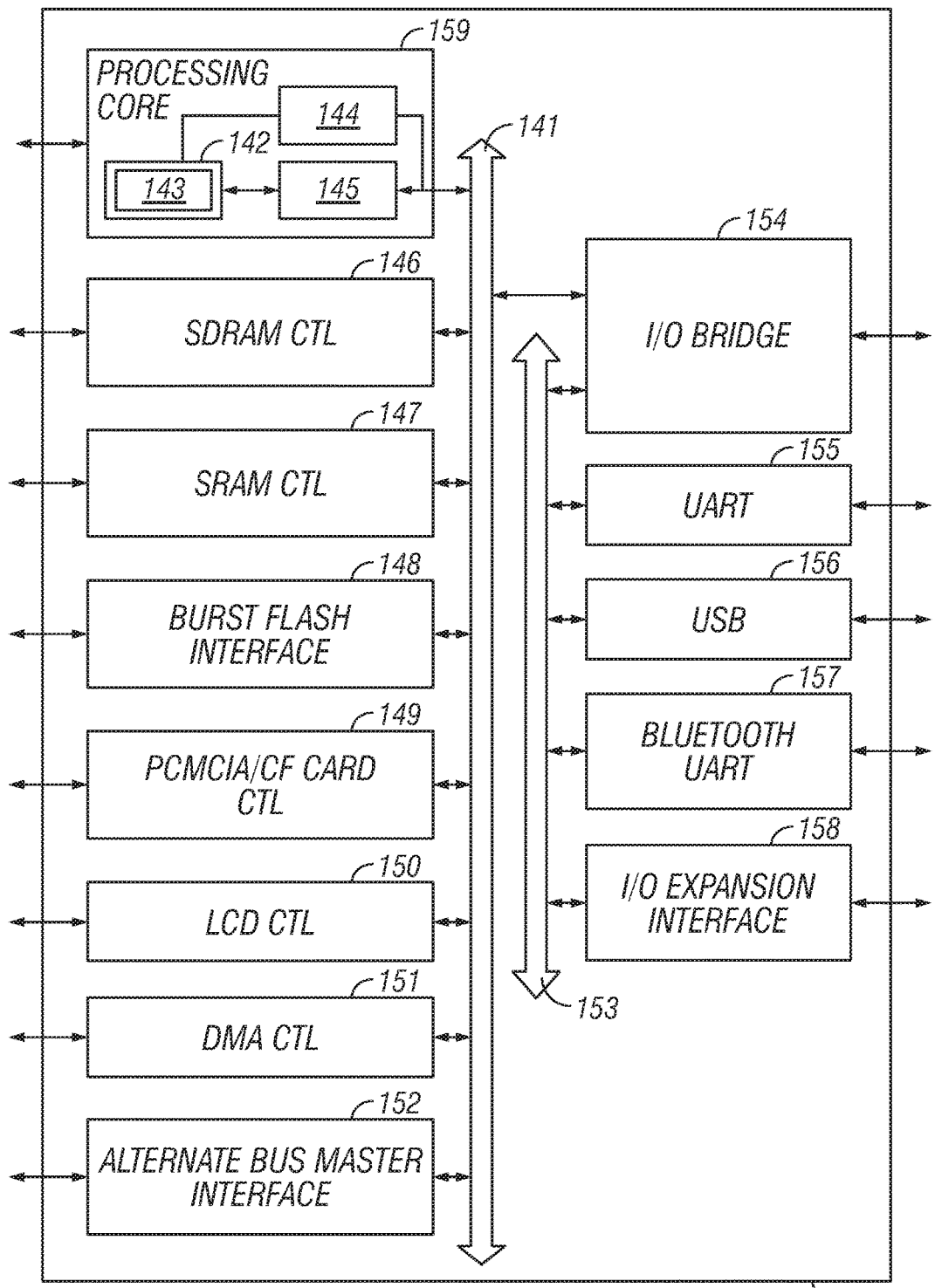
FIG. 1B illustrates a data processing system, in accordance with embodiments of the present disclosure.

FIG. 1B illustrates a data processing system 140 which implements the principles of embodiments of the present disclosure. It will be readily appreciated by one of skill in the art that the embodiments described herein may operate with alternative processing systems without departure from the scope of embodiments of the disclosure.

Computer system 140 comprises a processing core 159 for performing at least one instruction in accordance with one embodiment. In one embodiment, processing core 159 represents a processing unit of any type of architecture, including but not limited to a CISC, a RISC or a VLIW type architecture. Processing core 159 may also be suitable for manufacture in one or more process technologies and by being represented on a machine-readable media in sufficient detail, may be suitable to facilitate said manufacture.

Processing core 159 comprises an execution unit 142, a set of register files 145, and a decoder 144. Processing core 159 may also include additional circuitry (not shown) which may be unnecessary to the understanding of embodiments of the present disclosure. Execution unit 142 may execute instructions received by processing core 159. In addition to performing typical processor instructions, execution unit 142 may perform instructions in packed instruction set 143 for performing operations on packed data formats. Packed instruction set 143 may include instructions for performing embodiments of the disclosure and other packed instructions. Execution unit 142 may be coupled to register file 145 by an internal bus. Register file 145 may represent a storage area on processing core 159 for storing information, including data. As previously mentioned, it is understood that the storage area may store the packed data might not be critical. Execution unit 142 may be coupled to decoder 144. Decoder 144 may decode instructions received by processing core 159 into control signals and/or microcode entry points. In response to these control signals and/or microcode entry points, execution unit 142 performs the appropriate operations. In one embodiment, the decoder may interpret the opcode of the instruction, which will indicate what operation should be performed on the corresponding data indicated within the instruction.

Processing core 159 may be coupled with bus 141 for communicating with various other system devices, which may include but are not limited to, for example, synchronous dynamic random access memory (SDRAM) control 146, static random access memory (SRAM) control 147, burst flash memory interface 148, personal computer memory card international association (PCMCIA)/compact flash (CF) card control 149, liquid crystal display (LCD) control 150, direct memory access (DMA) controller 151, and alternative bus master interface 152. In one embodiment, data processing system 140 may also comprise an I/O bridge 154 for communicating with various I/O devices via an I/O bus 153. Such I/O devices may include but are not limited to, for example, universal asynchronous receiver/transmitter (UART) 155, universal serial bus (USB) 156, Bluetooth wireless UART 157 and I/O expansion interface 158.

One embodiment of data processing system 140 provides for mobile, network and/or wireless communications and a processing core 159 that may perform SIMD operations including a text string comparison operation. Processing core 159 may be programmed with various audio, video, imaging and communications algorithms including discrete transformations such as a Walsh-Hadamard transform, a fast Fourier transform (FFT), a discrete cosine transform (DCT), and their respective inverse transforms; compression/decompression techniques such as color space transformation, video encode motion estimation or video decode motion compensation; and modulation/demodulation (MODEM) functions such as pulse coded modulation (PCM).

Figure 1C:
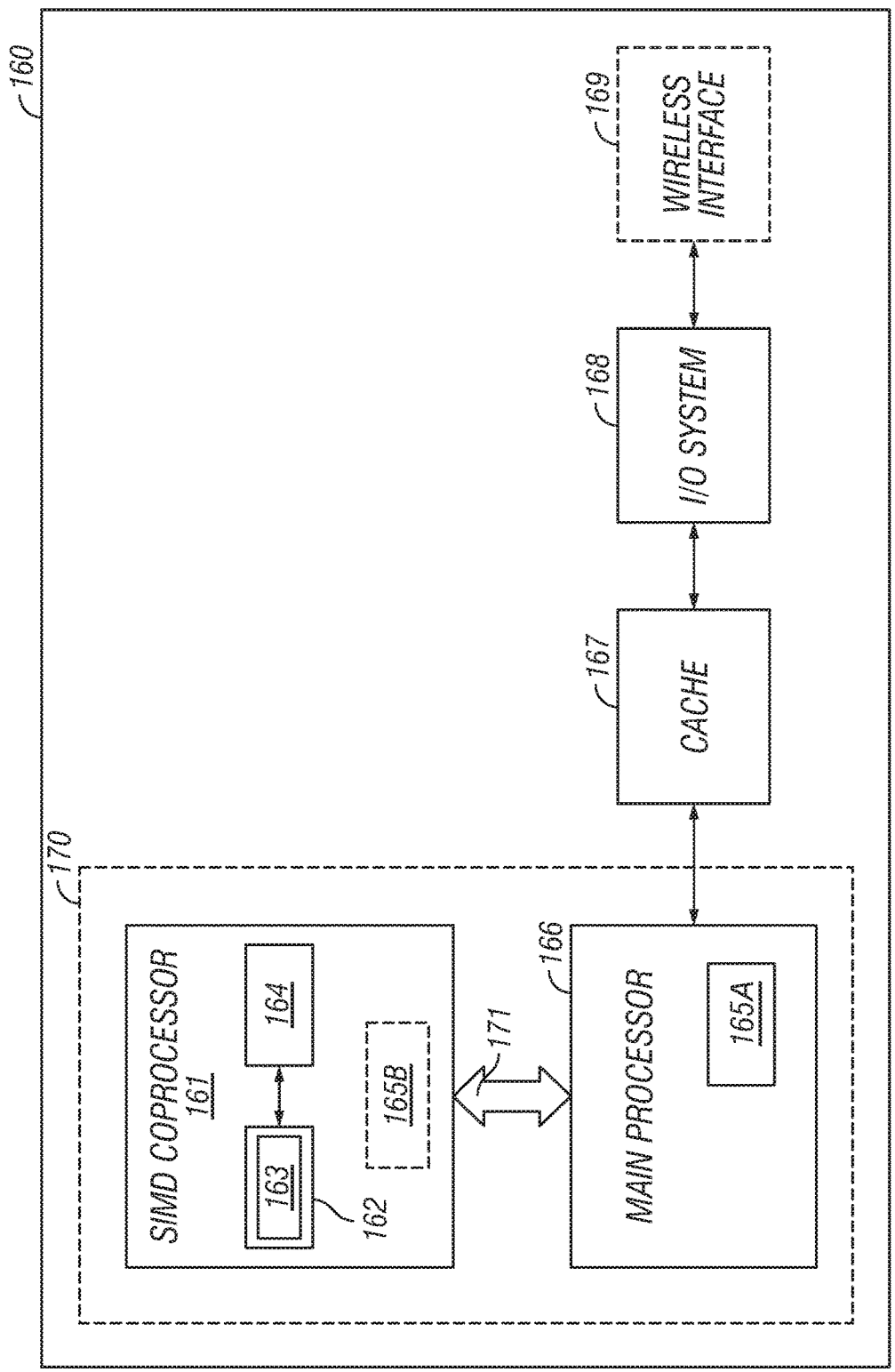
FIG. 1C illustrates other embodiments of a data processing system for performing text string comparison operations.

FIG. 1C illustrates other embodiments of a data processing system that performs SIMD text string comparison operations. In one embodiment, data processing system 160 may include a main processor 166, a SIMD coprocessor 161, a cache memory 167, and an input/output system 168. Input/output system 168 may optionally be coupled to a wireless interface 169. SIMD coprocessor 161 may perform operations including instructions in accordance with one embodiment. In one embodiment, processing core 170 may be suitable for manufacture in one or more process technologies and by being represented on a machine-readable media in sufficient detail, may be suitable to facilitate the manufacture of all or part of data processing system 160 including processing core 170.

In one embodiment, SIMD coprocessor 161 comprises an execution unit 162 and a set of register files 164. One embodiment of main processor 166 comprises a decoder 165A to recognize instructions of instruction set 163 including instructions in accordance with one embodiment for execution by execution unit 162. In other embodiments, SIMD coprocessor 161 also comprises 165B at least part of decoder 165A to decode instructions of instruction set 163. Processing core 170 may also include additional circuitry (not shown) which may be unnecessary to the understanding of embodiments of the present disclosure.

In operation, main processor 166 executes a stream of data processing instructions that control data processing operations of a general type including interactions with cache memory 167, and input/output system 168. Embedded within the stream of data processing instructions may be SIMD coprocessor instructions. Decoder 165A of main processor 166 recognizes these SIMD coprocessor instructions as being of a type that should be executed by an attached SIMD coprocessor 161. Accordingly, main processor 166 issues these SIMD coprocessor instructions (or control signals representing SIMD coprocessor instructions) on the coprocessor bus 171. From coprocessor bus 171, these instructions may be received by any attached SIMD coprocessors. In this case, SIMD coprocessor 161 may accept and execute any received SIMD coprocessor instructions intended for it.

Data may be received via wireless interface 169 for processing by the SIMD coprocessor instructions. For one example, voice communication may be received in the form of a digital signal, which may be processed by the SIMD coprocessor instructions to regenerate digital audio samples representative of the voice communications. For another example, compressed audio and/or video may be received in the form of a digital bit stream, which may be processed by the SIMD coprocessor instructions to regenerate digital audio samples and/or motion video frames. In one embodiment of processing core 170, main processor 166, and a SIMD coprocessor 161 may be integrated into a single processing core 170 comprising an execution unit 162, a set of register files 164, and a decoder 165 to recognize instructions of instruction set 163 including instructions in accordance with one embodiment.

Figure 2:
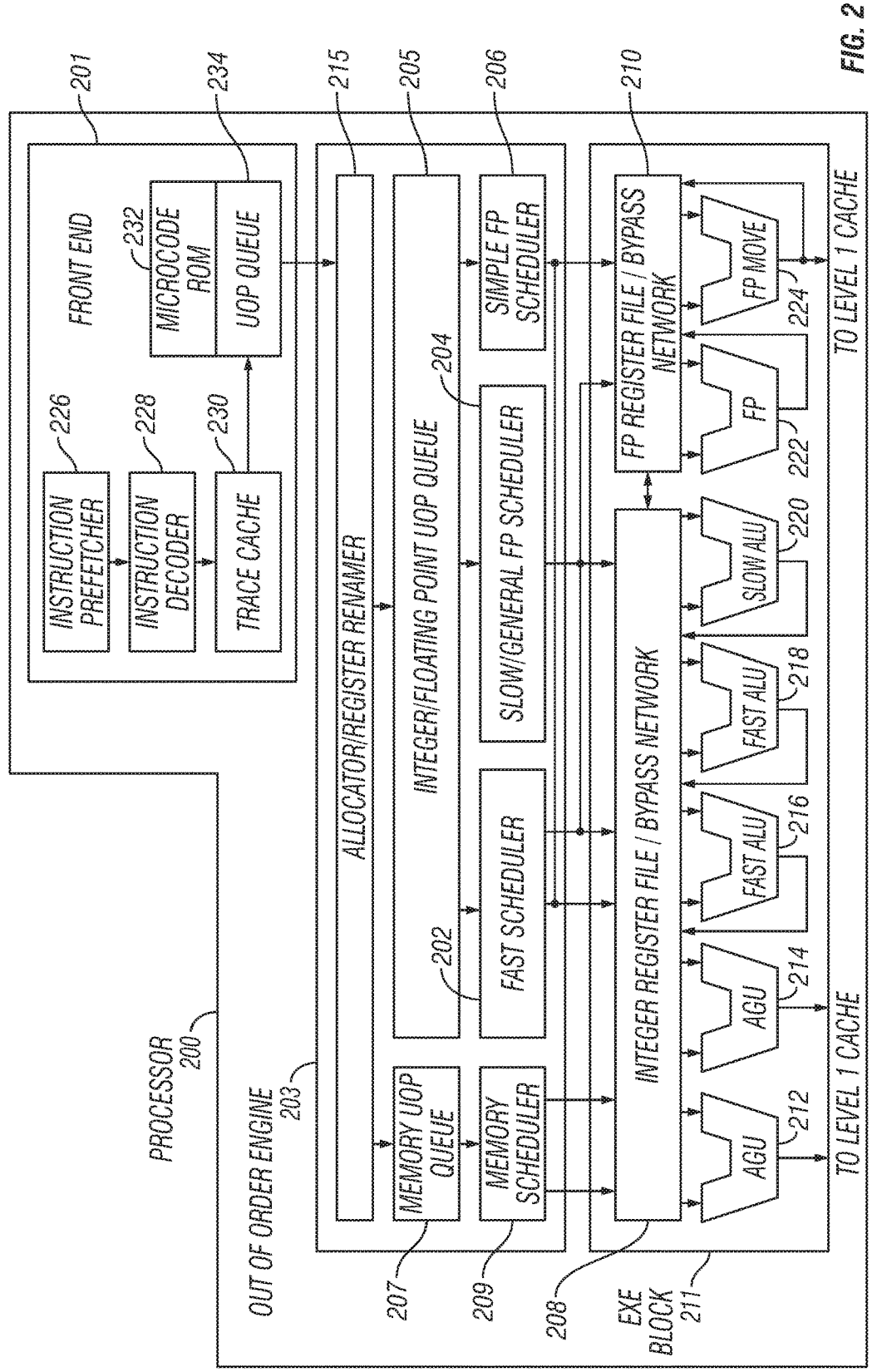
FIG. 2 is a block diagram of the micro-architecture for a processor that may include logic circuits to perform instructions, in accordance with embodiments of the present disclosure.

FIG. 2 is a block diagram of the micro-architecture for a processor 200 that may include logic circuits to perform instructions, in accordance with embodiments of the present disclosure. In some embodiments, an instruction in accordance with one embodiment may be implemented to operate on data elements having sizes of byte, word, doubleword, quadword, etc., as well as datatypes, such as single and double precision integer and floating point datatypes. In one embodiment, in-order front end 201 may implement a part of processor 200 that may fetch instructions to be executed and prepares the instructions to be used later in the processor pipeline. Front end 201 may include several units. In one embodiment, instruction prefetcher 226 fetches instructions from memory and feeds the instructions to an instruction decoder 228 which in turn decodes or interprets the instructions. For example, in one embodiment, the decoder decodes a received instruction into one or more operations called "micro-instructions" or "micro-operations" (also called micro op or uops) that the machine may execute. In other embodiments, the decoder parses the instruction into an opcode and corresponding data and control fields that may be used by the micro-architecture to perform operations in accordance with one embodiment. In one embodiment, trace cache 230 may assemble decoded uops into program ordered sequences or traces in uop queue 234 for execution. When trace cache 230 encounters a complex instruction, microcode ROM 232 provides the uops needed to complete the operation.

Some instructions may be converted into a single microop, whereas others need several micro-ops to complete the full operation. In one embodiment, if more than four microops are needed to complete an instruction, decoder 228 may access microcode ROM 232 to perform the instruction. In one embodiment, an instruction may be decoded into a small number of micro ops for processing at instruction decoder 228. In another embodiment, an instruction may be stored within microcode ROM 232 should a number of micro-ops be needed to accomplish the operation. Trace cache 230 refers to an entry point programmable logic array (PLA) to determine a correct micro-instruction pointer for reading the micro-code sequences to complete one or more instructions in accordance with one embodiment from micro-code ROM 232. After microcode ROM 232 finishes sequencing micro-ops for an instruction, front end 201 of the machine may resume fetching micro-ops from trace cache 230.

Out-of-order execution engine 203 may prepare instructions for execution. The out-of-order execution logic has a number of buffers to smooth out and re-order the flow of instructions to optimize performance as they go down the pipeline and get scheduled for execution. The allocator logic 215 allocates the machine buffers and resources that each uop needs in order to execute. The register renaming logic 215 renames logic registers onto entries in a register file. The allocator 215 also allocates an entry for each uop in one of the two uop queues, one for memory operations 207 and one for non-memory operations 205, in front of the instruction schedulers: memory scheduler 209, fast scheduler 202, slow/general floating point scheduler 204, and simple floating point scheduler 206. Uop schedulers 202, 204, 206, determine when a uop is ready to execute based on the readiness of their dependent input register operand sources and the availability of the execution resources the uops need to complete their operation. Fast scheduler 202 of one embodiment may schedule on each half of the main clock cycle while the other schedulers may only schedule once per main processor clock cycle. The schedulers arbitrate for the dispatch ports to schedule uops for execution.

Register files 208, 210 may be arranged between schedulers 202, 204, 206, and execution units 212, 214, 216, 218, 220, 222, 224 in execution block 211. Each of register files 208, 210 perform integer and floating point operations, respectively. Each register file 208, 210, may include a bypass network or bypass path that may bypass or forward just completed results that have not yet been written into the register file to new dependent uops. Integer register file 208 and floating point register file 210 may communicate data with the other. In one embodiment, integer register file 208 may be split into two separate register files, one register file for low-order thirty-two bits of data and a second register file for high order thirty-two bits of data. Floating point register file 210 may include 128-bit wide entries because floating point instructions typically have operands from 64 to 128 bits in width.

Execution block 211 may contain execution units 212, 214, 216, 218, 220, 222, 224. Execution units 212, 214, 216, 218, 220, 222, 224 may execute the instructions. Execution block 211 may include register files 208, 210 that store the integer and floating point data operand values that the micro-instructions need to execute. In one embodiment, processor 200 may comprise a number of execution units: address generation unit (AGU) 212, AGU 214, fast ALU 216, fast ALU 218, slow ALU 220, floating point ALU 222, floating point move unit 224. In another embodiment, floating point execution blocks 222, 224, may execute floating point, MMX, SIMD, and SSE, or other operations. In yet another embodiment, floating point ALU 222 may include a 64-bit by 64-bit floating point divider to execute divide, square root, and remainder micro-ops. In various embodiments, instructions involving a floating point value may be handled with the floating point hardware. In one embodiment, ALU operations may be passed to high-speed ALU execution units 216, 218. High-speed ALUs 216, 218 may execute fast operations with an effective latency of half a clock cycle. In one embodiment, most complex integer operations go to slow ALU 220 as slow ALU 220 may include integer execution hardware for long-latency type of operations, such as a multiplier, shifts, flag logic, and branch processing. Memory load/store operations may be executed by AGUs 212, 214. In one embodiment, integer ALUs 216, 218, 220 may perform integer operations on 64-bit data operands. In other embodiments, ALUs 216, 218, 220 may be implemented to support a variety of data bit sizes including sixteen, thirty-two, 128, 256, etc. Similarly, floating point units 222, 224 may be implemented to support a range of operands having bits of various widths. In one embodiment, floating point units 222, 224, may operate on 128-bit wide packed data operands in conjunction with SIMD and multimedia instructions.

In one embodiment, uops schedulers 202, 204, 206, dispatch dependent operations before the parent load has finished executing. As uops may be speculatively scheduled and executed in processor 200, processor 200 may also include circuits with logic to handle memory misses. If a data load misses in the data cache, there may be dependent operations in flight in the pipeline that have left the scheduler with temporarily incorrect data. A replay mechanism tracks and re-executes instructions that use incorrect data. Only the dependent operations might need to be replayed and the independent ones may be allowed to complete. The schedulers and replay mechanism of one embodiment of a processor may also be designed to catch instruction sequences for text string comparison operations.

The term "registers" may refer to the on-board processor storage locations that may be used as part of instructions to identify operands. In other words, registers may be those that may be usable from the outside of the processor (from a programmer's perspective). However, in some embodiments registers might not be limited to a particular type of circuit. Rather, a register may store data, provide data, and perform the functions described herein. The registers described herein may be implemented by circuitry within a processor using any number of different techniques, such as dedicated physical registers, dynamically allocated physical registers using register renaming, combinations of dedicated and dynamically allocated physical registers, etc. In one embodiment, integer registers store 32-bit integer data. A register file of one embodiment also contains eight multimedia SIMD registers for packed data. For the discussions below, the registers may be understood to be data registers designed to hold packed data, such as 64-bit wide MMX™ registers (also referred to as 'mm' registers in some instances) in microprocessors enabled with MMX technology from Intel Corporation of Santa Clara, Calif. These MMX registers, available in both integer and floating point forms, may operate with packed data elements that accompany SIMD and SSE instructions. Similarly, 128-bit wide XMM registers relating to SSE2, SSE3, SSE4, or beyond (referred to generically as "SSEx") technology may hold such packed data operands. In one embodiment, in storing packed data and integer data, the registers do not need to differentiate between the two data types. In one embodiment, integer and floating point may be contained in the same register file or different register files. Furthermore, in one embodiment, floating point and integer data may be stored in different registers or the same registers.

Figure 3A:
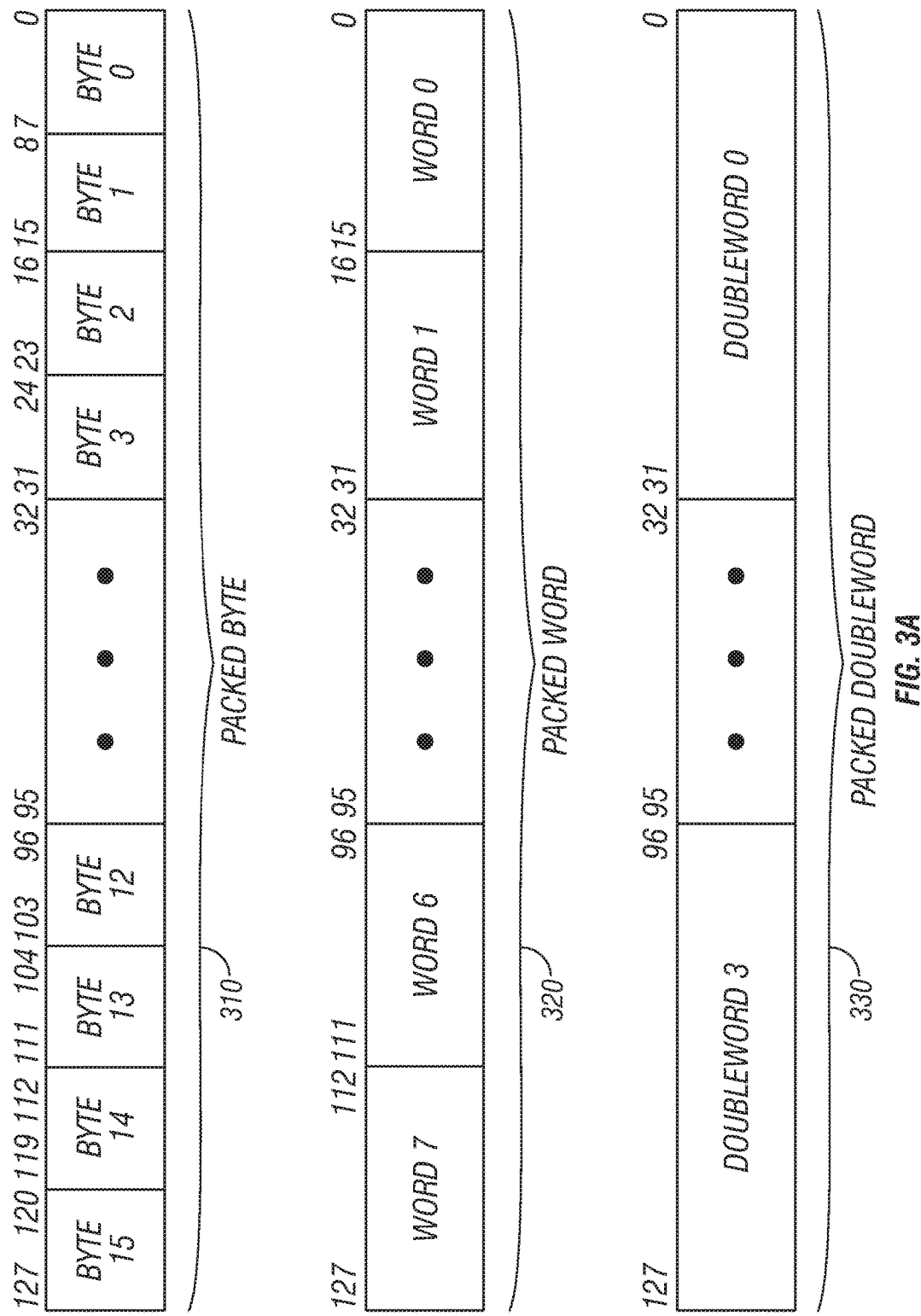
FIG. 3A illustrates various packed data type representations in multimedia registers, in accordance with embodiments of the present disclosure.

In the examples of the following figures, a number of data operands may be described. FIG. 3A illustrates various packed data type representations in multimedia registers, in accordance with embodiments of the present disclosure. FIG. 3A illustrates data types for a packed byte 310, a packed word 320, and a packed doubleword (dword) 330 for 128-bit wide operands. Packed byte format 310 of this example may be 128 bits long and contains sixteen packed byte data elements. A byte may be defined, for example, as eight bits of data. Information for each byte data element may be stored in bit 7 through bit 0 for byte 0, bit 15 through bit 8 for byte 1, bit 23 through bit 16 for byte 2, and finally bit 120 through bit 127 for byte 15. Thus, all available bits may be used in the register. This storage arrangement increases the storage efficiency of the processor. As well, with sixteen data elements accessed, one operation may now be performed on sixteen data elements in parallel.

Generally, a data element may include an individual piece of data that is stored in a single register or memory location with other data elements of the same length. In packed data sequences relating to SSEx technology, the number of data elements stored in a XMM register may be 128 bits divided by the length in bits of an individual data element. Similarly, in packed data sequences relating to MMX and SSE technology, the number of data elements stored in an MMX register may be 64 bits divided by the length in bits of an individual data element. Although the data types illustrated in FIG. 3A may be 128 bits long, embodiments of the present disclosure may also operate with 64-bit wide or other sized operands. Packed word format 320 of this example may be 128 bits long and contains eight packed word data elements. Each packed word contains sixteen bits of information. Packed doubleword format 330 of FIG. 3A may be 128 bits long and contains four packed doubleword data elements. Each packed doubleword data element contains thirty-two bits of information. A packed quadword may be 128 bits long and contain two packed quad-word data elements.

FIG. 3B illustrates possible in-register data storage formats, in accordance with embodiments of the present disclosure. Each packed data may include more than one independent data element. Three packed data formats are illustrated; packed half 341, packed single 342, and packed double 343. One embodiment of packed half 341, packed single 342, and packed double 343 contain fixed-point data elements. For another embodiment one or more of packed half 341, packed single 342, and packed double 343 may contain floating point data elements. One embodiment of packed half 341 may be 128 bits long containing eight 16-bit data elements. One embodiment of packed single 342 may be 128 bits long and contains four 32-bit data elements. One embodiment of packed double 343 may be 128 bits long and contains two 64-bit data elements. It will be appreciated that such packed data formats may be further extended to other register lengths, for example, to 96-bits, 160-bits, 192-bits, 224-bits, 256-bits, 512-bits or more.

FIG. 3C illustrates various signed and unsigned packed data type representations in multimedia registers, in accordance with embodiments of the present disclosure. Unsigned packed byte representation 344 illustrates the storage of an unsigned packed byte in a SIMD register. Information for each byte data element may be stored in bit 7 through bit 0 for byte 0, bit 15 through bit 8 for byte 1, bit 23 through bit 16 for byte 2, and finally bit 120 through bit 127 for byte 15. Thus, all available bits may be used in the register. This storage arrangement may increase the storage efficiency of the processor. As well, with sixteen data elements accessed, one operation may now be performed on sixteen data elements in a parallel fashion. Signed packed byte representation 345 illustrates the storage of a signed packed byte. Note that the eighth bit of every byte data element may be the sign indicator. Unsigned packed word representation 346 illustrates how word seven through word zero may be stored in a SIMD register. Signed packed word representation 347 may be similar to the unsigned packed word in-register representation 346. Note that the sixteenth bit of each word data element may be the sign indicator. Unsigned packed doubleword representation 348 shows how doubleword data elements are stored. Signed packed doubleword representation 349 may be similar to unsigned packed doubleword in-register representation 348. Note that the necessary sign bit may be the thirty-second bit of each doubleword data element.

Figures 3D, 3E, 3F:
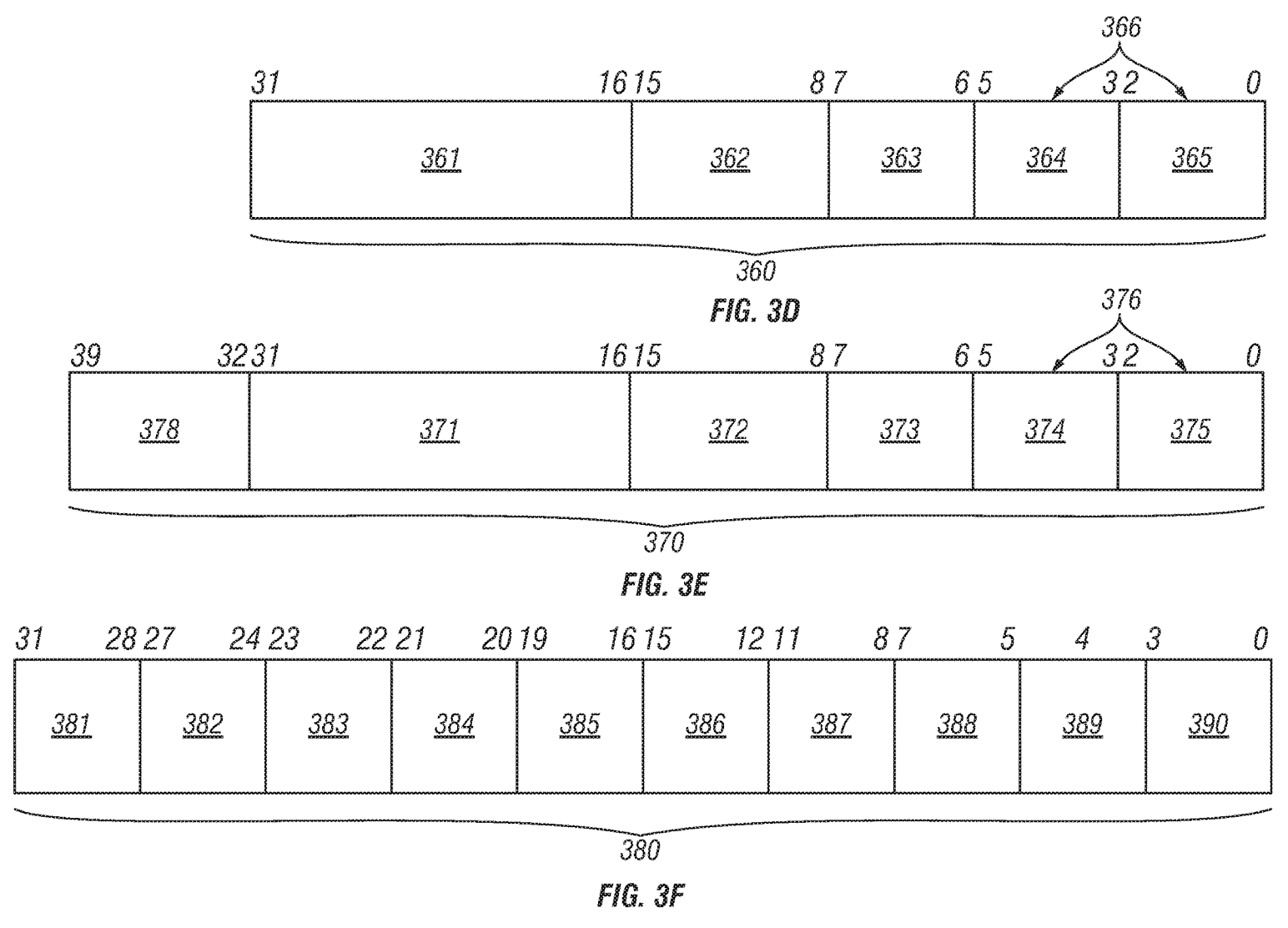

FIG. 3D illustrates an embodiment of an operation encoding (opcode). Furthermore, format 360 may include register/memory operand addressing modes corresponding with a type of opcode format described in the "IA-32 Intel Architecture Software Developer's Manual Volume 2: Instruction Set Reference," which is available from Intel Corporation, Santa Clara, Calif. on the world-wide-web (www) at intel-.com/design/litcentr. In one embodiment, an instruction may be encoded by one or more of fields 361 and 362. Up to two operand locations per instruction may be identified, including up to two source operand identifiers 364 and 365. In one embodiment, destination operand identifier 366 may be the same as source operand identifier 364, whereas in other embodiments they may be different. In another embodiment, destination operand identifier 366 may be the same as source operand identifier 365, whereas in other embodiments they may be different. In one embodiment, one of the source operands identified by source operand identifiers 364 and 365 may be overwritten by the results of the text string comparison operations, whereas in other embodiments identifier 364 corresponds to a source register element and identifier 365 corresponds to a destination register element. In one embodiment, operand identifiers 364 and 365 may identify 32-bit or 64-bit source and destination operands.

FIG. 3E illustrates another possible operation encoding (opcode) format 370, having forty or more bits, in accordance with embodiments of the present disclosure. Opcode format 370 corresponds with opcode format 360 and comprises an optional prefix byte 378. An instruction according to one embodiment may be encoded by one or more of fields 378, 371, and 372. Up to two operand locations per instruction may be identified by source operand identifiers 374 and 375 and by prefix byte 378. In one embodiment, prefix byte 378 may be used to identify 32-bit or 64-bit source and destination operands. In one embodiment, destination operand identifier 376 may be the same as source operand identifier 374, whereas in other embodiments they may be different. For another embodiment, destination operand identifier 376 may be the same as source operand identifier 375, whereas in other embodiments they may be different. In one embodiment, an instruction operates on one or more of the operands identified by operand identifiers 374 and 375 and one or more operands identified by operand identifiers 374 and 375 may be overwritten by the results of the instruction, whereas in other embodiments, operands identified by identifiers 374 and 375 may be written to another data element in another register. Opcode formats 360 and 370 allow register to register, memory to register, register by memory, register by register, register by immediate, register to memory addressing specified in part by MOD fields 363 and 373 and by optional scale-index-base and displacement bytes.

FIG. 3F illustrates yet another possible operation encoding (opcode) format, in accordance with embodiments of the present disclosure. 64-bit single instruction multiple data (SIMD) arithmetic operations may be performed through a coprocessor data processing (CDP) instruction. Operation encoding (opcode) format 380 depicts one such CDP instruction having CDP opcode fields 382 and 389. The type of CDP instruction, for another embodiment, operations may be encoded by one or more of fields 383, 384, 387, and 388. Up to three operand locations per instruction may be identified, including up to two source operand identifiers 385 and 390 and one destination operand identifier 386. One embodiment of the coprocessor may operate on eight, sixteen, thirty-two, and 64-bit values. In one embodiment, an instruction may be performed on integer data elements. In some embodiments, an instruction may be executed conditionally, using condition field 381. For some embodiments, source data sizes may be encoded by field 383. In some embodiments, Zero (Z), negative (N), carry (C), and overflow (V) detection may be done on SIMD fields. For some instructions, the type of saturation may be encoded by field 384.

Figure 4A:
FIG. 4A is a block diagram illustrating an in-order pipeline and a register renaming stage, out-of-order issue/execution pipeline, in accordance with embodiments of the present disclosure.
Figure 4B:
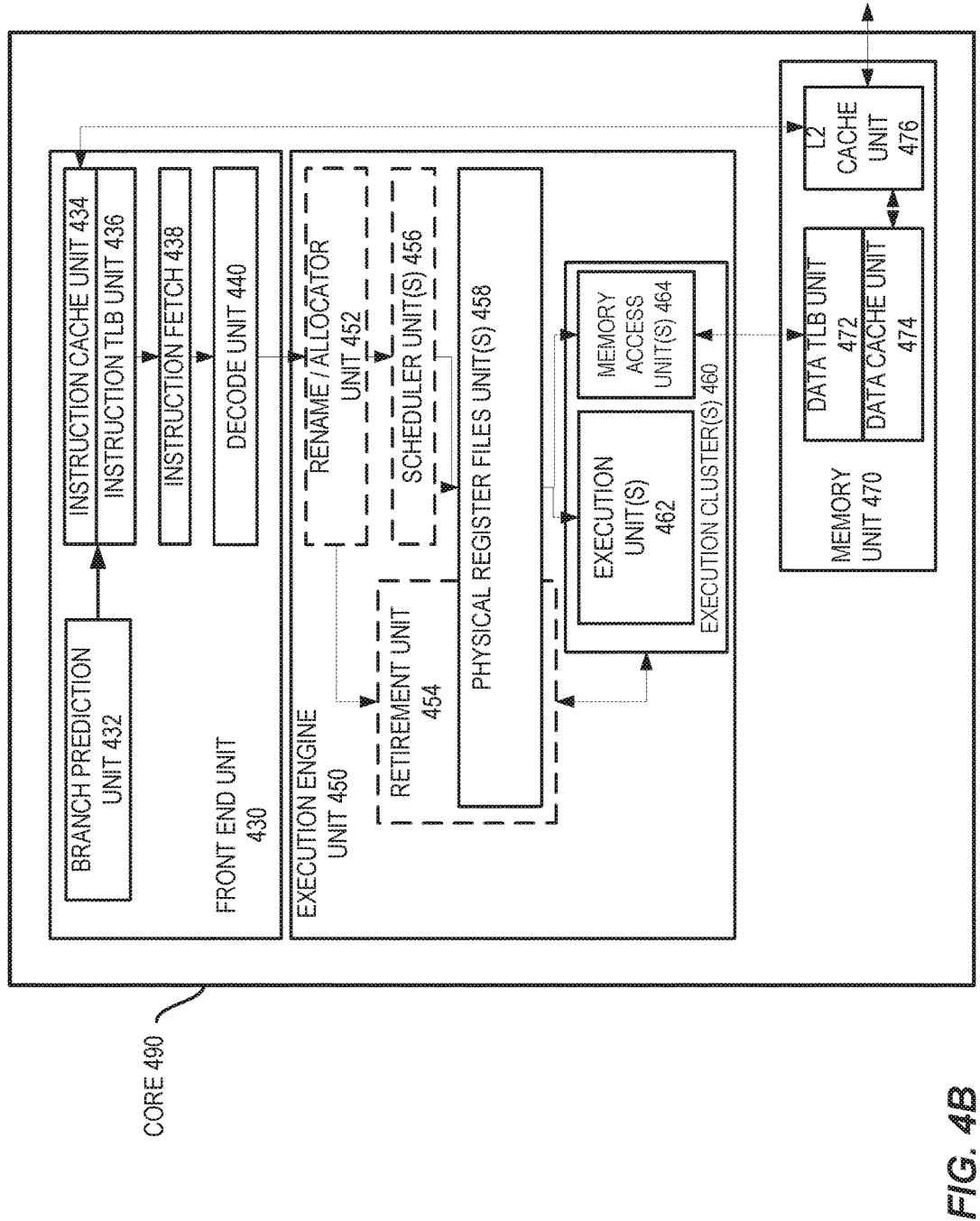
FIG. 4B is a block diagram illustrating an in-order architecture core and a register renaming logic, out-of-order issue/execution logic to be included in a processor, in accordance with embodiments of the present disclosure.

FIG. 4A is a block diagram illustrating an in-order pipeline and a register renaming stage, out-of-order issue/execution pipeline, in accordance with embodiments of the present disclosure. FIG. 4B is a block diagram illustrating an in-order architecture core and circuitry for register renaming, circuitry for out-of-order issue/execution to be included in a processor, in accordance with embodiments of the present disclosure. The solid lined boxes in FIG. 4A illustrate the in-order pipeline, while the dashed lined boxes illustrates the register renaming, out-of-order issue/execution pipeline. Similarly, the solid lined boxes in FIG. 4B illustrate the in-order architecture logic, while the dashed lined boxes illustrates the register renaming logic and out-of-order issue/execution logic.

In FIG. 4A, a processor pipeline 400 may include a fetch stage 402, a length decode stage 404, a decode stage 406, an allocation stage 408, a renaming stage 410, a scheduling (also known as a dispatch or issue) stage 412, a register read/memory read stage 414, an execute stage 416, a write-back/memory-write stage 418, an exception handling stage 422, and a commit stage 424.

In FIG. 4B, arrows denote a coupling between two or more units and the direction of the arrow indicates a direction of data flow between those units. FIG. 4B shows processor core 490 including a front end unit 430 coupled to an execution engine unit 450, and both may be coupled to a memory unit 470.

Core 490 may be a reduced instruction set computing (RISC) core, a complex instruction set computing (CISC) core, a very long instruction word (VLIW) core, or a hybrid or alternative core type. In one embodiment, core 490 may be a special-purpose core, such as, for example, a network or communication core, compression engine, graphics core, or the like.

Front end unit 430 may include a branch prediction unit 432 coupled to an instruction cache unit 434. Instruction cache unit 434 may be coupled to an instruction translation lookaside buffer (TLB) 436. TLB 436 may be coupled to an instruction fetch unit 438, which is coupled to a decode unit 440. Decode unit 440 may decode instructions, and generate as an output one or more micro-operations, micro-code entry points, microinstructions, other instructions, or other control signals, which may be decoded from, or which otherwise reflect, or may be derived from, the original instructions. The decoder may be implemented using various different mechanisms. Examples of suitable mechanisms include, but are not limited to, look-up tables, hardware implementations, programmable logic arrays (PLAs), microcode read-only memories (ROMs), etc. In one embodiment, instruction cache unit 434 may be further coupled to a level 2 (L2) cache unit 476 in memory unit 470. Decode unit 440 may be coupled to a rename/allocator unit 452 in execution engine unit 450.

Execution engine unit 450 may include rename/allocator unit 452 coupled to a retirement unit 454 and a set of one or more scheduler units 456. Scheduler units 456 represent any number of different schedulers, including reservations stations, central instruction window, etc. Scheduler units 456 may be coupled to physical register file units 458. Each of physical register file units 458 represents one or more physical register files, different ones of which store one or more different data types, such as scalar integer, scalar floating point, packed integer, packed floating point, vector integer, vector floating point, etc., status (e.g., an instruction pointer that is the address of the next instruction to be executed), etc. Physical register file units 458 may be overlapped by retirement unit 154 to illustrate various ways in which register renaming and out-of-order execution may be implemented (e.g., using one or more reorder buffers and one or more retirement register files, using one or more future files, one or more history buffers, and one or more retirement register files; using register maps and a pool of registers; etc.). Generally, the architectural registers may be visible from the outside of the processor or from a programmer's perspective. The registers might not be limited to any known particular type of circuit. Various different types of registers may be suitable as long as they store and provide data as described herein. Examples of suitable registers include, but might not be limited to, dedicated physical registers, dynamically allocated physical registers using register renaming, combinations of dedicated and dynamically allocated physical registers, etc. Retirement unit 454 and physical register file units 458 may be coupled to execution clusters 460. Execution clusters 460 may include a set of one or more execution units 162 and a set of one or more memory access units 464. Execution units 462 may perform various operations (e.g., shifts, addition, subtraction, multiplication) and on various types of data (e.g., scalar floating point, packed integer, packed floating point, vector integer, vector floating point). While some embodiments may include a number of execution units dedicated to specific functions or sets of functions, other embodiments may include only one execution unit or multiple execution units that all perform all functions. Scheduler units 456, physical register file units 458, and execution clusters 460 are shown as being possibly plural because certain embodiments create separate pipelines for certain types of data/operations (e.g., a scalar integer pipeline, a scalar floating point/packed integer/packed floating point/vector integer/vector floating point pipeline, and/or a memory access pipeline that each have their own scheduler unit, physical register file unit, and/or execution cluster—and in the case of a separate memory access pipeline, certain embodiments may be implemented in which only the execution cluster of this pipeline has memory access units 464). It should also be understood that where separate pipelines are used, one or more of these pipelines may be out-of-order issue/execution and the rest in-order.

The set of memory access units 464 may be coupled to memory unit 470, which may include a data TLB unit 472 coupled to a data cache unit 474 coupled to a level 2 (L2) cache unit 476. In one exemplary embodiment, memory access units 464 may include a load unit, a store address unit, and a store data unit, each of which may be coupled to data TLB unit 472 in memory unit 470. L2 cache unit 476 may be coupled to one or more other levels of cache and eventually to a main memory. While FIG. 4B illustrates an embodiment in which instruction cache unit 434, data cache unit 474, and level 2 (L2) cache unit 476 reside within core 490, in other embodiments one or more caches or cache units may be internal to a core, external to a core, or apportioned internal to and external to a core in different combinations.

By way of example, the exemplary register renaming, out-of-order issue/execution core architecture may implement pipeline 400 as follows: 1) instruction fetch 438 may perform fetch and length decoding stages 402 and 404; 2) decode unit 440 may perform decode stage 406; 3) rename/allocator unit 452 may perform allocation stage 408 and renaming stage 410; 4) scheduler units 456 may perform schedule stage 412; 5) physical register file units 458 and memory unit 470 may perform register read/memory read stage 414; execution cluster 460 may perform execute stage 416; 6) memory unit 470 and physical register file units 458 may perform write-back/memory-write stage 418; 7) various units may be involved in the performance of exception handling stage 422; and 8) retirement unit 454 and physical register file units 458 may perform commit stage 424.

Core 490 may support one or more instructions sets (e.g., the x86 instruction set (with some extensions that have been added with newer versions); the MIPS instruction set of MIPS Technologies of Sunnyvale, Calif.; the ARM instruction set (with optional additional extensions such as NEON) of ARM Holdings of Sunnyvale, Calif.).

It should be understood that the core may support multithreading (executing two or more parallel sets of operations or threads) in a variety of manners. Multithreading support may be performed by, for example, including time sliced multithreading, simultaneous multithreading (where a single physical core provides a logical core for each of the threads that physical core is simultaneously multithreading), or a combination thereof. Such a combination may include, for example, time sliced fetching and decoding and simultaneous multithreading thereafter such as in the Intel® Hyperthreading technology.

While register renaming may be described in the context of out-of-order execution, it should be understood that register renaming may be used in an in-order architecture. While the illustrated embodiment of the processor may also include a separate instruction and data cache units 434/474 and a shared L2 cache unit 476, other embodiments may have a single internal cache for both instructions and data, such as, for example, a Level 1 (L1) internal cache, or multiple levels of internal cache. In some embodiments, the system may include a combination of an internal cache and an external cache that may be external to the core and/or the processor. In other embodiments, all of the cache may be external to the core and/or the processor.

Figure 5A:
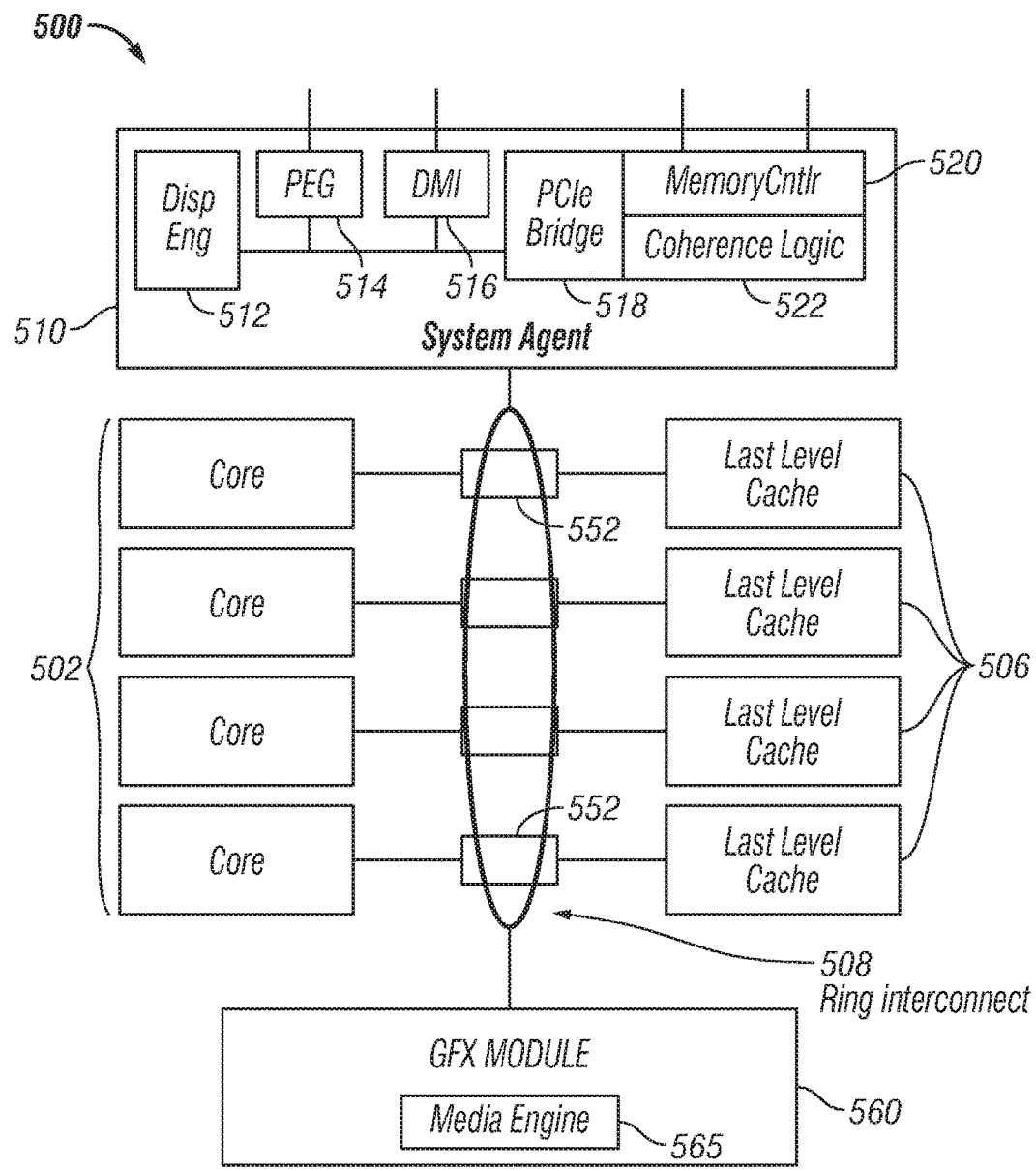
FIG. 5A is a block diagram of a processor, in accordance with embodiments of the present disclosure.

FIG. 5A is a block diagram of a processor 500, in accordance with embodiments of the present disclosure. In one embodiment, processor 500 may include a multicore processor. Processor 500 may include a system agent 510 communicatively coupled to one or more cores 502. Furthermore, cores 502 and system agent 510 may be communicatively coupled to one or more caches 506. Cores 502, system agent 510, and caches 506 may be communicatively coupled via one or more memory control units 552. Furthermore, cores 502, system agent 510, and caches 506 may be communicatively coupled to a graphics module 560 via memory control units 552.

Processor 500 may include any suitable mechanism for interconnecting cores 502, system agent 510, and caches 506, and graphics module 560. In one embodiment, processor 500 may include a ring-based interconnect unit 508 to interconnect cores 502, system agent 510, and caches 506, and graphics module 560. In other embodiments, processor 500 may include any number of well-known techniques for interconnecting such units. Ring-based interconnect unit 508 may utilize memory control units 552 to facilitate interconnections.

Processor 500 may include a memory hierarchy comprising one or more levels of caches within the cores, one or more shared cache units such as caches 506, or external memory (not shown) coupled to the set of integrated memory controller units 552. Caches 506 may include any suitable cache. In one embodiment, caches 506 may include one or more mid-level caches, such as level 2 (L2), level 3 (L3), level 4 (L4), or other levels of cache, a last level cache (LLC), and/or combinations thereof.

In various embodiments, one or more of cores 502 may perform multi-threading. System agent 510 may include components for coordinating and operating cores 502. System agent unit 510 may include for example a power control unit (PCU). The PCU may be or include logic and components needed for regulating the power state of cores 502. System agent 510 may include a display engine 512 for driving one or more externally connected displays or graphics module 560. System agent 510 may include an interface for communications busses for graphics. In one embodiment, the interface may be implemented by PCI Express (PCIe). In a further embodiment, the interface may be implemented by PCI Express Graphics (PEG) 514. System agent 510 may include a direct media interface (DMI) 516. DMI 516 may provide links between different bridges on a motherboard or other portion of a computer system. System agent 510 may include a PCIe bridge 518 for providing PCIe links to other elements of a computing system. PCIe bridge 518 may be implemented using a memory controller 520 and coherence logic 522.

Cores 502 may be implemented in any suitable manner. Cores 502 may be homogenous or heterogeneous in terms of architecture and/or instruction set. In one embodiment, some of cores 502 may be in-order while others may be out-of-order. In another embodiment, two or more of cores 502 may execute the same instruction set, while others may execute only a subset of that instruction set or a different instruction set.

Processor 500 may include a general-purpose processor, such as a Core™ i3, i5, i7, 2 Duo and Quad, Xeon™, Itanium™, XScale™ or StrongARM™ processor, which may be available from Intel Corporation, of Santa Clara, Calif. Processor 500 may be provided from another company, such as ARM Holdings, Ltd, MIPS, etc. Processor 500 may be a special-purpose processor, such as, for example, a network or communication processor, compression engine, graphics processor, co-processor, embedded processor, or the like. Processor 500 may be implemented on one or more chips. Processor 500 may be a part of and/or may be implemented on one or more substrates using any of a number of process technologies, such as, for example, BiCMOS, CMOS, or NMOS.

In one embodiment, a given one of caches 506 may be shared by multiple ones of cores 502. In another embodiment, a given one of caches 506 may be dedicated to one of cores 502. The assignment of caches 506 to cores 502 may be handled by a cache controller or other suitable mechanism. A given one of caches 506 may be shared by two or more cores 502 by implementing time-slices of a given cache 506.

Graphics module 560 may implement an integrated graphics processing subsystem. In one embodiment, graphics module 560 may include a graphics processor. Furthermore, graphics module 560 may include a media engine 565. Media engine 565 may provide media encoding and video decoding.

Figure 5B:
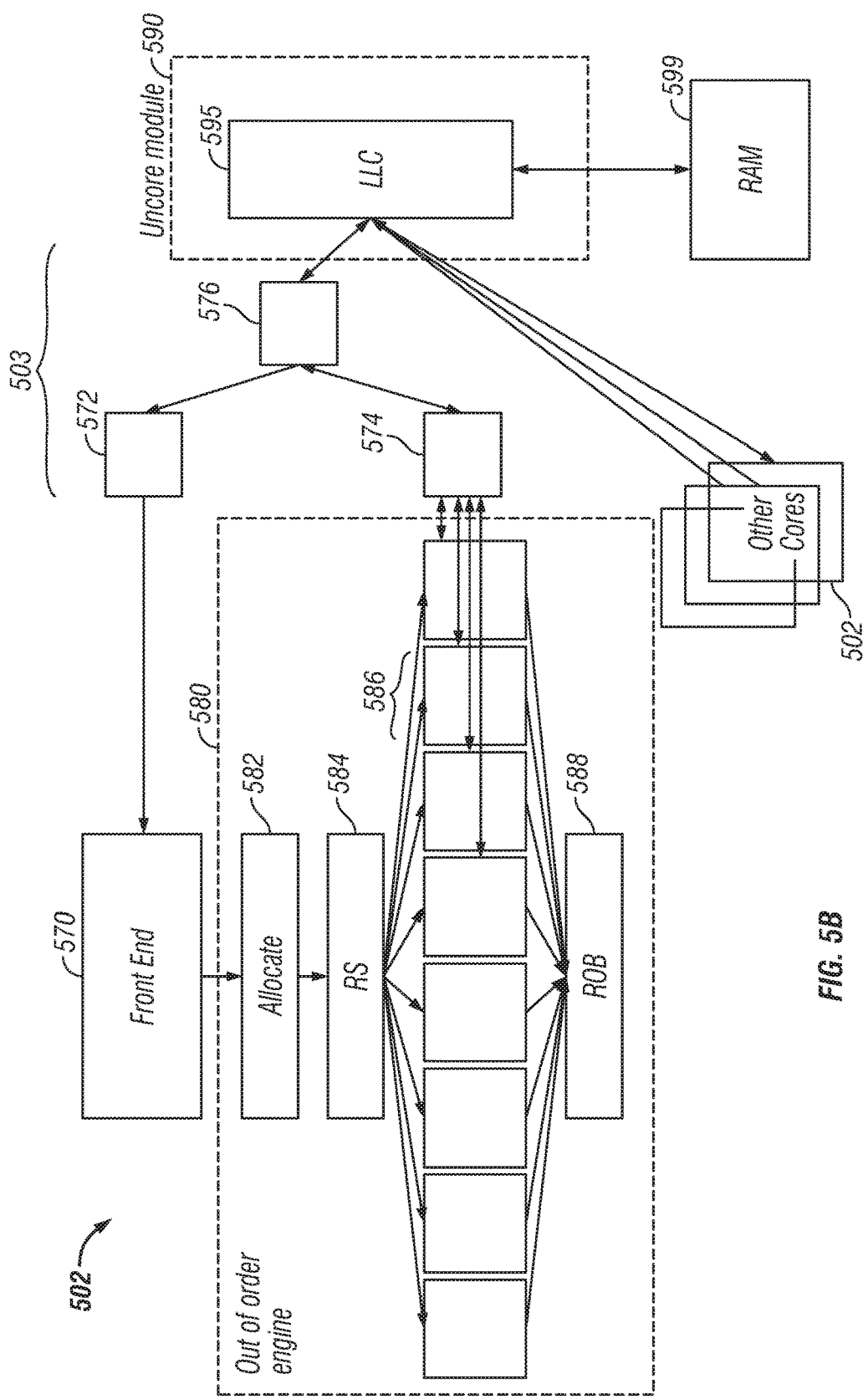
FIG. 5B is a block diagram of an example implementation of a core, in accordance with embodiments of the present disclosure.

FIG. 5B is a block diagram of an example implementation of a core 502, in accordance with embodiments of the present disclosure. Core 502 may include a front end 570 communicatively coupled to an out-of-order engine 580. Core 502 may be communicatively coupled to other portions of processor 500 through cache hierarchy 503.

Front end 570 may be implemented in any suitable manner, such as fully or in part by front end 201 as described above. In one embodiment, front end 570 may communicate with other portions of processor 500 through cache hierarchy 503. In a further embodiment, front end 570 may fetch instructions from portions of processor 500 and prepare the instructions to be used later in the processor pipeline as they are passed to out-of-order execution engine 580.

Out-of-order execution engine 580 may be implemented in any suitable manner, such as fully or in part by out-of-order execution engine 203 as described above. Out-of-order execution engine 580 may prepare instructions received from front end 570 for execution. Out-of-order execution engine 580 may include an allocate module 1282. In one embodiment, allocate module 1282 may allocate resources of processor 500 or other resources, such as registers or buffers, to execute a given instruction. Allocate module 1282 may make allocations in schedulers, such as a memory scheduler, fast scheduler, or floating point scheduler. Such schedulers may be represented in FIG. 5B by resource schedulers 584. Allocate module 1282 may be implemented fully or in part by the allocation logic described in conjunction with FIG. 2. Resource schedulers 584 may determine when an instruction is ready to execute based on the readiness of a given resource's sources and the availability of execution resources needed to execute an instruction. Resource schedulers 584 may be implemented by, for example, schedulers 202, 204, 206 as discussed above. Resource schedulers 584 may schedule the execution of instructions upon one or more resources. In one embodiment, such resources may be internal to core 502, and may be illustrated, for example, as resources 586. In another embodiment, such resources may be external to core 502 and may be accessible by, for example, cache hierarchy 503. Resources may include, for example, memory, caches, register files, or registers. Resources internal to core 502 may be represented by resources 586 in FIG. 5B. As necessary, values written to or read from resources 586 may be coordinated with other portions of processor 500 through, for example, cache hierarchy 503. As instructions are assigned resources, they may be placed into a reorder buffer 588. Reorder buffer 588 may track instructions as they are executed and may selectively reorder their execution based upon any suitable criteria of processor 500. In one embodiment, reorder buffer 588 may identify instructions or a series of instructions that may be executed independently. Such instructions or a series of instructions may be executed in parallel from other such instructions. Parallel execution in core 502 may be performed by any suitable number of separate execution blocks or virtual processors. In one embodiment, shared resources—such as memory, registers, and caches—may be accessible to multiple virtual processors within a given core 502. In other embodiments, shared resources may be accessible to multiple processing entities within processor 500.

Cache hierarchy 503 may be implemented in any suitable manner. For example, cache hierarchy 503 may include one or more lower or mid-level caches, such as caches 572, 574 through logic block 576. In one embodiment, cache hierarchy 503 may include an LLC 595 communicatively coupled to caches 572, 574. In another embodiment, LLC 595 may be implemented in a module 590 accessible to all processing entities of processor 500. In a further embodiment, module 590 may be implemented in an uncore module of processors from Intel, Inc. Module 590 may include portions or subsystems of processor 500 necessary for the execution of core 502 but might not be implemented within core 502. Besides LLC 595, Module 590 may include, for example, hardware interfaces, memory coherency coordinators, interprocessor interconnects, instruction pipelines, or memory controllers. Access to RAM 599 available to processor 500 may be made through module 590 and, more specifically, LLC 595. Furthermore, other instances of core 502 may similarly access module 590. Coordination of the instances of core 502 may be facilitated in part through module 590.

Figure 6:
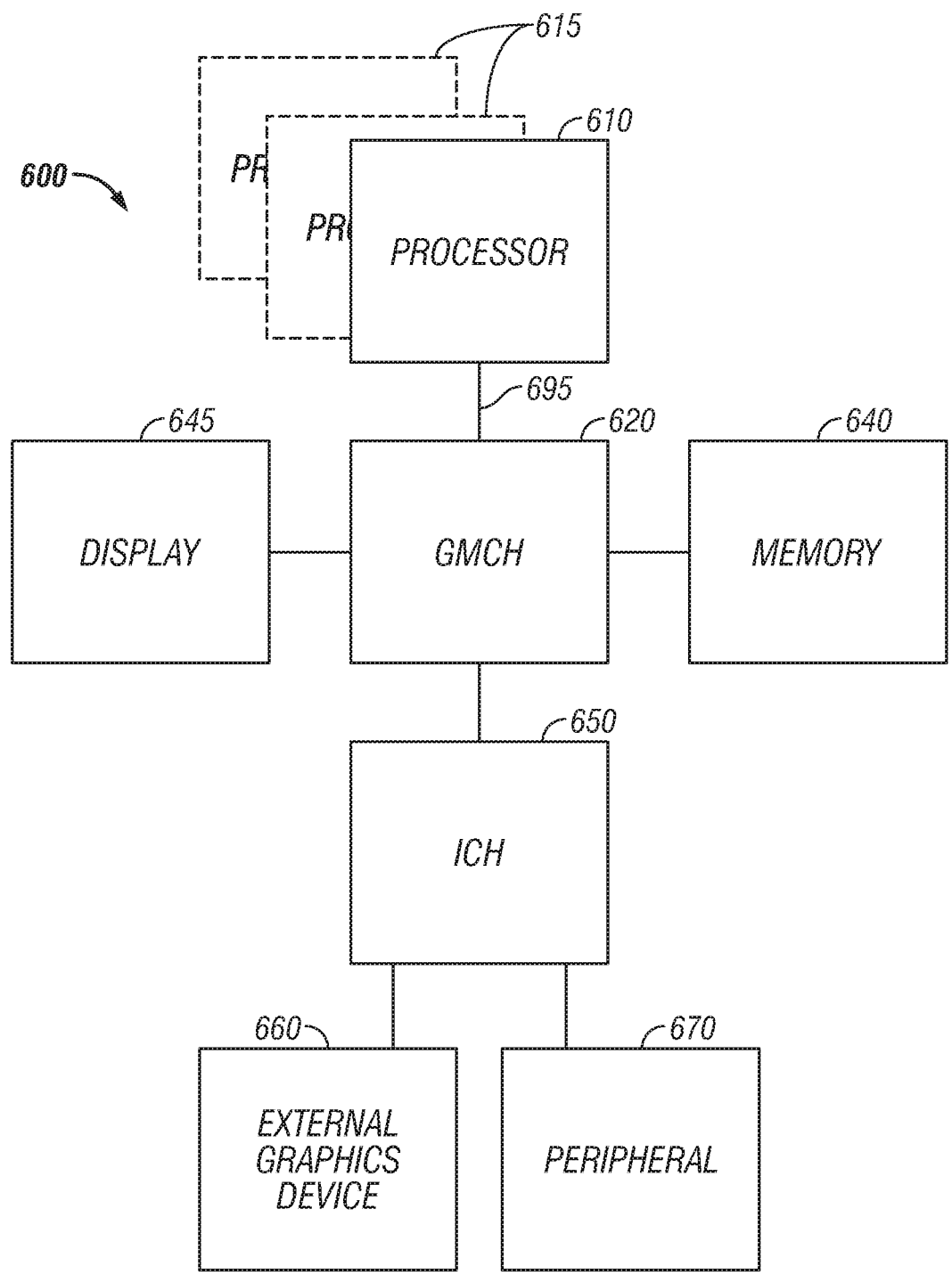
FIG. 6 is a block diagram of a system, in accordance with embodiments of the present disclosure.
Figure 7:
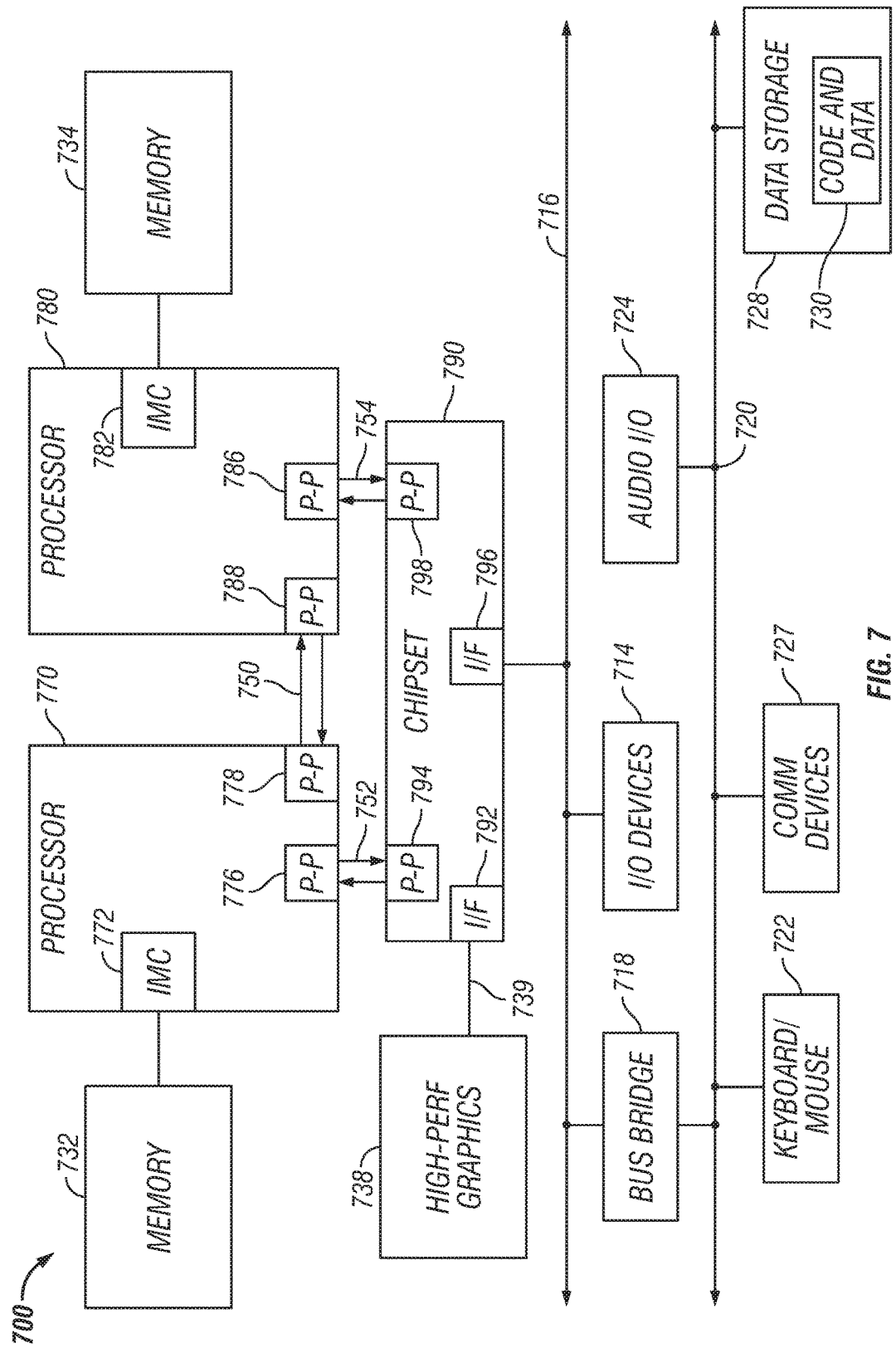
FIG. 7 is a block diagram of a second system, in accordance with embodiments of the present disclosure.
Figure 8:
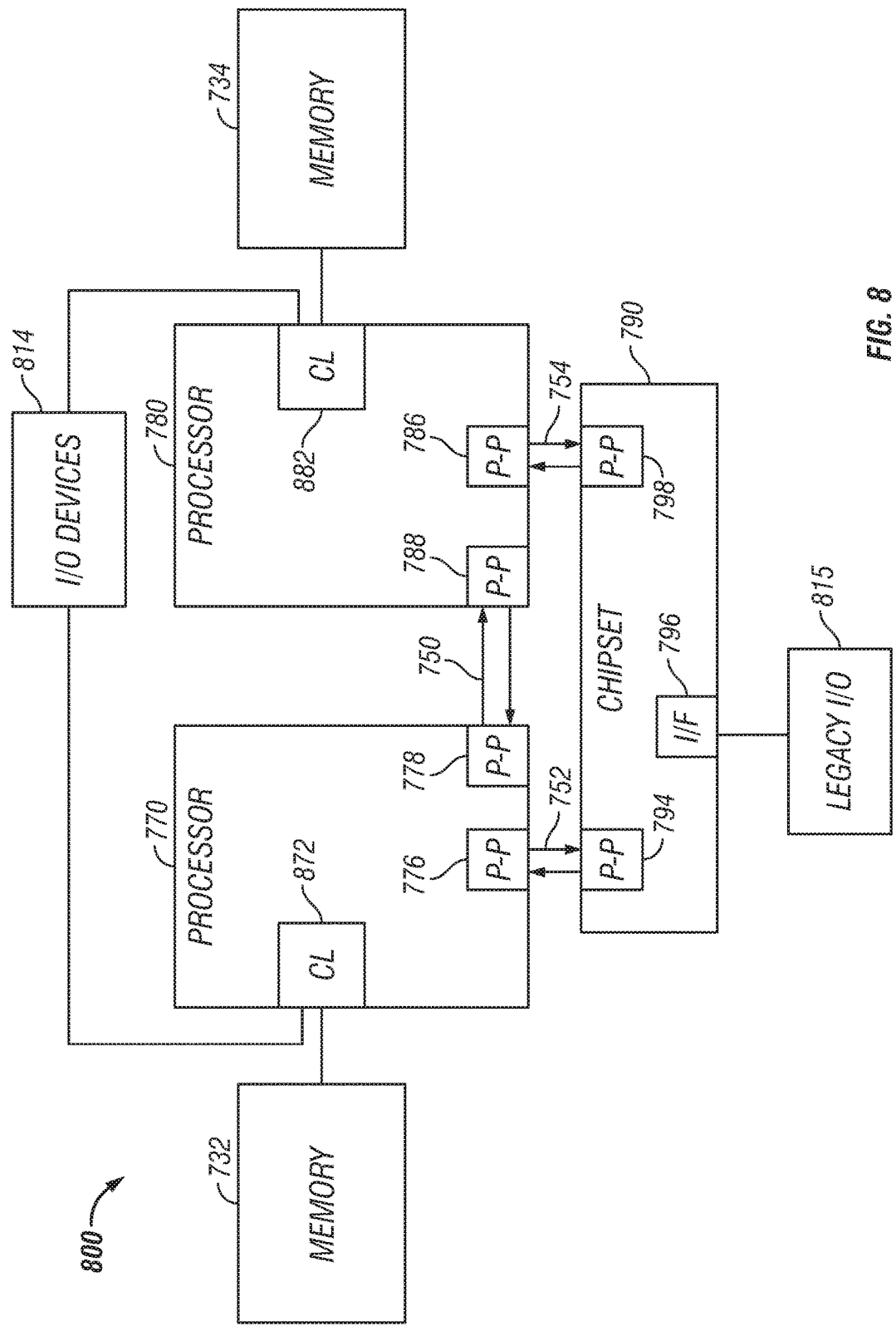
FIG. 8 is a block diagram of a third system in accordance with embodiments of the present disclosure.
Figure 9:
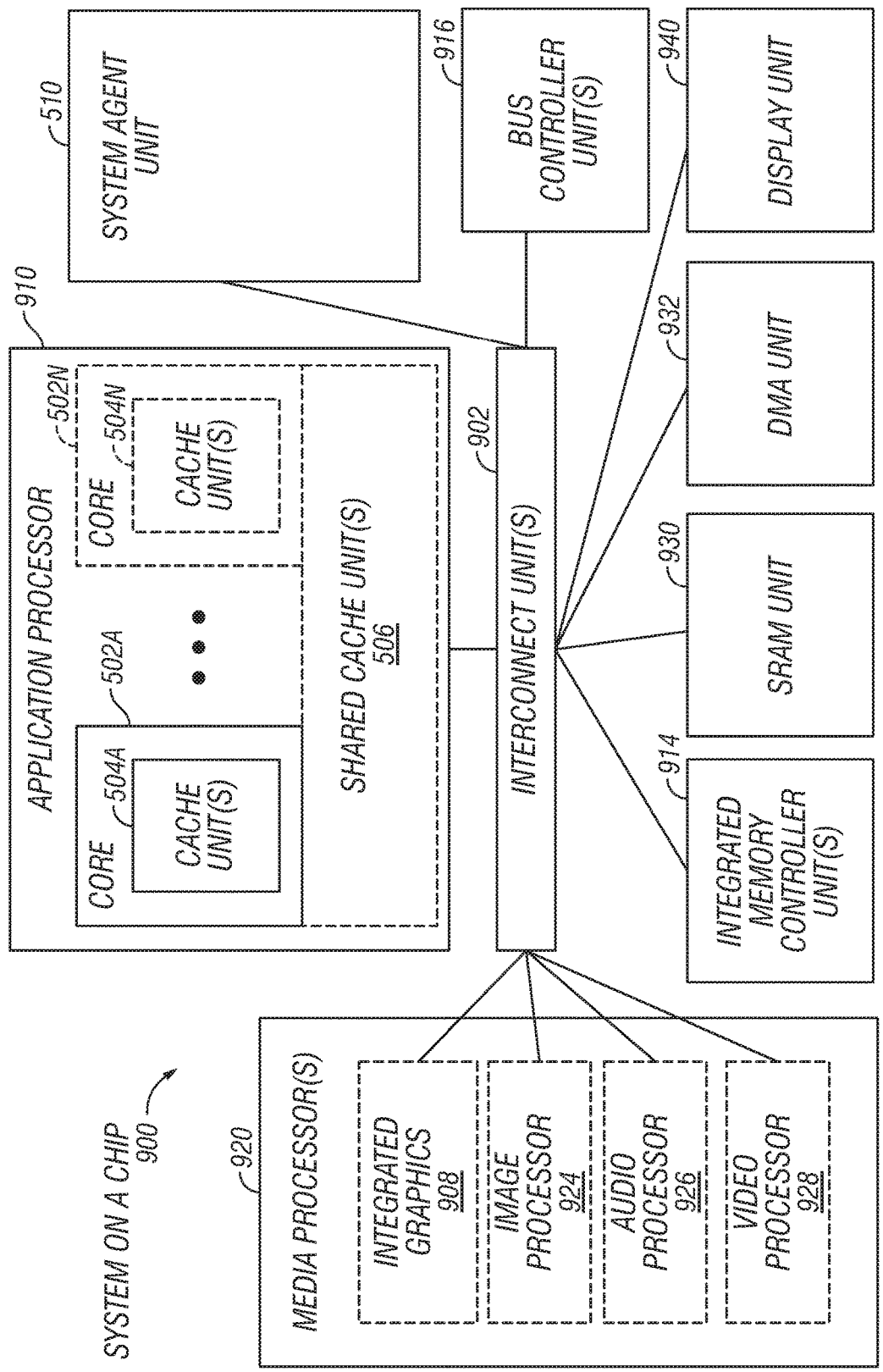
FIG. 9 is a block diagram of a system-on-a-chip, in accordance with embodiments of the present disclosure.

FIGS. 6-8 may illustrate exemplary systems suitable for including processor 500, while FIG. 9 may illustrate an exemplary system on a chip (SoC) that may include one or more of cores 502. Other system designs and implementations known in the arts for laptops, desktops, handheld PCs, personal digital assistants, engineering workstations, servers, network devices, network hubs, switches, embedded processors, digital signal processors (DSPs), graphics devices, video game devices, set-top boxes, micro controllers, cell phones, portable media players, hand held devices, and various other electronic devices, may also be suitable. In general, a huge variety of systems or electronic devices that incorporate a processor and/or other execution logic as disclosed herein may be generally suitable.

FIG. 6 illustrates a block diagram of a system 600, in accordance with embodiments of the present disclosure. System 600 may include one or more processors 610, 615, which may be coupled to graphics memory controller hub (GMCH) 620. The optional nature of additional processors 615 is denoted in FIG. 6 with broken lines.

Each processor 610,615 may be some version of processor 500. However, it should be noted that integrated graphics logic and integrated memory control units might not exist in processors 610,615. FIG. 6 illustrates that GMCH 620 may be coupled to a memory 640 that may be, for example, a dynamic random access memory (DRAM). The DRAM may, for at least one embodiment, be associated with a non-volatile cache.

GMCH 620 may be a chipset, or a portion of a chipset. GMCH 620 may communicate with processors 610, 615 and control interaction between processors 610, 615 and memory 640. GMCH 620 may also act as an accelerated bus interface between the processors 610, 615 and other elements of system 600. In one embodiment, GMCH 620 communicates with processors 610, 615 via a multi-drop bus, such as a frontside bus (FSB) 695.

Furthermore, GMCH 620 may be coupled to a display 645 (such as a flat panel display). In one embodiment, GMCH 620 may include an integrated graphics accelerator. GMCH 620 may be further coupled to an input/output (I/O) controller hub (ICH) 650, which may be used to couple various peripheral devices to system 600. External graphics device 660 may include be a discrete graphics device coupled to ICH 650 along with another peripheral device 670.

In other embodiments, additional or different processors may also be present in system 600. For example, additional processors 610, 615 may include additional processors that may be the same as processor 610, additional processors that may be heterogeneous or asymmetric to processor 610, accelerators (such as, e.g., graphics accelerators or digital signal processing (DSP) units), field programmable gate arrays, or any other processor. There may be a variety of differences between the physical resources 610, 615 in terms of a spectrum of metrics of merit including architectural, micro-architectural, thermal, power consumption characteristics, and the like. These differences may effectively manifest themselves as asymmetry and heterogeneity amongst processors 610, 615. For at least one embodiment, various processors 610, 615 may reside in the same die package.

FIG. 7 illustrates a block diagram of a second system 700, in accordance with embodiments of the present disclosure. As shown in FIG. 7, multiprocessor system 700 may include a point-to-point interconnect system, and may include a first processor 770 and a second processor 780 coupled via a point-to-point interconnect 750. Each of processors 770 and 780 may be some version of processor 500 as one or more of processors 610,615.

While FIG. 7 may illustrate two processors 770, 780, it is to be understood that the scope of the present disclosure is not so limited. In other embodiments, one or more additional processors may be present in a given processor.

Processors 770 and 780 are shown including integrated memory controller units 772 and 782, respectively. Processor 770 may also include as part of its bus controller units point-to-point (P-P) interfaces 776 and 778; similarly, second processor 780 may include P-P interfaces 786 and 788. Processors 770, 780 may exchange information via a point-to-point (P-P) interface 750 using P-P interface circuits 778, 788. As shown in FIG. 7, IMCs 772 and 782 may couple the processors to respective memories, namely a memory 732 and a memory 734, which in one embodiment may be portions of main memory locally attached to the respective processors.

Processors 770, 780 may each exchange information with a chipset 790 via individual P-P interfaces 752, 754 using point to point interface circuits 776, 794, 786, 798. In one embodiment, chipset 790 may also exchange information with a high-performance graphics circuit 738 via interface 792 over a high-performance graphics bus 739.

A shared cache (not shown) may be included in either processor or outside of both processors, yet connected with the processors via P-P interconnect, such that either or both processors' local cache information may be stored in the shared cache if a processor is placed into a low power mode.

Chipset 790 may be coupled to a first bus 716 via an interface 796. In one embodiment, first bus 716 may be a Peripheral Component Interconnect (PCI) bus, or a bus such as a PCI Express bus or another third generation I/O interconnect bus, although the scope of the present disclosure is not so limited.

As shown in FIG. 7, various I/O devices 714 may be coupled to first bus 716, along with a bus bridge 718 which couples first bus 716 to a second bus 720. In one embodiment, second bus 720 may be a low pin count (LPC) bus. Various devices may be coupled to second bus 720 including, for example, a keyboard and/or mouse 722, communication devices 727 and a storage unit 728 such as a disk drive or other mass storage device which may include instructions/code and data 730, in one embodiment. Further, an audio I/O 724 may be coupled to second bus 720. Note that other architectures may be possible. For example, instead of the point-to-point architecture of FIG. 7, a system may implement a multi-drop bus or other such architecture.

FIG. 8 illustrates a block diagram of a third system 800 in accordance with embodiments of the present disclosure. Like elements in FIGS. 7 and 8 bear like reference numerals, and certain aspects of FIG. 7 have been omitted from FIG. 8 in order to avoid obscuring other aspects of FIG. 8.

FIG. 8 illustrates that processors 870, 880 may include integrated memory and I/O control logic ("CL") 872 and 882, respectively. For at least one embodiment, CL 872, 882 may include integrated memory controller units such as that described above in connection with FIGS. 5 and 7. In addition, CL 872, 882 may also include I/O control logic. FIG. 8 illustrates that not only memories 832, 834 may be coupled to CL 872, 882, but also that I/O devices 814 may also be coupled to control logic 872, 882. Legacy I/O devices 815 may be coupled to chipset 890.

FIG. 9 illustrates a block diagram of a SoC 900, in accordance with embodiments of the present disclosure. Similar elements in FIG. 5 bear like reference numerals. Also, dashed lined boxes may represent optional features on more advanced SoCs. An interconnect units 902 may be coupled to: an application processor 910 which may include a set of one or more cores 502A-N, including respective local caches 504A-N, and shared cache units 506; a system agent unit 510; a bus controller units 916; an integrated memory controller units 914; a set or one or more media processors 920 which may include integrated graphics logic 908, an image processor 924 for providing still and/or video camera functionality, an audio processor 926 for providing hardware audio acceleration, and a video processor 928 for providing video encode/decode acceleration; an static random access memory (SRAM) unit 930; a direct memory access (DMA) unit 932; and a display unit 940 for coupling to one or more external displays.

Figure 10:
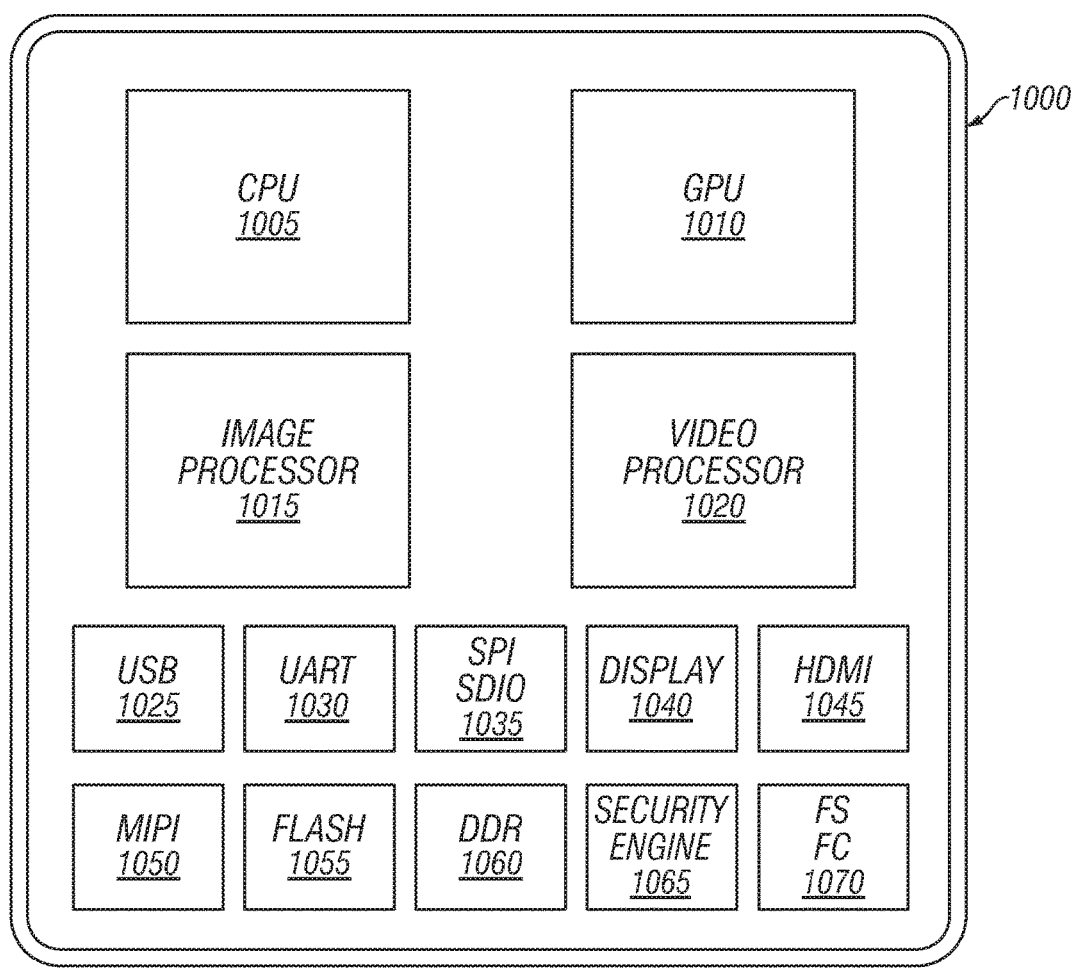
FIG. 10 illustrates a processor containing a central processing unit and a graphics processing unit which may perform at least one instruction, in accordance with embodiments of the present disclosure.

FIG. 10 illustrates a processor containing a central processing unit (CPU) and a graphics processing unit (GPU), which may perform at least one instruction, in accordance with embodiments of the present disclosure. In one embodiment, an instruction to perform operations according to at least one embodiment could be performed by the CPU. In another embodiment, the instruction could be performed by the GPU. In still another embodiment, the instruction may be performed through a combination of operations performed by the GPU and the CPU. For example, in one embodiment, an instruction in accordance with one embodiment may be received and decoded for execution on the GPU. However, one or more operations within the decoded instruction may be performed by a CPU and the result returned to the GPU for final retirement of the instruction. Conversely, in some embodiments, the CPU may act as the primary processor and the GPU as the co-processor.

In some embodiments, instructions that benefit from highly parallel, throughput processors may be performed by the GPU, while instructions that benefit from the performance of processors that benefit from deeply pipelined architectures may be performed by the CPU. For example, graphics, scientific applications, financial applications and other parallel workloads may benefit from the performance of the GPU and be executed accordingly, whereas more sequential applications, such as operating system kernel or application code may be better suited for the CPU.

In FIG. 10, processor 1000 includes a CPU 1005, GPU 1010, image processor 1015, video processor 1020, USB controller 1025, UART controller 1030, SPI/SDIO controller 1035, display device 1040, memory interface controller 1045, MIPI controller 1050, flash memory controller 1055, dual data rate (DDR) controller 1060, security engine 1065, and $I^2S/I^2C$ controller 1070. Other logic and circuits may be included in the processor of FIG. 10, including more CPUs or GPUs and other peripheral interface controllers.

One or more aspects of at least one embodiment may be implemented by representative data stored on a machine-readable medium which represents various logic within the processor, which when read by a machine causes the machine to fabricate logic to perform the techniques described herein. Such representations, known as "IP cores" may be stored on a tangible, machine-readable medium ("tape") and supplied to various customers or manufacturing facilities to load into the fabrication machines that actually make the logic or processor. For example, IP cores, such as the Cortex™ family of processors developed by ARM Holdings, Ltd. and Loongson IP cores developed the Institute of Computing Technology (ICT) of the Chinese Academy of Sciences may be licensed or sold to various customers or licensees, such as Texas Instruments, Qualcomm, Apple, or Samsung and implemented in processors produced by these customers or licensees.

Figure 11:
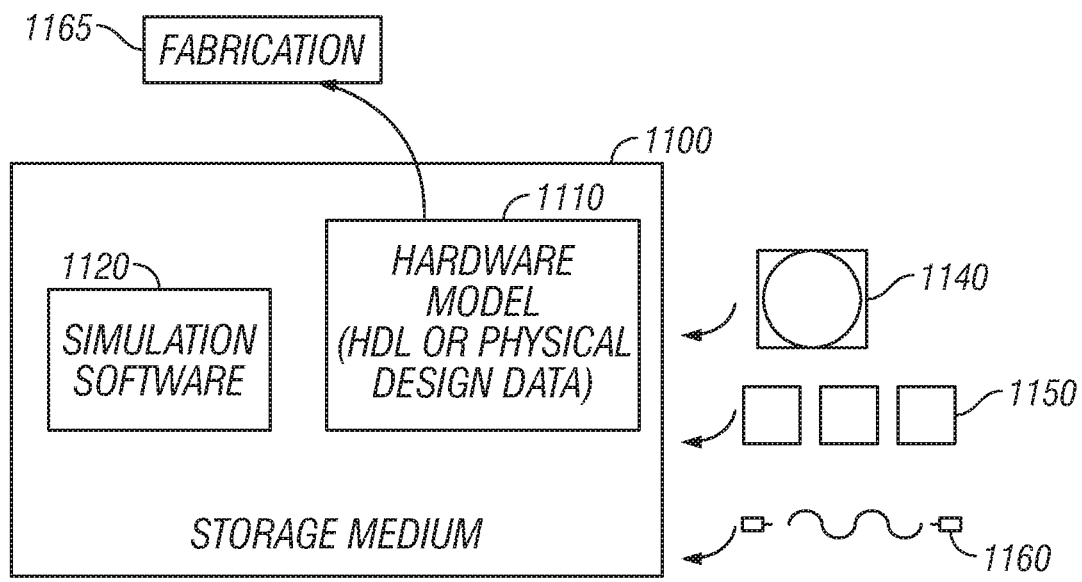
FIG. 11 is a block diagram illustrating the development of IP cores, in accordance with embodiments of the present disclosure.

FIG. 11 illustrates a block diagram illustrating the development of IP cores, in accordance with embodiments of the present disclosure. Storage 1130 may include simulation software 1120 and/or hardware or software model 1110. In one embodiment, the data representing the IP core design may be provided to storage 1130 via memory 1140 (e.g., hard disk), wired connection (e.g., internet) 1150 or wireless connection 1160. The IP core information generated by the simulation tool and model may then be transmitted to a fabrication facility where it may be fabricated by a $3^{rd}$ party to perform at least one instruction in accordance with at least one embodiment.

In some embodiments, one or more instructions may correspond to a first type or architecture (e.g., x86) and be translated or emulated on a processor of a different type or architecture (e.g., ARM). An instruction, according to one embodiment, may therefore be performed on any processor or processor type, including ARM, x86, MIPS, a GPU, or other processor type or architecture.

Figure 12:
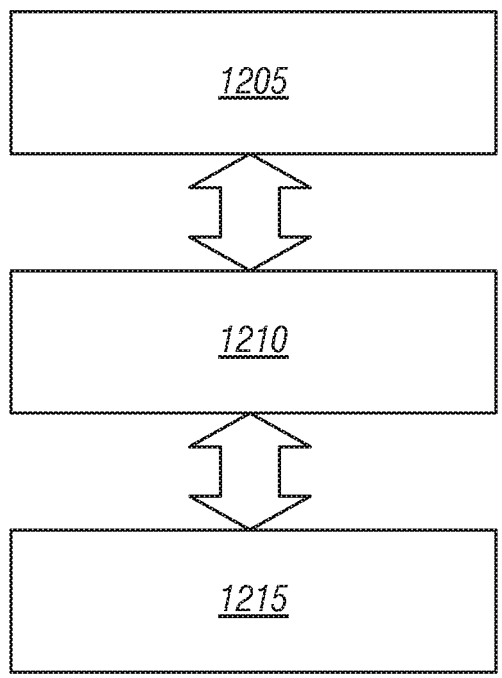
FIG. 12 illustrates how an instruction of a first type may be emulated by a processor of a different type, in accordance with embodiments of the present disclosure.

FIG. 12 illustrates how an instruction of a first type may be emulated by a processor of a different type, in accordance with embodiments of the present disclosure. In FIG. 12, program 1205 contains some instructions that may perform the same or substantially the same function as an instruction according to one embodiment. However the instructions of program 1205 may be of a type and/or format that is different from or incompatible with processor 1215, meaning the instructions of the type in program 1205 may not be able to execute natively by the processor 1215. However, with the help of emulation logic, 1210, the instructions of program 1205 may be translated into instructions that may be natively be executed by the processor 1215. In one embodiment, the emulation logic may be embodied in hardware. In another embodiment, the emulation logic may be embodied in a tangible, machine-readable medium containing software to translate instructions of the type in program 1205 into the type natively executable by processor 1215. In other embodiments, emulation logic may be a combination of fixed-function or programmable hardware and a program stored on a tangible, machine-readable medium. In one embodiment, the processor contains the emulation logic, whereas in other embodiments, the emulation logic exists outside of the processor and may be provided by a third party. In one embodiment, the processor may load the emulation logic embodied in a tangible, machine-readable medium containing software by executing microcode or firmware contained in or associated with the processor.

Figure 13:
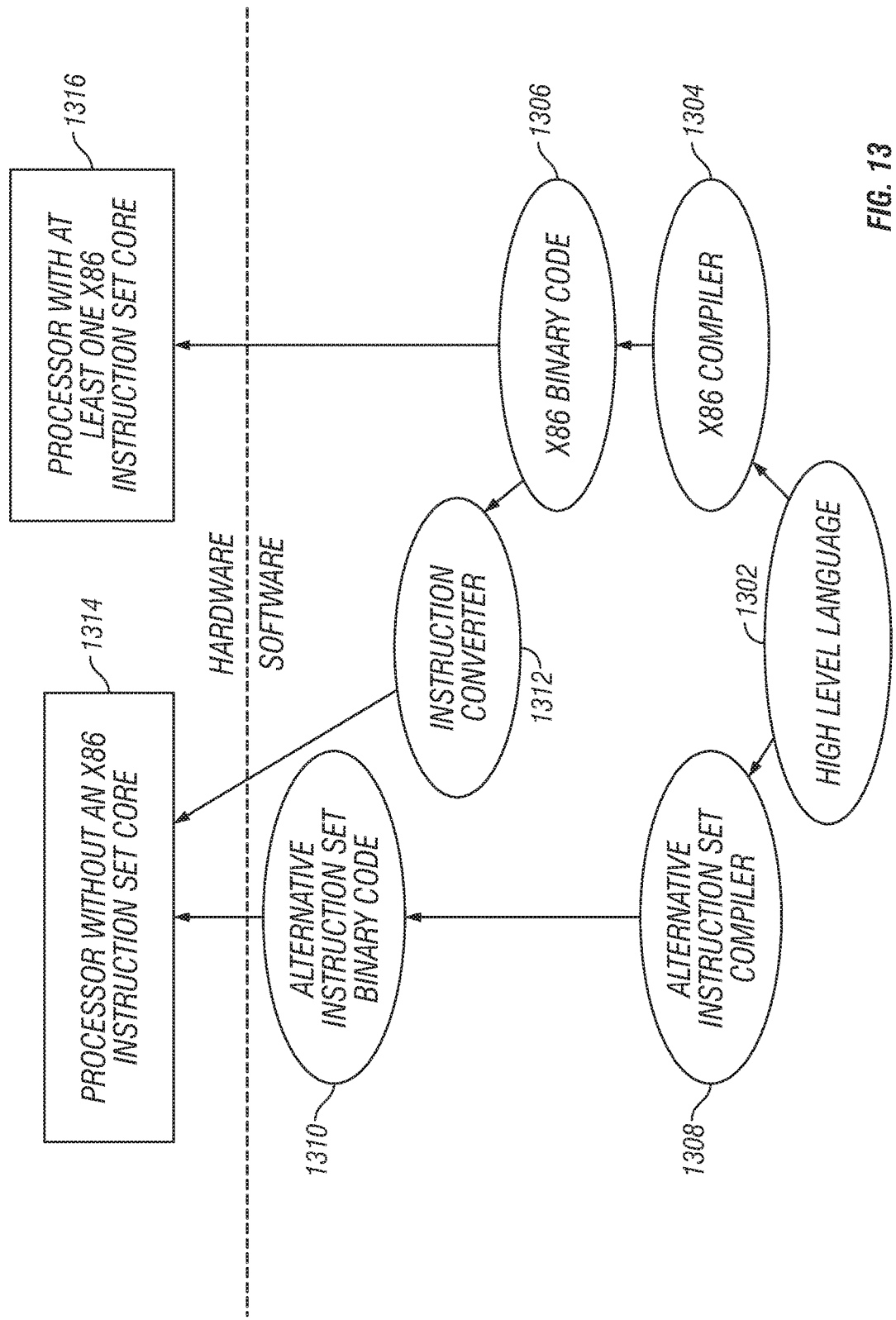
FIG. 13 illustrates a block diagram contrasting the use of a software instruction converter to convert binary instructions in a source instruction set to binary instructions in a target instruction set, in accordance with embodiments of the present disclosure.

FIG. 13 illustrates a block diagram contrasting the use of a software instruction converter to convert binary instructions in a source instruction set to binary instructions in a target instruction set, in accordance with embodiments of the present disclosure. In the illustrated embodiment, the instruction converter may be a software instruction converter, although the instruction converter may be implemented in software, firmware, hardware, or various combinations thereof. FIG. 13 shows a program in a high level language 1302 may be compiled using an x86 compiler 1304 to generate x86 binary code 1306 that may be natively executed by a processor with at least one x86 instruction set core 1316. The processor with at least one x86 instruction set core 1316 represents any processor that may perform substantially the same functions as an Intel processor with at least one x86 instruction set core by compatibly executing or otherwise processing (1) a substantial portion of the instruction set of the Intel x86 instruction set core or (2) object code versions of applications or other software targeted to run on an Intel processor with at least one x86 instruction set core, in order to achieve substantially the same result as an Intel processor with at least one x86 instruction set core. x86 compiler 1304 represents a compiler that may be operable to generate x86 binary code 1306 (e.g., object code) that may, with or without additional linkage processing, be executed on the processor with at least one x86 instruction set core 1316. Similarly, FIG. 13 shows the program in high level language 1302 may be compiled using an alternative instruction set compiler 1308 to generate alternative instruction set binary code 1310 that may be natively executed by a processor without at least one x86 instruction set core 1314 (e.g., a processor with cores that execute the MIPS instruction set of MIPS Technologies of Sunnyvale, Calif. and/or that execute the ARM instruction set of ARM Holdings of Sunnyvale, Calif.). Instruction converter 1312 may be used to convert x86 binary code 1306 into code that may be natively executed by the processor without an x86 instruction set core 1314. This converted code might not be the same as alternative instruction set binary code 1310; however, the converted code will accomplish the general operation and be made up of instructions from the alternative instruction set. Thus, instruction converter 1312 represents software, firmware, hardware, or a combination thereof that, through emulation, simulation or any other process, allows a processor or other electronic device that does not have an x86 instruction set processor or core to execute x86 binary code 1306.

Figure 14:
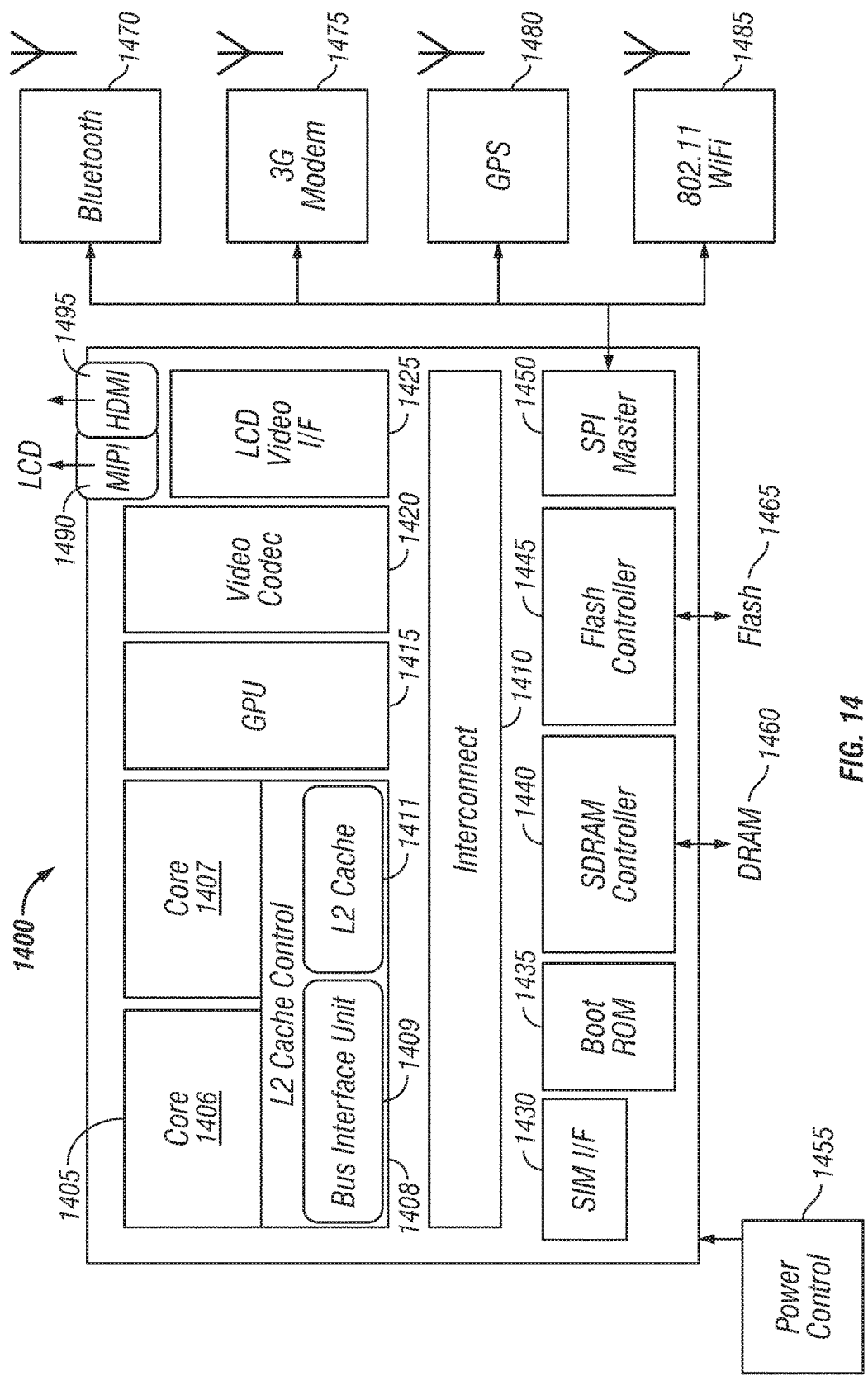
FIG. 14 is a block diagram of an instruction set architecture of a processor, in accordance with embodiments of the present disclosure.

FIG. 14 is a block diagram of an instruction set architecture 1400 of a processor, in accordance with embodiments of the present disclosure. Instruction set architecture 1400 may include any suitable number or kind of components.

For example, instruction set architecture 1400 may include processing entities such as one or more cores 1406, 1407 within a processor subsystem 1405 and a graphics processing unit 1415. Cores 1406, 1407 may be communicatively coupled to the rest of instruction set architecture 1400 through any suitable mechanism, such as through a bus or cache. In one embodiment, cores 1406, 1407 may be communicatively coupled through an L2 cache control 1408, which may include a bus interface unit 1409 and an L2 cache 1411. Cores 1406, 1407 and graphics processing unit 1415 may be communicatively coupled to each other and to the remainder of instruction set architecture 1400 through interconnect 1410. In one embodiment, graphics processing unit 1415 may use a video code 1420 defining the manner in which particular video signals will be encoded and decoded for output.

Instruction set architecture 1400 may also include any number or kind of interfaces, controllers, or other mechanisms for interfacing or communicating with other portions of an electronic device or system. Such mechanisms may facilitate interaction with, for example, peripherals, communications devices, other processors, or memory. In the example of FIG. 14, instruction set architecture 1400 may include a liquid crystal display (LCD) video interface 1425, a subscriber interface module (SIM) interface 1430, a boot ROM interface 1435, a synchronous dynamic random access memory (SDRAM) controller 1440, a flash controller 1445, and a serial peripheral interface (SPI) master unit 1450. LCD video interface 1425 may provide output of video signals from, for example, GPU 1415 and through, for example, a mobile industry processor interface (MIPI) 1490 or a high-definition multimedia interface (HDMI) 1495 to a display. Such a display may include, for example, an LCD. SIM interface 1430 may provide access to or from a SIM card or device. SDRAM controller 1440 may provide access to or from memory such as an SDRAM chip or module. Flash controller 1445 may provide access to or from memory such as flash memory or other instances of RAM. SPI master unit 1450 may provide access to or from communications modules, such as a Bluetooth module 1470, high-speed 3G modem 1475, global positioning system module 1480, or wireless module 1485 implementing a communications standard such as 802.11. Instruction set architecture 1400 may further include a power control unit 1455.

Figure 15:
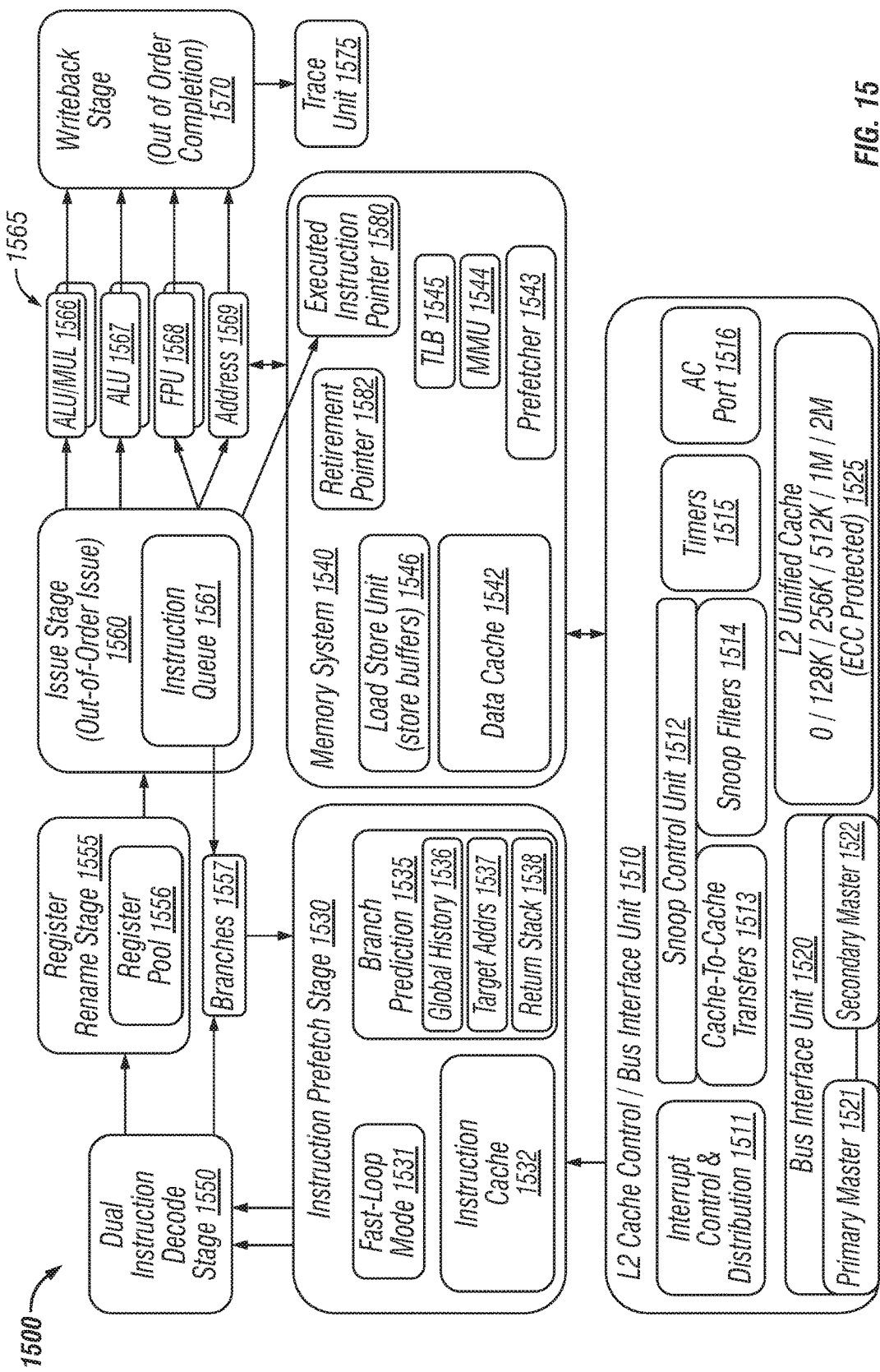
FIG. 15 is a more detailed block diagram of an instruction set architecture of a processor, in accordance with embodiments of the present disclosure.

FIG. 15 is a more detailed block diagram of an instruction set architecture 1500 of a processor, in accordance with embodiments of the present disclosure. Instruction architecture 1500 may implement one or more aspects of instruction set architecture 1400. Furthermore, instruction set architecture 1500 may illustrate modules and mechanisms for the execution of instructions within a processor.

Instruction architecture 1500 may include a memory system 1540 communicatively coupled to one or more execution entities 1565. Furthermore, instruction architecture 1500 may include a caching and bus interface unit such as unit 1510 communicatively coupled to execution entities 1565 and memory system 1540. In one embodiment, loading of instructions into execution entities 1564 may be performed by one or more stages of execution. Such stages may include, for example, instruction prefetch stage 1530, dual instruction decode stage 1550, register rename stage 155, issue stage 1560, and writeback stage 1570.

In one embodiment, memory system 1540 may include an executed instruction pointer 1580. Executed instruction pointer 1580 may store a value identifying the oldest, undispatched instruction within a batch of instructions. The oldest instruction may correspond to the lowest Program Order (PO) value. A PO may include a unique number of an instruction. Such an instruction may be a single instruction within a thread represented by multiple strands. A PO may be used in ordering instructions to ensure correct execution semantics of code. A PO may be reconstructed by mechanisms such as evaluating increments to PO encoded in the instruction rather than an absolute value. Such a reconstructed PO may be known as an "RPO." Although a PO may be referenced herein, such a PO may be used interchangeably with an RPO. A strand may include a sequence of instructions that are data dependent upon each other. The strand may be arranged by a binary translator at compilation time. Hardware executing a strand may execute the instructions of a given strand in order according to PO of the various instructions. A thread may include multiple strands such that instructions of different strands may depend upon each other. A PO of a given strand may be the PO of the oldest instruction in the strand which has not yet been dispatched to execution from an issue stage. Accordingly, given a thread of multiple strands, each strand including instructions ordered by PO, executed instruction pointer 1580 may store the oldest—illustrated by the lowest number—PO in the thread.

In another embodiment, memory system 1540 may include a retirement pointer 1582. Retirement pointer 1582 may store a value identifying the PO of the last retired instruction. Retirement pointer 1582 may be set by, for example, retirement unit 454. If no instructions have yet been retired, retirement pointer 1582 may include a null value.

Execution entities 1565 may include any suitable number and kind of mechanisms by which a processor may execute instructions. In the example of FIG. 15, execution entities 1565 may include ALU/multiplication units (MUL) 1566, ALUs 1567, and floating point units (FPU) 1568. In one embodiment, such entities may make use of information contained within a given address 1569. Execution entities 1565 in combination with stages 1530, 1550, 1555, 1560, 1570 may collectively form an execution unit.

Unit 1510 may be implemented in any suitable manner. In one embodiment, unit 1510 may perform cache control. In such an embodiment, unit 1510 may thus include a cache 1525. Cache 1525 may be implemented, in a further embodiment, as an L2 unified cache with any suitable size, such as zero, 128 k, 256 k, 512 k, 1M, or 2M bytes of memory. In another, further embodiment, cache 1525 may be implemented in error-correcting code memory. In another embodiment, unit 1510 may perform bus interfacing to other portions of a processor or electronic device. In such an embodiment, unit 1510 may thus include a bus interface unit 1520 for communicating over an interconnect, intraprocessor bus, interprocessor bus, or other communication bus, port, or line. Bus interface unit 1520 may provide interfacing in order to perform, for example, generation of the memory and input/output addresses for the transfer of data between execution entities 1565 and the portions of a system external to instruction architecture 1500.

To further facilitate its functions, bus interface unit 1510 may include an interrupt control and distribution unit 1511 for generating interrupts and other communications to other portions of a processor or electronic device. In one embodiment, bus interface unit 1510 may include a snoop control unit 1512 that handles cache access and coherency for multiple processing cores. In a further embodiment, to provide such functionality, snoop control unit 1512 may include a cache-to-cache transfer unit 1513 that handles information exchanges between different caches. In another, further embodiment, snoop control unit 1512 may include one or more snoop filters 1514 that monitors the coherency of other caches (not shown) so that a cache controller, such as unit 1510, does not have to perform such monitoring directly. Unit 1510 may include any suitable number of timers 1515 for synchronizing the actions of instruction architecture 1500. Also, unit 1510 may include an AC port 1516.

Memory system 1540 may include any suitable number and kind of mechanisms for storing information for the processing needs of instruction architecture 1500. In one embodiment, memory system 1540 may include a load store unit 1546 for storing information such as buffers written to or read back from memory or registers and a data cache 1542. In another embodiment, memory system 1540 may include a translation lookaside buffer (TLB) 1545 that provides look-up of address values between physical and virtual addresses. In yet another embodiment, bus interface unit 1520 may include a memory management unit (MMU) 1544 for facilitating access to virtual memory. In still yet another embodiment, memory system 1540 may include a prefetcher 1543 for requesting instructions from memory before such instructions are actually needed to be executed, in order to reduce latency.

The operation of instruction architecture 1500 to execute an instruction may be performed through different stages. For example, using unit 1510 instruction prefetch stage 1530 may access an instruction through prefetcher 1543. Instructions retrieved may be stored in instruction cache 1532. Prefetch stage 1530 may enable an option 1531 for fast-loop mode, wherein a series of instructions forming a loop that is small enough to fit within a given cache are executed. In one embodiment, such an execution may be performed without needing to access additional instructions from, for example, instruction cache 1532. Determination of what instructions to prefetch may be made by, for example, branch prediction unit 1535, which may access indications of execution in global history 1536, indications of target addresses 1537, or contents of a return stack 1538 to determine which of branches 1557 of code will be executed next. Such branches may be possibly prefetched as a result. Branches 1557 may be produced through other stages of operation as described below. Instruction prefetch stage 1530 may provide instructions as well as any predictions about future instructions to dual instruction decode stage.

Dual instruction decode stage 1550 may translate a received instruction into microcode-based instructions that may be executed. Dual instruction decode stage 1550 may simultaneously decode two instructions per clock cycle. Furthermore, dual instruction decode stage 1550 may pass its results to register rename stage 1555. In addition, dual instruction decode stage 1550 may determine any resulting branches from its decoding and eventual execution of the microcode. Such results may be input into branches 1557.

Register rename stage 1555 may translate references to virtual registers or other resources into references to physical registers or resources. Register rename stage 1555 may include indications of such mapping in a register pool 1556. Register rename stage 1555 may alter the instructions as received and send the result to issue stage 1560.

Issue stage 1560 may issue or dispatch commands to execution entities 1565. Such issuance may be performed in an out-of-order fashion. In one embodiment, multiple instructions may be held at issue stage 1560 before being executed. Issue stage 1560 may include an instruction queue 1561 for holding such multiple commands. Instructions may be issued by issue stage 1560 to a particular processing entity 1565 based upon any acceptable criteria, such as availability or suitability of resources for execution of a given instruction. In one embodiment, issue stage 1560 may reorder the instructions within instruction queue 1561 such that the first instructions received might not be the first instructions executed. Based upon the ordering of instruction queue 1561, additional branching information may be provided to branches 1557. Issue stage 1560 may pass instructions to executing entities 1565 for execution.

Upon execution, writeback stage 1570 may write data into registers, queues, or other structures of instruction set architecture 1500 to communicate the completion of a given command. Depending upon the order of instructions arranged in issue stage 1560, the operation of writeback stage 1570 may enable additional instructions to be executed. Performance of instruction set architecture 1500 may be monitored or debugged by trace unit 1575.

Figure 16:
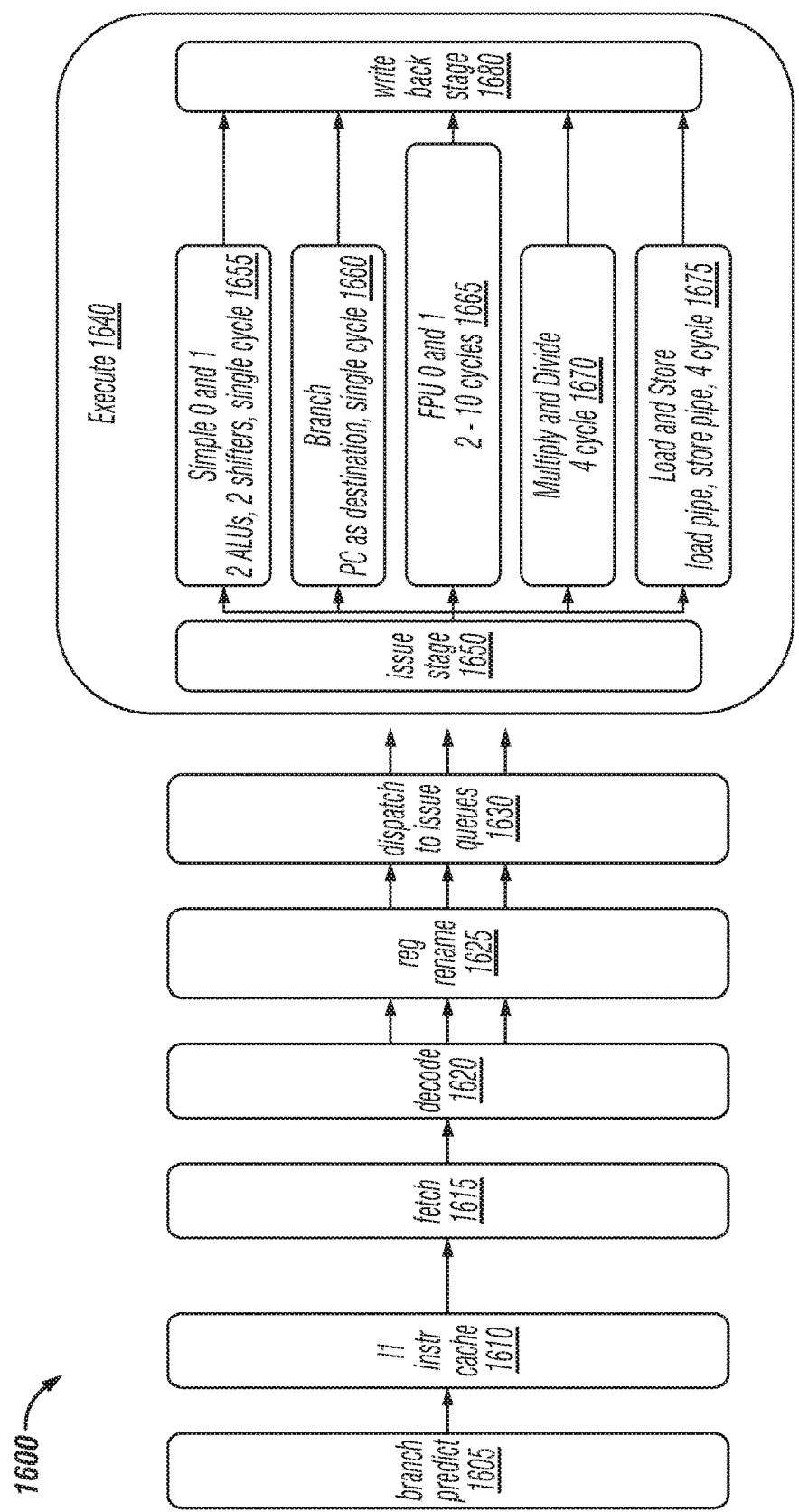
FIG. 16 is a block diagram of an execution pipeline for an instruction set architecture of a processor, in accordance with embodiments of the present disclosure.

FIG. 16 is a block diagram of an execution pipeline 1600 for an instruction set architecture of a processor, in accordance with embodiments of the present disclosure. Execution pipeline 1600 may illustrate operation of, for example, instruction architecture 1500 of FIG. 15.

Execution pipeline 1600 may include any suitable combination of steps or operations. In 1605, predictions of the branch that is to be executed next may be made. In one embodiment, such predictions may be based upon previous executions of instructions and the results thereof. In 1610, instructions corresponding to the predicted branch of execution may be loaded into an instruction cache. In 1615, one or more such instructions in the instruction cache may be fetched for execution. In 1620, the instructions that have been fetched may be decoded into microcode or more specific machine language. In one embodiment, multiple instructions may be simultaneously decoded. In 1625, references to registers or other resources within the decoded instructions may be reassigned. For example, references to virtual registers may be replaced with references to corresponding physical registers. In 1630, the instructions may be dispatched to queues for execution. In 1640, the instructions may be executed. Such execution may be performed in any suitable manner. In 1650, the instructions may be issued to a suitable execution entity. The manner in which the instruction is executed may depend upon the specific entity executing the instruction. For example, at 1655, an ALU may perform arithmetic functions. The ALU may utilize a single clock cycle for its operation, as well as two shifters. In one embodiment, two ALUs may be employed, and thus two instructions may be executed at 1655. At 1660, a determination of a resulting branch may be made. A program counter may be used to designate the destination to which the branch will be made. 1660 may be executed within a single clock cycle. At 1665, floating point arithmetic may be performed by one or more FPUs. The floating point operation may require multiple clock cycles to execute, such as two to ten cycles. At 1670, multiplication and division operations may be performed. Such operations may be performed in four clock cycles. At 1675, loading and storing operations to registers or other portions of pipeline 1600 may be performed. The operations may include loading and storing addresses. Such operations may be performed in four clock cycles. At 1680, write-back operations may be performed as required by the resulting operations of 1655-1675.

Figure 17:
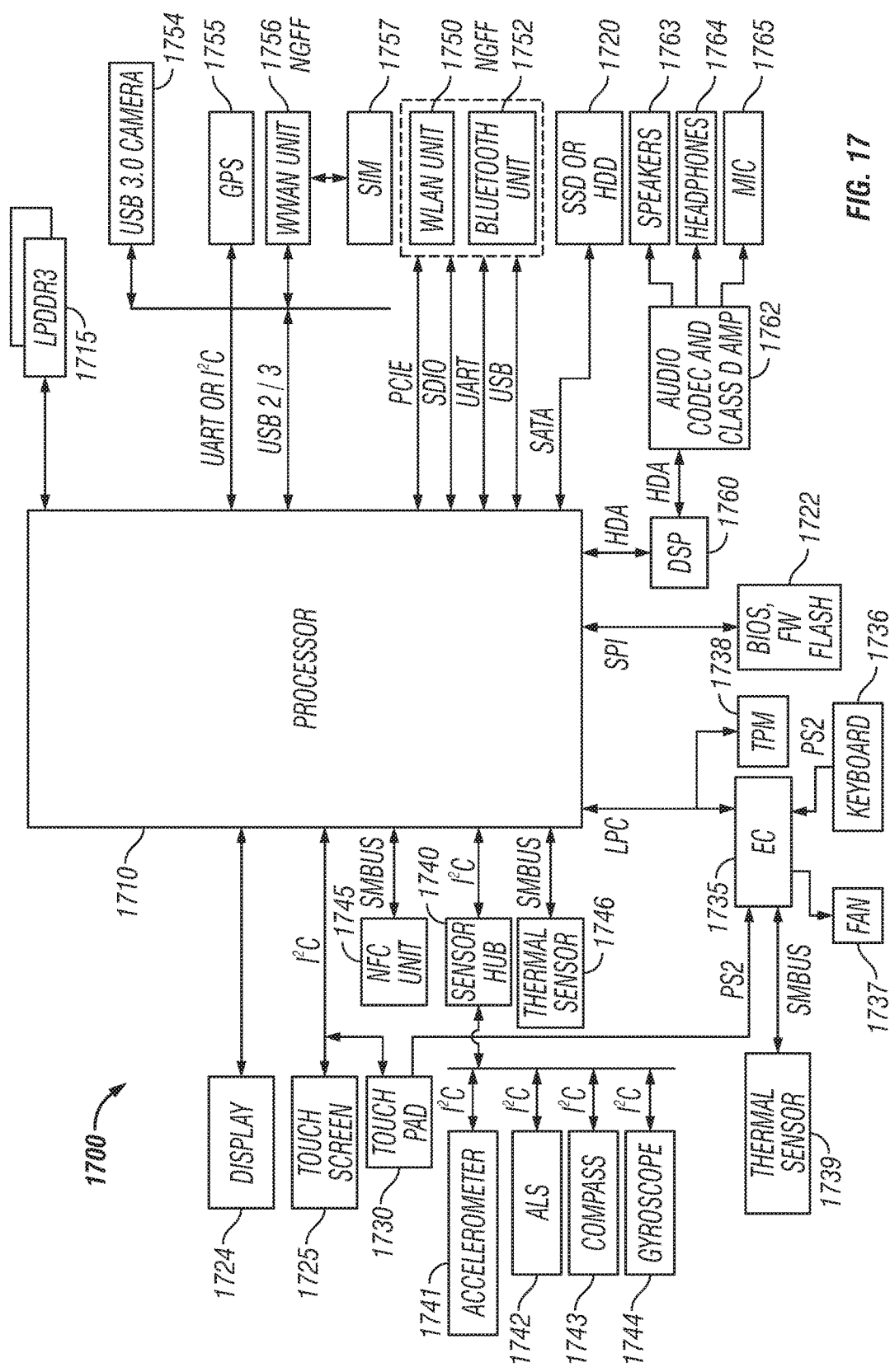
FIG. 17 is a block diagram of an electronic device for utilizing a processor, in accordance with embodiments of the present disclosure.

FIG. 17 is a block diagram of an electronic device 1700 for utilizing a processor 1710, in accordance with embodiments of the present disclosure. Electronic device 1700 may include, for example, a notebook, an ultrabook, a computer, a tower server, a rack server, a blade server, a laptop, a desktop, a tablet, a mobile device, a phone, an embedded computer, or any other suitable electronic device.

Electronic device 1700 may include processor 1710 communicatively coupled to any suitable number or kind of components, peripherals, modules, or devices. Such coupling may be accomplished by any suitable kind of bus or interface, such as I$^2$C bus, system management bus (SMBus), low pin count (LPC) bus, SPI, high definition audio (HDA) bus, Serial Advance Technology Attachment (SATA) bus, USB bus (versions 1, 2, 3), or Universal Asynchronous Receiver/Transmitter (UART) bus.

Such components may include, for example, a display 1724, a touch screen 1725, a touch pad 1730, a near field communications (NFC) unit 1745, a sensor hub 1740, a thermal sensor 1746, an express chipset (EC) 1735, a trusted platform module (TPM) 1738, BIOS/firmware/flash memory 1722, a digital signal processor 1760, a drive 1720 such as a solid state disk (SSD) or a hard disk drive (HDD), a wireless local area network (WLAN) unit 1750, a Bluetooth unit 1752, a wireless wide area network (WWAN) unit 1756, a global positioning system (GPS) 1755, a camera 1754 such as a USB 3.0 camera, or a low power double data rate (LPDDR) memory unit 1715 implemented in, for example, the LPDDR3 standard. These components may each be implemented in any suitable manner.

Furthermore, in various embodiments other components may be communicatively coupled to processor 1710 through the components discussed above. For example, an accelerometer 1741, ambient light sensor (ALS) 1742, compass 1743, and gyroscope 1744 may be communicatively coupled to sensor hub 1740. A thermal sensor 1739, fan 1737, keyboard 1746, and touch pad 1730 may be communicatively coupled to EC 1735. Speaker 1763, headphones 1764, and a microphone 1765 may be communicatively coupled to an audio unit 1764, which may in turn be communicatively coupled to DSP 1760. Audio unit 1764 may include, for example, an audio codec and a class D amplifier. A SIM card 1757 may be communicatively coupled to WWAN unit 1756. Components such as WLAN unit 1750 and Bluetooth unit 1752, as well as WWAN unit 1756 may be implemented in a next generation form factor (NGFF).

Figure 18:
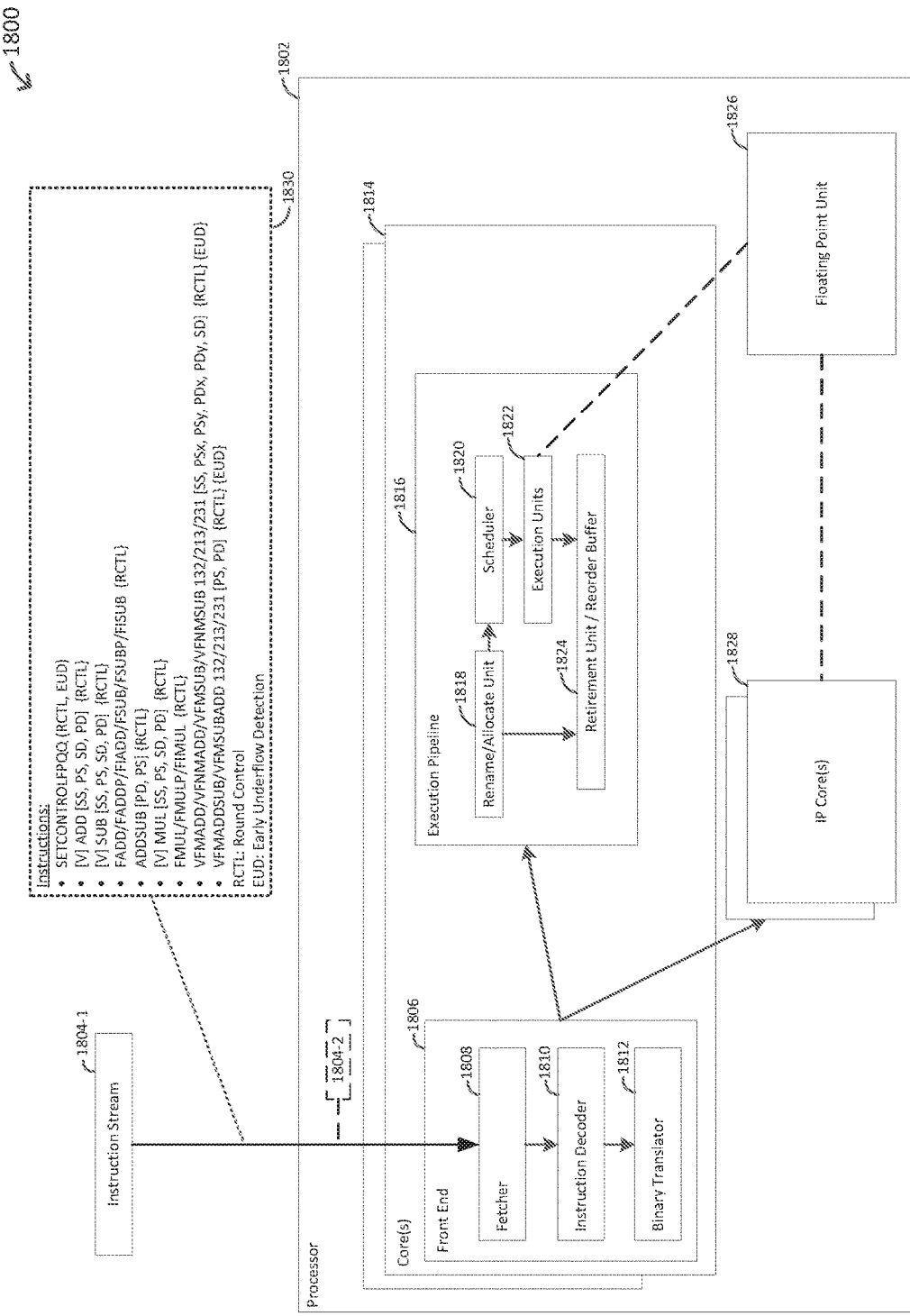
FIG. 18 is a block diagram of a system for early underflow detection and rounder bypass, in accordance with embodiments of the present disclosure.

Embodiments of the present disclosure involve an instruction and processing logic for early underflow detection and rounder bypass. FIG. 18 is an illustration of an example embodiment of a system 1800 having an instruction and logic for early underflow detection and rounder bypass, in accordance with embodiments of the present disclosure. System 1800 may include any suitable number and kind of elements to perform the operations described herein, including a processor, SoC, integrated circuit, or other mechanism. Furthermore, although specific elements of system 1800 may be described herein as performing a specific function, any suitable portion of 1800 may perform the functionality described herein. For example, system 1800 may include processor 1802. Although processor 1802 is shown and described as an example in FIG. 18, any suitable mechanism may be used. Processor 1802 may include any suitable mechanism for early underflow detection and rounder bypass, including an implementation in hardware. Processor 1802 may be implemented fully or in part by the elements described in FIGS. 1-17.

System 1800 may include a floating point unit (FPU) 1826 for executing floating point instructions. FPU 1826 may be in any suitable portion of system 1800. In one embodiment, FPU 1826 may be implemented as one of the execution units 1822 within an in-order or out-of-order execution pipeline 1816. Execution pipeline 1816 may be included in core(s) 1814 of processor 1802. In another embodiment, FPU 1826 may be implemented within intellectual property core(s) 1828 separate from main core(s) 1814 of processor 1802. FPU 1826 may be implemented by any suitable combination of circuitry or hardware computational logic of a processor.

FPU 1826 may include processing for any type of floating point operation, including fused floating point operations, such as Fused Multiply-Add (FMA) instructions, or Single Instruction Multiple Data (SIMD) operations, such as Advanced Vector Extension (AVX) instructions. FPU 1826 may support processing of floating point numbers of any suitable size, including single precision 32-bit floating point numbers or double precision 64-bit floating point numbers.

Floating point representation provides for a significand, base, and exponent, in which the significand (or coefficient) is multiplied by the base to the power of the exponent. In system 1800, the base may be 2 representing binary arithmetic. The exponent may be offset with a bias value to represent both positive and negative exponents. The significand may be represented by a sign and a mantissa with an implicit leading value and a fraction. For example, the significand −1.101 in binary may have a sign representing negative values, an implicit leading value of 1, and a fraction of 101.

Floating point operations may provide a result that includes an unrounded fraction. The unrounded fraction may be greater in length than the length of the fraction supported in a given floating point representation, which may result in one or more bits in the unrounded fraction being lost. The unrounded fraction may be rounded to provide an indication of the bits lost. The bits of precision to be lost may include bits related to rounding operations, including a guard bit, a round bit, and/or a sticky bit. The guard bit may represent the most significant bit of the bits of precision to be lost. The round bit may represent the second most significant bit of the bits of precision to be lost. The sticky bit may indicate whether any of the bits of precision to be lost, other than the guard bit or the round bit, have a value of 1. For example, the bits of precision to be lost may be 1000010. The guard bit may be 1, the most significant bit among the bits of precision to be lost. The round bit may be 0, the second most significant bit among the bits of precision to be lost. The remaining bits of precision to be lost may be 00010. The sticky bit may be 1, indicating that at least one of the remaining bits of precision to be lost has a value of 1. Accordingly, the sticky bit may be 0 if all of the remaining bits of precision to be lost have a value of 0. Although a guard bit, round bit, and sticky bit are described, rounding of floating point fractions may use any number of bits to represent the bits of precision to be lost.

Rounding of unrounded fractions may occur in any suitable manner or mode. For example, the unrounded fraction may be rounded using a round up (RUP) mode. In round up mode, the fraction may be rounded up to a value greater than the unrounded value. If the unrounded significand is 1.10111, for example, and the bits of precision to be lost are 11, the two least significant bits, the rounded significand may be 1.110. If the unrounded significand is −1.10111 and the bits of precision to be lost are 11, the two least significant bits, the rounded significand may be −1.100. Accordingly, in RUP mode, the fraction of a mantissa of a positive significand may be rounded up and the fraction of a mantissa of a negative significand may be rounded down. As another example, the unrounded fraction may be rounded using a round down (RDN) mode or round to zero (RTZ) mode. In round down mode, the fraction may be rounded down to a value less than the unrounded value. In round to zero mode, the fraction may be rounded toward the value of zero. Accordingly, in RDN or RTZ mode, the fraction of a mantissa of a positive significand may be rounded down and the fraction of a mantissa of a negative significand may be rounded up. As a further example, the unrounded fraction may be rounded using a nearest even value (RNE) mode. If the unrounded significand is 1.10101, for example, and the bits of precision to be lost are 01, the two least significant bits, the rounded significand may be 1.101. If the unrounded significand is 1.10111, as another example, and the bits of precision to be lost are 11, the two least significant bits, the rounded significand may be 1.110. Accordingly, in RNE mode, the bits of precision to be lost determine whether the unrounded fraction of the mantissa of the significand is rounded up, rounded down, or truncated.

Floating point units may be used in deep-learning, convolutional neural networks (CNN), and/or other applications, including mobile and desktop computing, to represent numbers in scientific notation. These applications may repeatedly perform floating point operations, which may use the floating point unit. In some of these applications, the result of a previous floating point operation may be a source operand or input to the next floating point operation. Accordingly, the floating point operations in the application may not be able to be executed in parallel, and the latency of each floating point operation may be important to the performance of the application. Each floating point operation may include determining a raw result, performing normalization of the raw result, rounding the normalized result, adjusting the exponent of the rounded result, checking the sign of the adjusted exponent, and detecting underflow of the result with the adjusted exponent.

In at least some embodiments of the present disclosure, FPU 1826 may include circuitry to detect underflow early and to bypass floating point rounding for certain floating point operations. Early detection of underflow may occur before performing normalization of the raw result. Floating point rounding may be bypassed for floating point operations in which the result of the operation is an input for the next floating point operation, in which an unrounded result bypass extension to the unrounded floating point result may be generated and forwarded to the next floating point operation. Instructions that provide for early detection of underflow and/or rounder bypass may include a flag, designator, or indicator to control whether FPU 1826 detects underflow early and/or bypasses rounding.

During execution of a floating point application, or any other application, instructions may be received from instruction stream 1804, which may reside within a memory subsystem of system 1800. Instruction stream 1804 may be included in any suitable portion of processor 1802 or system 1800. In one embodiment, instruction stream 1804-1 may be included in an SoC, system, or other mechanism. In another embodiment, instruction stream 1804-2 may be included in processor 1800, an integrated circuit, or another mechanism. Core(s) 1814 of processor 1802 may include a front end 1806 to receive or retrieve instructions from any suitable location, including a cache or memory. Instructions may include instruction stream 1804. Front end 1806 may include a fetcher 1808 to fill the execution pipeline efficiently with possible instructions to execute. Front end 1806 may include an instruction decoder 1810 to decode an instruction into opcodes for execution, which may determine the meaning, side effects, data required, data consumed, and data to be produced for the instruction. A binary translator 1812 may be used to optimize or improve the efficiency of code.

In some embodiments, the decoded instructions may be passed to an out-of-order or in-order execution unit 1822 in an execution pipeline 1816. Execution pipeline 1816 may include a rename and allocate unit 1818 for renaming instructions for out-of-order execution, and a reorder buffer (ROB) coextensive with a retirement unit 1824 so that instructions may appear to be retired in the order that they were received. Rename and allocate unit 1818 may further rename or allocate resources for execution of multiple instructions in parallel. Scheduler 1820 may schedule or allocate instructions to execute on execution units 1822 when inputs are available. Outputs of execution units 1822 may queue in the ROB 1824. Front end 1806 may attempt to anticipate any behaviors that will prevent instructions from executing in a sequential stream and may fetch streams of instructions that might execute. When there is, for example, a misprediction of a branch, the ROB 1824 may inform the front-end 1806 and a different set of instructions might be executed instead. Front end 1806 may store data such as metadata for branch prediction. The instructions may be retired as if they were executed in program order. Various portions of such execution pipelining may be performed by one or more cores 1814. Each core 1814 may include one or more threads or logical cores for execution.

Execution units 1822 may include FPU 1826. Although FPU 1826 is described as a portion of a core, the circuitry may reside in any suitable portion of processor 1802, including but not limited to IP Core(s) 1828. Processor 1802 may recognize, either implicitly or through decoding and execution of specific instructions, that a floating point operation is needed for an instruction. FPU 1826 may be targeted by specific instructions in instruction stream 1804. Such specific instructions may be generated by, for example, a compiler, or may be designed by a drafter of code resulting in instruction stream 1804. The floating point instructions may be included in a library defined for execution by processor 1802 or FPU 1826. FPU 1826 may be targeted by portions of processor 1802. For example, if processor 1802 recognizes an attempt in instruction stream 1804 to execute a floating point instruction where the result of the operation associated with the instruction is an input to another floating point operation, processor 1802 may direct the floating point instruction to FPU 1826, or may direct execution unit(s) 1822 to interface with FPU 1826.

Instructions 1830 may represent floating point operations that may configure or use FPU 1826. A round control (RCTL) parameter may be defined using a separate instruction or by including an extra operand in an instruction calculating a floating point result. The RCTL parameter may indicate whether to enable rounder bypass for the instruction. An early underflow detection (EUD) parameter may be defined using a separate instruction, the same instruction as the RCTL parameter, or by including an extra operand in an instruction calculating a floating point result.

In one example, a SETCONTROLFPQQ instruction with RCTL and/or EUD parameters may define the appropriate field or fields in a control register associated with early underflow detection and rounder bypass. In another example, an instruction with a floating point result may include RCTL and/or EUD parameters. Basic floating point instructions, such as FADD, FADDP, FIADD, FSUB, FSUBP, FISUB, FMUL, FMULP, and FIMUL, may include an RCTL parameter in addition to the typical operands, which may include two source floating point registers and a destination floating point register. Similarly, the ADD, SUB, and MUL instructions, or the vector forms of these instructions, VADD, VSUB, and VMUL, may include an RCTL parameter. This parameter may be included regardless of the data type of the operation, which may include scalar single-precision (SS), scalar double-precision (SD), packed single-precision (PS), or packed double-precision (PD). Likewise, complex arithmetic instructions, such as ADDSUBPD and ADDSUBPS, may include an RCTL parameter. Further, fused multiply-add (FMA) instructions, such as VFMADD, VFNMADD, VFMSUB, VFNMSUB, VFMADDSUB, and VFMSUBADD, may include an RCTL parameter to enable rounder bypass and/or an EUD parameter to enable early underflow detection. FMA instructions may include any suitable data type, including those listed for vector instructions above. An FMA instruction may also include any suitable number of source operands and may process the source operands in any suitable order. For example, an FMA instruction may compute the floating point product of two source operands and then may compute the floating point sum of the floating point product and a third source operand. These parameters, RCTL and/or EUD, along with any other parameters of the instructions defining a floating point result, may be implemented in any suitable form, including as parameter flags for the floating point instruction, explicit parameters, required parameters, as optional parameters with an assumed default value, or as inherent parameters stored in registers or other known locations that do not require the information to be explicitly passed as a parameter.

Although various operations are described in this disclosure as performed by specific components of processor 1802, the functionality may be performed by any suitable portion of processor 1802.

Figure 19:
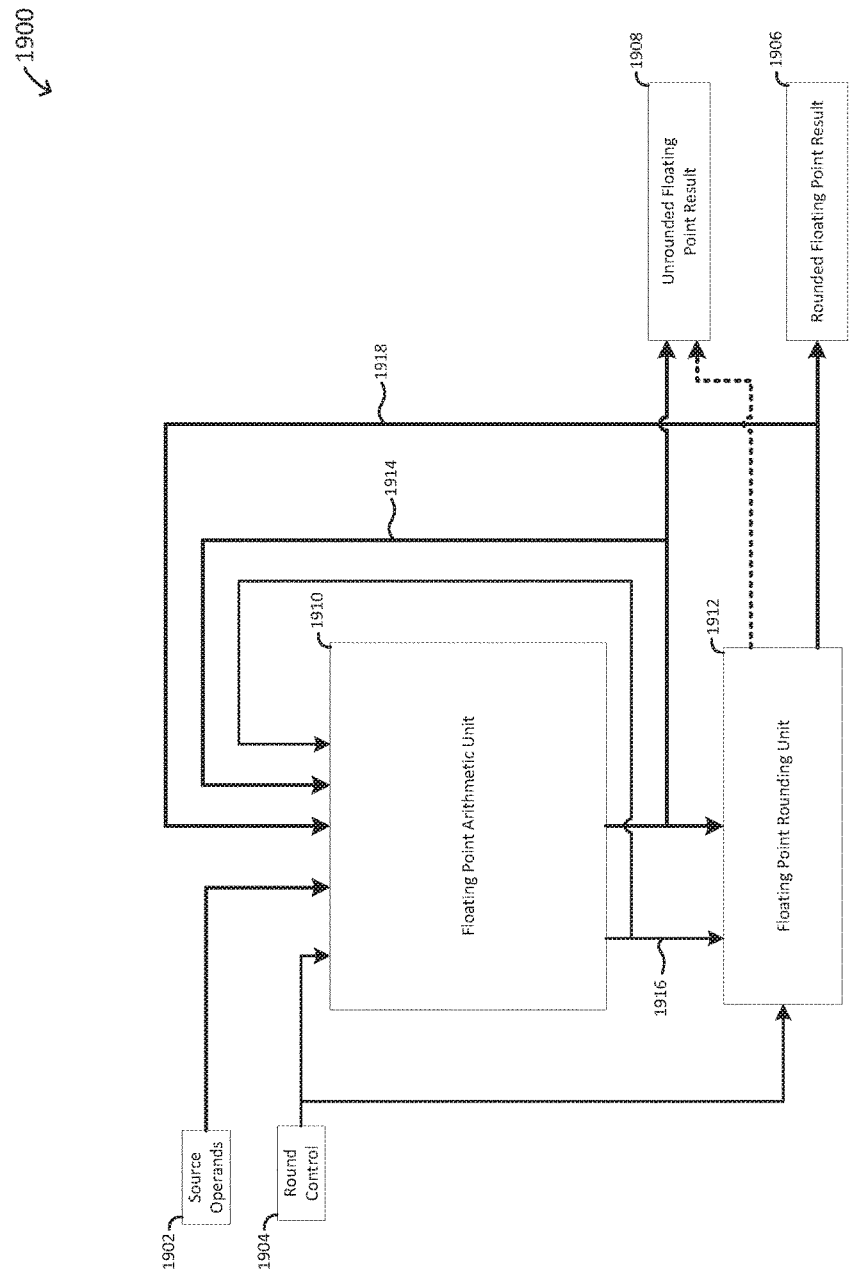
FIG. 19 is a block diagram of a floating point unit for rounder bypass, in accordance with embodiments of the present disclosure.

FIG. 19 illustrates a block diagram with selected elements of a floating point unit for rounder bypass, in accordance with embodiments of the present disclosure. The floating point unit (FPU) 1900 may implement FPU 1826, in whole or in part. FPU 1900 may include a floating point arithmetic unit 1910 and a floating point rounding unit 1912. FPU 1900 may receive one or more source operands 1902 and a round control input 1904. FPU 1900 may output a rounded floating point result 1906. FPU 1900 may further output an unrounded floating point result 1908. Rounded floating point result 1906 may be written to a write back (WB) bus (not shown) for further processing, which may include applying a pseudo random function (PRF) to the rounded result. After further processing, the result may be forwarded to retirement unit 1824 or another execution unit.

Floating point arithmetic unit 1910 may perform a floating point calculation including, but not limited to, floating point addition, floating point subtraction, floating point division, and/or floating point multiplication. Floating point arithmetic unit 1910 may output an unrounded floating point result 1908, which may be normalized (not shown). Floating point arithmetic unit 1910 may output an unrounded result bypass extension 1916, which may be a boolean or one or more bits. Unrounded result bypass extension 1916 may represent a logical extension of the least significant bit of the mantissa of the unrounded floating point result. Unrounded floating point result 1908 may be routed back as an input to floating point arithmetic unit 1910 via an unrounded result bypass network 1914. Unrounded result bypass extension 1916 may be routed back as a input to floating point arithmetic unit 1910 via any suitable interface, including a connection separate from network 1914 or the unrounded result bypass network 1914 (not shown).

If round control input 1904 denotes that rounder bypass is not enabled, unrounded floating point result 1908 may be rounded by floating point rounding unit 1912. Floating point rounding unit 1912 may output a rounded floating point result 1906, which may be routed to floating point arithmetic unit 1910 via a rounded result bypass network 1918. Rounded result bypass network 1918 may be a bypass path, which may use circuitry to forward the rounded result directly into floating point arithmetic unit 1910. Floating point arithmetic unit 1910 may use the rounded result received via network 1918 as an input to subsequent floating point operations. If round control input 1904 specifies that rounder bypass is enabled, floating point arithmetic unit 1910 may use the unrounded result received via network 1914 for a subsequent floating point operation and may not use the rounded result that may be received via network 1918. Floating point arithmetic unit 1910 may use the unrounded result and unrounded result bypass extension 1916 to simulate a rounded floating point result without the additional latency of floating point rounding unit 1912. Floating point rounding unit 1912 may also receive round control input 1904. If round control input 1904 specifies rounder bypass is not enabled, rounded floating result 1906 may be determined by floating point rounding unit 1912. If round control input 1904 specifies that rounder bypass is enabled, floating point rounding unit 1912 may output unrounded floating point result 1908 without performing rounding or by truncating the result. Rounded floating point result 1906 may be written to a write back (WB) bus (not shown) for further processing, which may include applying a pseudo random function (PRF) to the rounded result. After further processing, the result may be forwarded to retirement unit 1824 or another execution unit.

In at least some embodiments, the unrounded result bypass extension 1916 may be added to a positive or negative mantissa (or coefficient) of a floating point value:

$$-(mantissa+extension)=\sim mantissa+!extension \quad (1)$$

in which $\sim$mantissa may represent the inversion of each bit of the mantissa, !extension may represent the inversion of the boolean, extension, and $-(mantissa+extension)$ may represent the 2's complement of the sum of the mantissa and extension. If the extension is true or 1, $-(mantissa+extension)=-mantissa-1$, and $\sim mantissa+!extension=\sim mantissa$. Thus, $-mantissa=\sim mantissa+1$, which may represent 2's complement negation. If the extension is false or 0, $-(mantissa+extension)=-mantissa$, and $\sim mantissa+!extension=\sim mantissa+1$. Thus $-mantissa=\sim mantissa+1$, which may represent 2's complement negation. Accordingly, the extension may operate with 2's complement negation for any boolean value for the extension.

The extension may be applied to any suitable floating point concept including, but not limited to, subtraction, mantissa expansion, and Wallace trees. For instance, subtraction may be represented in the fused multiply-add (FMA) instruction:

$$a \times b + c \quad (2)$$

in which a, b, and c may be source operands, and the result may be equivalent to c added to the product of a and b. Although addition is shown, the actual operation may be subtraction if:

$$(a<0) \text{ XOR } (b<0) \text{ XOR } (c<0) \quad (3)$$

in which XOR represents an "exclusive or" logical operation, and each of the three values may be negative. A floating point value may be negative if the sign bit is set to 1. Accordingly, the actual operation may be subtraction if any one of the three source operands is negative or if all three of the source operands is negative. Subtraction may involve subtracting the aligned mantissa of source operand c from the product of the mantissa of a and the mantissa of b. If mantissa=$a_{mantissa} \times b_{mantissa}$ and $c_{mantissa}$=mantissa+extension, then $-c_{mantissa}=\sim mantissa+!extension$. Accordingly, the extension may be used for subtraction operations.

As another example, the extension may be used for floating point extension operations, such as operations in which a single precision 32-bit floating point value is extended to a 64-bit floating point value. The starting value may be represented by:

$$c_{mantissa}=mantissa+extension \quad (4)$$

in which extension may represent the unrounded result bypass extension. This starting value may be extended to a larger length by a floating point extension operation:

$$extended\_mantissa=1.\ mmm \ldots maaaa \ldots a \quad (5)$$

in which m may represent a bit from the mantissa in equation (4) and a may represent the unrounded result bypass extension. Thus, $c_{mantissa}$=extended_mantissa+extension. The 2's complement of $c_{mantissa}$ may be represented by:

$$-c_{mantissa}=\sim extended\_mantissa+not(extension) \quad (6)$$

in which not(extension) may represent !extension.

As a further example, the extension may be used for floating point arithmetic using Wallace trees with radix 4 Booth encoded mantissae. Wallace trees may be used to perform floating point multiplication using partial products and 3:2 compressors or adders. The partial products may be calculated in parallel. Wallace trees may further utilize a full adder in the last stage to produce a result including the sum and the carry bits. The number of 3:2 compressors or adders required may be reduced using Booth encoding. Booth encoding may take advantage of a group of bits that are each set to 1. For example, if m is a first mantissa and . . . 011100 is a second mantissa, and the two mantissae are multiplied, mx ... 011100 may be equivalent to mx($2^4+2^3+2^2$)=mx28. The sequence of three is in the second mantissa may be represented by a difference of two binary numbers: ... 0100-100 or $2^5-2^2$=28. Thus, the second mantissa may be encoded as 1-1 instead of ... 011100. Radix 4 Booth encoding may use overlapping groups of three bits to represent a radix encoded value. Overlapping groups may enable a block of three bits to have some information about the previous block of three bits. Thus, the most significant bit of each block of three bits may be considered the sign bit of the block, which may be the least significant bit of the next block of three bits. A table may be used to encode the three bit blocks:

TABLE 1

| Bits in Block | Radix 4 Value |
| --- | --- |
| 000 | 0 |
| 001 | 1 |
| 010 | 1 |
| 011 | 2 |
| 100 | −2 |
| 101 | −1 |
| 110 | −1 |
| 111 | 0 |

If the value ... 011100 is encoded using the table above, the first group of three bits may be 000, in which the least significant bit may be implied and the three bits may correspond to the radix 4 encoded value of 0. The second group of three bits may be 110, which may correspond to the radix 4 encoded value of −1. The radix 4 encoded value of −1 may represent the start of a set of bits each set to 1. The third group of three bits may be 011, which may correspond to the radix 4 encoded value of 2. The radix 4 encoded value of 2 may represent the end of the set of bits, that may be each set to 1. Accordingly, a radix 4 encoded mantissa may reduce the number of partial products in floating point multiplication.

Using the unrounded extension for a floating point number, radix 4 Booth encoding may encode a mantissa as follows:

$$a. \text{ mantissa} = \Sigma_{i=0}^{k} a_i 2^{-2*i} \quad (7)$$

in which, $a_i$ may be −2, −1, 0, 1, or 2 and k may be the number of bits in the mantissa. If $b_{mantissa}$=mantissa+extension, then the right side of the Wallace tree may look like the following:

$$[a_i * \text{mantissa}] \quad (8)$$

$$[a_{i+1} * \text{mantissa}][0][x_i]$$

$$[a_{i+2} * \text{mantissa}][0][x_{i+1}]$$

$$[x_k]$$

in which if $a_i \geq 0$, $x_i$=extension and if $a_i < 0$, $x_i$=!extension, and for each term of the Wallace tree, the extension may be placed on the higher position of that term.

As another example, a double precision Booth encoded multiplier may be extended by the unrounded result bypass extension:

1. xxxx xxxx xxxx xxxx xxxx xxxx xxxx xxxx xxxx xxxx xxxx xxxx xxxx a in which x represents a bit in the 52-bit fraction of a double precision floating point value, and a represents the extension. As a further example, a packed single precision Booth encoded multiplier may be extended by the unrounded result bypass extension:

1. xxxx xxxx xxxx xxxx xxxx xxx aaaa 01 xxxx xxxx xxxx xxxx xxxx xxx a in which two single precision floating point values are packed into a 64-bit field. The extension, a, may be added to the lowest fraction of a Booth encoder. The addition may be performed by any suitable circuitry, including but not limited to a Booth encoding logic unit for the lowest Booth coefficient.

Following an instruction that enables rounder bypass, the next floating point instruction may use unrounded result bypass network 1914 and unrounded result bypass extension 1916 as inputs to a floating point operation. For example, the first floating point instruction may be: VFMADD132PDy R0, R1, R2 {RCTL}. The first instruction may perform a fused multiply add operation in which R0 may be multiplied by R2, the product of R0 and R2 may be added to R1, and the sum may be stored in R0. R0, R1, and R2 may be any type of register suitable for floating point values. Round control may specify that rounder bypass is enabled. The first instruction may generate an unrounded result and an unrounded result bypass extension. The second floating point instruction may be: VFMADD132PDy R0, R2, R1. The second instruction may perform a fused multiply add operation in which R0 may be multiplied by R1, the product of R0 and R1 may be added to R2, and the sum may be stored in R2. The second instruction may use the unrounded result via unrounded result bypass network 1914 and unrounded result bypass extension 1916, and not the value in register R0. Accordingly, R1 may be multiplied by the unrounded result with the unrounded result bypass extension 1916. If round control parameter specifies that rounder bypass is enabled, the result of the second instruction may be unrounded. If the round control parameter specifies that rounder bypass is not enabled, the result of the second instruction may be rounded. Accordingly, rounding may be selectively performed using the round control parameter. If a set of floating point operations is performed, rounding may be selected for the last floating point operation in the set, rather than for each floating point operation within the set.

Figure 20:
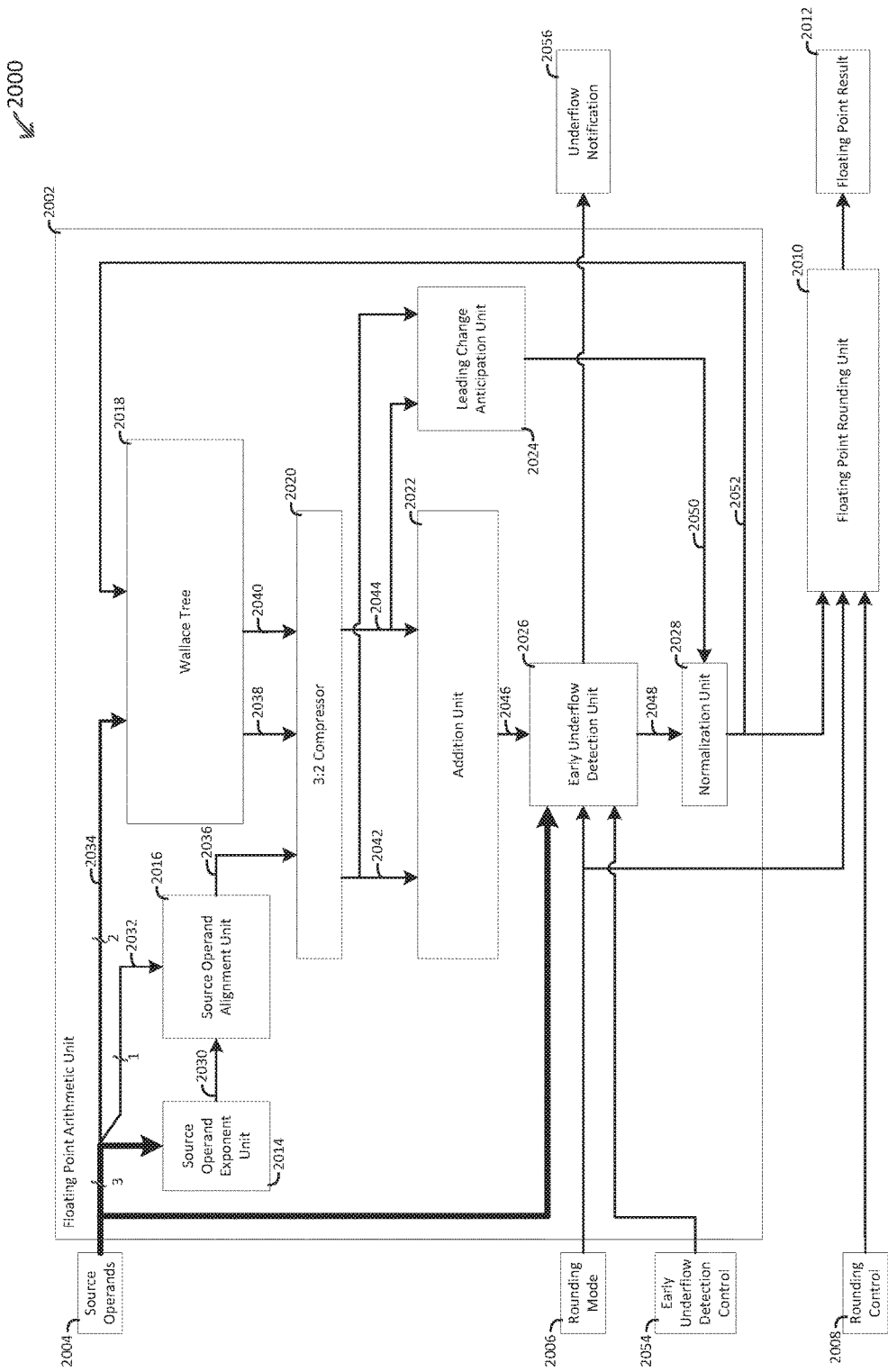
FIG. 20 is a block diagram of floating point unit for early underflow detection and rounder bypass, in accordance with embodiments of the present disclosure.

FIG. 20 illustrates a block diagram of a floating point unit for early underflow detection and rounder bypass, in accordance with embodiments of the present disclosure. Floating point unit (FPU) 2000 may implement FPU 1826, in whole or in part. FPU 2000 may receive source operands 2004, rounding mode input 2006, early underflow detection (EUD) control 2054, and/or rounding control 2008. FPU 2000 may output floating point result 2012. FPU 2000 may include a floating point arithmetic unit 2002 and floating point rounding unit 2010. Floating point arithmetic unit (FPAU) 2002 may implement floating point arithmetic unit 1910, in whole or in part. Floating point rounding unit (FPRU) 2012 may implement floating point rounding unit 1912, in whole or in part.

FPAU 2002 may include circuitry to perform a fused multiply-add (FMA) type of instruction. Accordingly, source operands 2004 may include three source operands in which the first source operand and the second source operand are multiplied together to produce a product, which may be added to the third source operand to produce a sum. The sum may be processed to produce floating point result 2012. One of these source operands may be used to store floating point result 2012. Alternatively, floating point result 2012 may be stored in another destination.

Source operands 2004 may be input into source operand exponent unit 2014. Source operand exponent unit 2014 may produce an shift value. If the FMA instruction provides for result=a×b+c, the shift may be calculated by:

$$\text{Shift} = (\text{Exponent}_a + \text{Exponent}_b) - \text{Exponent}_c - \text{bias} \qquad (9),$$

in which a may represent the first source operand with an exponent, b may represent the second source operand with an exponent, and c may represent the third source operand with an exponent. bias may represent the offset for the exponents. In this example, a and b may be multiplied together to produce a product, and the product may be added to c to produce a result. The floating point multiplication of a and b may correspond to the addition of the exponents of a and b. The exponent of c and the bias may be subtracted from the sum of the exponents of a and b to produce a Shift value 2030. Although a biased exponent is described, an unbiased exponent may be used, in which the sum of the exponents of a and b may be subtracted from the exponent of c.

In this example, the shift value 2030 may be an input to a source operand alignment unit 2016. Source operand alignment unit 2016 may also receive the third source operand 2032 as an input. Source operand alignment unit 2016 may align the exponent of the result with Wallace tree 2018. If the shift value is greater than or equal to zero, the mantissa of the third source operand may be shifted to the right by the shift value. For a double precision floating point number, for example, the right shift value may be a maximum of 108, which may represent a right shift of 108 bits. If the shift value is less than zero, the mantissa of the third source operand may be shifted to the left by the shift value. For a double precision floating point number, for example, the left shift value may be a maximum of 54, which may represent a left shift of 54 bits. Source operand alignment unit 2016 may output an aligned mantissa for the third source operand, shown as 2036. Although a shift value corresponding to biased exponents is described, an unbiased exponent may be used, in which a shift value greater than or equal to zero may result in a shift of the third source operand to the left, and a shift value less than zero may result in a shift of the third source operand to the right.

Wallace tree 2018 may receive at least two source operands 2034. Wallace tree 2018 may perform the multiplication operation on the source operands. Wallace tree 2018 may include circuitry for the production of partial products, circuitry for radix 4 Booth encoding of an operand, or any other suitable floating point multiplication circuitry. Wallace tree 2018 may output a carry 2038 and sum 2040. Carry 2038 and sum 2040 may collectively represent the product of the source operands input into Wallace tree 2018. The two outputs from the Wallace tree (2038 and 2040), and the aligned mantissa for the third source operand 2036 may be received by 3:2 compressor 2020. Compressor 2020 may reduce the three inputs into two outputs. Compressor 2020 may use any suitable circuitry for reduction, including one or more adders. Compressor 2020 may output a carry 2042 and a sum 2044. Carry 2042 and sum 2044 collectively may represent the raw result of the FMA operation.

Addition unit 2022 may receive carry 2042 and sum 2044 from compressor 2020, and may output a non-normalized result 2046. For a double precision floating point operation, addition unit 2022 may add a maximum of 108 bits. The adder may represent the full adder of the last stage for a Wallace tree multiplier. Leading change anticipation unit 2024, which may be known as a leading zero anticipator (LZA), may receive carry 2042 and sum 2044. LZA 2024 may include leading zero anticipation logic and/or leading one anticipation logic. LZA 2024 may provide a count 2050 of the leading zeroes or ones to normalization unit 2028. Normalization unit 2028 may normalize a non-normalized result, which may include shifting the non-normalized result to the left by the count 2050 from LZA 2024.

Early underflow detection unit (EUDU) 2026 may receive non-normalized result 2046, source operands 2004, rounding mode input 2006, and/or early underflow detection (EUD) control 2054. EUDU 2026 may provide an indication of underflow before a floating point result is normalized, rounded, adjusted, or verified for a proper positive or negative sign. If EUD control 2054 indicates that early underflow detection is enabled, EUDU 2026 may determine whether an underflow exists for the floating point result. If EUD control 2054 indicates that early underflow detection is disabled, EUDU 2026 may not determine whether an underflow exists for the floating point result.

Underflow may occur in a variety of floating point operations. For example, the subtraction of mantissae of floating point values with similar exponents may result in cancellation of the most significant bits of the mantissae of the source operands. The exponent may be considered close, for example, if the exponents are within three of each other. Detection of an underflow may be used by circuitry to flash the result to zero. EUDU 2026 may detect underflow early by adding circuitry to perform additional computations on a non-normalized result. As noted above, an actual addition operation may be a subtraction if any one of the signs of the source operands is 1, or if all of the signs of the source operands is a 1. For an FMA operation with a subtraction, such as result=a×b+c, EUDU 2026 may determine the maximum exponent by the following:

$$E = \text{maximum}(\text{Exponent}_c, \ \text{Exponent}_a + \text{Exponent}_b - \text{bias}) \qquad (10)$$

in which a and b may be the two source operands to be multiplied, and c may be the source operand for subtraction from the product to be calculated. Although the term subtraction is used, true subtraction may involve an addition operation. The bias may be applied for floating point exponents that may use an offset to bias the exponent value to another representation. The exponents of a, b, and c may thus be biased exponents or offset exponents. E may correspond to the maximum exponent of third source operand or of the product. EUDU 2026 may compare E to the number of bits in the mantissa, M. M may be any suitable number of bits in the mantissa of a floating point number including but not limited to, 53 bits in the mantissa for double precision floating point numbers or 24 bits in the mantissa for single precision floating point numbers. If $2 \times M \leq E$, there may not be any underflow. If $E < 2 \times M$, a mask m[i] may be used to detect underflow. m[i] may have a width of $2 \times M$ bits. For each bit, if $i \leq 2 \times M - E$, m[i] may be set to 1, and if $i > 2 \times M - E$, m[i] may be set to 0.

EUDU 2026 may perform a positive check and/or a negative check. The equation for a positive check may be illustrated as follows:

$$P = \bigvee_{i=0}^{2 \times M - 1} m[i] \ \& \ A[i] == 0 \qquad (11)$$

in which P denotes the positive check, 'V' denotes an "or" operation, & denotes an "and" operation, m is the mask, and A is the non-normalized floating point result. If P is equal to 0, then the non-normalized floating point result may be positive. A positive check may determine whether there are leading zeroes. The equation for a negative check may be illustrated as follows:

$$N = \bigwedge_{i=0}^{2 \times M - 1} !m[i] | A[i] == 1 \qquad (12)$$

in which N denotes the negative check, 'Λ' denotes an "and" operation, '|' denotes an "or" operation, m is the mask, and A is the non-normalized floating point result. !m[i] may denote an inversion of m[i]. If N is equal to 1, then the non-normalized floating point result may be negative. A negative check may determine whether there are leading ones.

EUDU 2026 may also consider problematic cases of the positive and negative checks. For example, there may be a problematic case for the positive check when E<M, which may correspond to a mantissa in which there are M bits, which are the least significant bits, set to 1. The equation for the problematic case of the positive check may be illustrated as follows:

$$P_{pc} = \left( \bigwedge_{i=M}^{2 \times M - 1} m[i] | A[i] \right) \& \left( \bigwedge_{i=0}^{M-1} \sim m[i+M] | A[i] \right) == 1 \qquad (13)$$

in which the positive check may be evaluated in a different manner for each half, 0 to M−1 and M to 2M−1. In addition to the problem case for positive checks, the negative check may have problematic cases. For example, if E≥M, the negative check may be illustrated as follows:

$$N_{pc1} = \bigvee_{i=0}^{2 \times M - 1} !m[i] | A[i] == 0 \qquad (14)$$

in which !m[i] denotes an inversions of m[i]. If E<M, the negative check may be illustrated as follows:

$$N_{pc2} = \left( \bigvee_{i=M}^{2 \times M - 1} !m[i] \& A[i] \right) | \left( \bigvee_{i=0}^{M-1} m[i+M] \& A[i] \right) == 0 \qquad (15)$$

in which the negative check may be evaluated in a different manner for each half, 0 to M−1 and M to 2M−1.

In addition to sign checks, EUDU 2026 may produce two rounding parameters for a guard parameter and a sticky parameter. The equation to identify the guard parameter may be illustrated by the following equation:

$$\text{Guard} = \bigvee_{i=0}^{M-1} m[i+M+1] \& !m[i+M] \& A[i] \qquad (16)$$

in which the guard parameter may be determined using only part of the non-normalized floating point result. The equation to identify the sticky parameter may be illustrated by the following equation:

$$\text{Sticky} = \bigvee_{i=0}^{M-1} m[i+M+1] \& A[i] \qquad (17)$$

in which the sticky parameter may be determined using only part of the non-normalized floating point result.

EUDU 2026 may use the maximum exponent E, number of bits in the mantissa M, the sign checks, the rounding parameters, and the rounding mode to determine whether an early underflow is detected. Detecting early underflow may be represented by the following:

$$\text{Underflow} = (E < 2 \times M) \& (\text{Underflow}_P | \text{Underflow}_N) \qquad (18)$$

Detecting early positive underflow may be represented by the following:

$$\text{Underflow}_P = P \& !((E < M) \& P_{pc} \& \text{Rounding}_P) \qquad (19)$$

in which P may be the result of equation (11) and $P_{pc}$ may be the result of equation (13). Rounding$_P$ may denote the positive rounding conditions for early underflow detection and may be represented by the following:

$$\text{Rounding}_P = \text{MRNE} \& \text{Guard} | \text{MRUP} \& (\text{Guard} | \text{Sticky}) \qquad (20)$$

in which Guard may be the result of equation (16) and Sticky may be the result of equation (17). MRNE may denote a rounding mode in which the mantissa may be rounded to the nearest even, and MRUP may denote a rounding mode in which the mantissa may be rounded up, which may include a round up mode for positive values, a round down mode for negative values, and a round to zero mode for negative values. In addition to detecting early positive underflow, EUDU 2026 may detect early negative underflow, which may be represented by the following:

$$\text{Underflow}_N = N \& ![((E \geq M) \& N_{pc1}) | ((E < M) \& N_{pc2}) \& !\text{Rounding}_N] \qquad (21)$$

in which N may be the result of equation (12), $N_{pc1}$ may be the result of equation (14), and $N_{pc2}$ may be the result of equation (15). Rounding$_N$ may denote the negative rounding conditions for early underflow detection and may be represented by the following:

$$\text{Rounding}_N = (\text{MRNE} \& \text{Guard} \& \text{Sticky}) | (\text{MRUP} \& (\text{Guard} | \text{Sticky})) \qquad (22)$$

in which Guard, Sticky, MRNE, and MRUP may be denoted in a similar manner as equation (20). EUDU 2026 may provide early underflow detection by any of the variables shown in equations (10)-(22). EUDU 2026 may output underflow notification 2056, which may correspond to equation (18), and non-normalized floating point result 2048. Non-normalized floating result 2048 may be received by normalization unit 2028. In some embodiments (not shown), normalization unit 2028 may receive the non-normalized floating point result 2046 from addition unit 2022.

Normalization unit 2028 may perform normalization and output an unrounded normalized floating point result 2052. Unrounded normalized floating point result 2052 may be routed back to Wallace tree 2018 via a bypass network or a bypass path. The result received by Wallace tree 2018 may be used as an input for the next floating point operation where one of the source operands 2034 may not be used by Wallace tree 2018. Unrounded normalized floating point result 2052 may be output from normalization unit 2028 and received by floating point rounding unit 2010. Floating point rounding unit 2010 may further receive the rounding mode 2006 and/or the rounding control 2008. Floating point rounding unit 2010 may perform rounding of the unrounded result to provide a floating point result 2012. Rounding may include any suitable type of rounding including, but not limited to, rounding up, rounding down, rounding to the nearest even, or rounding to zero. Rounding may be specified by rounding mode 2006. Floating point rounding unit 2010 may modify its operation based on rounding control 2008. If rounding control 2008 denotes that rounder bypass is enabled, floating point rounding unit 2010 may not perform rounding and may pass the unrounded result 2052 to floating point result 2012. In some embodiments, rounding control 2008 may be integrated with rounding mode 2006 in which the rounding mode may denote that rounder bypass is enabled.

Figure 21:
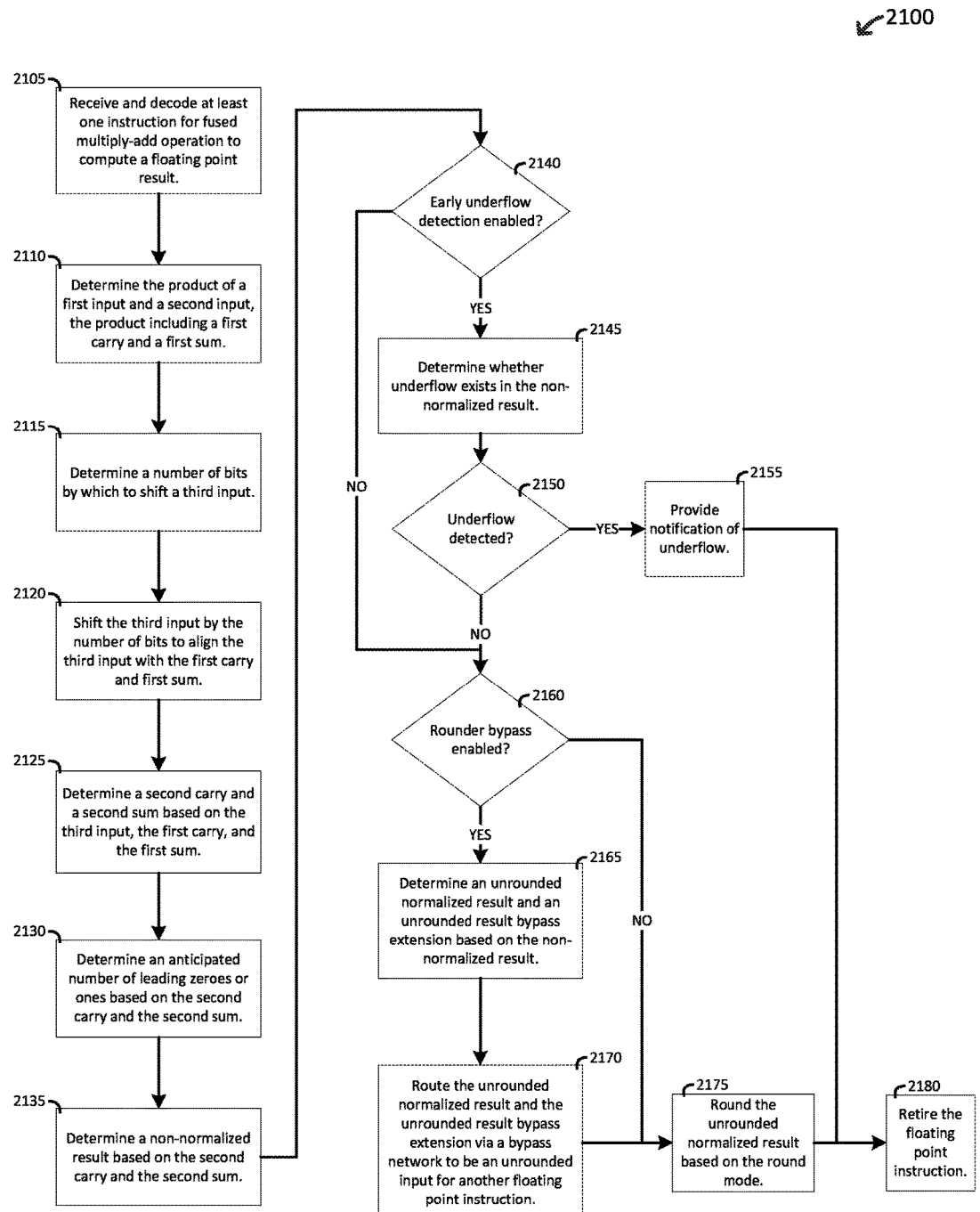
FIG. 21 is a diagram of operation of a method for early underflow detection and rounder bypass, in accordance with embodiments of the present disclosure.

FIG. 21 is a block diagram of an example method 2100 for early underflow detection and rounder bypass, according to embodiments of the present disclosure. Method 2100 may be implemented by any of the elements shown in FIGS. 1-20. Method 2100 may be initiated by any suitable criteria and may initiate operation at any suitable point. In one embodiment, method 2100 may initiate operation at 2105. Method 2100 may include greater or fewer operations than those illustrated. Moreover, method 2100 may execute its operations in an order different than those illustrated in FIG. 21. Method 2100 may terminate at any suitable operations. Furthermore, method 2100 may repeat operation at any suitable point. Method 2100 may perform any of its operations in parallel with other operations of method 2100, or in other methods.

At 2105, in one embodiment at least one instruction may be received and decoded. The instruction may be for a fused multiply-add (FMA) operation and may compute a floating point result. The FMA operation may include a multiplication operation and an addition or subtraction operation. The instruction may include one or more source operands for the FMA operation. For example, the instruction may include three source operands for an FMA operation to multiply the first two source operands and subtract the third source operand from the product.

At 2110, in one embodiment the product of a first input and a second input may be determined. The product may include a first carry and a first sum. The product may be determined using any suitable circuitry, including a Wallace tree, which may use radix 4 Booth encoding. At 2115, in one embodiment the number of bits by which to shift a third input to the FMA operation may be determined. For unbiased exponents, the determination may be based on the subtraction of the sum of the first exponent of the first input and the second exponent of the second input from the third exponent of the third input. For biased exponents, the determination may be based on the subtraction of the third exponent of the third input and the bias of the exponents from the sum of the first exponent of the first input and the second exponent of the second input, as shown in equation (9) above. Thus, the determination of the number of bits by which to shift a third input may be based on the first input, the second input, and the third input. At 2120, in one embodiment the third input may be shifted by the determined number of bits. Shifting of the third input may align the mantissa of the third input with the mantissa of the product of the first input and the second input, which may include the first carry and the first sum. In some embodiments, the exponents may be unbiased. For unbiased exponents, if the shift value is greater than or equal to zero, the mantissa of the third input may be shifted to the left by the shift value. If the shift value is less than zero, the mantissa of the third input may be shifted to the right by the shift value. For a double precision floating point number, the left shift value may be a maximum of 54 and the right shift value may be a maximum of 108. For some other embodiments, the exponents may be biased. For biased exponents, if the shift value is greater than nor equal to zero, the mantissa of the third input may be shifted to the right by the shift value. If the shift value is less than zero, the mantissa of the third input may be shifted to the left by the shift value. For a double precision floating point number, the right shift value may be a maximum of 108 and the left shift value may be a maximum of 54. Although a double precision floating point number is described, a floating point number of any suitable precision may be used.

At 2125, in one embodiment a second carry and a second sum may be determined. The second carry and second sum may be based on the third input, the first carry, and the first sum. The second carry and second sum may be generated by a 3:2 compressor, which may use one or more adders. At 2130, in one embodiment an anticipated number of leading zeroes or ones may be determined. The number of leadings zeroes or ones may be based on the second carry and the second sum. The determination of the anticipated number of leading zeroes or ones may be made at least partially in parallel with the determination of the non-normalized result. At 2135, in one embodiment a non-normalized result may be determined. The non-normalized result may be based on the second carry and the second sum. The determination of the non-normalized result may use an addition unit or adder. The adder may support twice as many bits as the number of bits in the mantissa. For a double precision floating point value, for example, the adder may support 108 bits.

At 2140, in one embodiment it may be determined whether early underflow detection is enabled. Early underflow detection may be enabled by early underflow detection control associated with a parameter of a floating point instruction, a field in a floating point control register, or by design of the circuitry. If early underflow is enabled, method 2100 may proceed to 2145. Otherwise, method 2100 may proceed to 2160. At 2145, in one embodiment it may be determined whether underflow exists in the non-normalized result. Early underflow detection may detect underflow when cancellation occurs as a result of a floating point subtraction. Determining whether underflow exists in the non-normalized result may include determining whether positive underflow exists and determining whether negative underflow exists. Positive underflow may exist as described in more detail by equation (19). Negative underflow may exist as described in more detail by equation (21). Determining whether underflow exists may be based on a determination whether the maximum exponent of the subtraction floating point operation is less than twice the width of the mantissa in bits. The maximum exponent of the subtraction floating point operation may be determined as described in more detail by equation (10). If the maximum exponent of the subtraction floating point operation is less than twice the mantissa width, a mask may be used to detect underflow. The mask may contain twice as many bits as the mantissa. For each bit of the mask, if the bit position is less than or equal to twice the mantissa minus the maximum exponent of the subtraction floating point operation, the mask bit may be set to 1. If the bit position is greater than or equal to twice the mantissa minus the maximum exponent of the subtraction floating point operation, the mask bit may be set to 0. The mask may be used with the non-normalized result to determine whether the floating point result is positive, negative, and/or rounded. For example, early underflow detection may be based on the rounding mode as described in more detail in equations (19)-(22). At 2150, in one embodiment it may be determined whether underflow is detected. If underflow is detected, method 2100 may proceed to 2155. Otherwise, method 2100 may proceed to 2160. At 2155, in one embodiment a notification of underflow may be provided. If underflow is detected early, it may be reported in any suitable fashion including, but not limited to, setting a flag in a register, raising an exception, or providing an interrupt. Underflow may be detected early if the non-normalized result is used to determine underflow before the non-normalized result is normalized.

At 2160, in one embodiment it may be determined whether rounder bypass is enabled. Bypassing the floating point rounder may be enabled by a round control value associated with a parameter of a floating point instruction, a field in a floating point control register, or by design of the circuitry. If bypassing the rounder is enabled, method 2100 may proceed to 2165. Otherwise, method 2100 may proceed to 2180. At 2165, in one embodiment an unrounded normalized result and an unrounded result bypass extension may be determined based on the non-normalized result. The unrounded result bypass extension may represent a boolean value that logically extends the mantissa of the unrounded normalized result. At 2170, in one embodiment the unrounded normalized result and the unrounded result bypass extension may be routed via a bypass network or bypass path to be an unrounded input for another floating point instruction. The unrounded normalized result and the unrounded result bypass extension may correspond to the first input, second input, or third input for another floating point instruction. At 2175, in one embodiment the unrounded normalized result may be rounded based on the round mode. In some embodiments, the round mode may include the round control. If the round control denotes that rounder bypass is enabled, rounding may be skipped or bypassed, and the floating point result may represent an unrounded value.

At 2180, the instruction may be retired by, for example, a retirement unit. Method 2100 may optionally repeat or terminate.

Embodiments of the mechanisms disclosed herein may be implemented in hardware, software, firmware, or a combination of such implementation approaches. Embodiments of the disclosure may be implemented as computer programs or program code executing on programmable systems comprising at least one processor, a storage system (including volatile and non-volatile memory and/or storage elements), at least one input device, and at least one output device.

Program code may be applied to input instructions to perform the functions described herein and generate output information. The output information may be applied to one or more output devices, in known fashion. For purposes of this application, a processing system may include any system that has a processor, such as, for example; a digital signal processor (DSP), a microcontroller, an application specific integrated circuit (ASIC), or a microprocessor.

The program code may be implemented in a high level procedural or object oriented programming language to communicate with a processing system. The program code may also be implemented in assembly or machine language, if desired. In fact, the mechanisms described herein are not limited in scope to any particular programming language. In any case, the language may be a compiled or interpreted language.

One or more aspects of at least one embodiment may be implemented by representative instructions stored on a machine-readable medium which represents various logic within the processor, which when read by a machine causes the machine to fabricate logic to perform the techniques described herein. Such representations, known as "IP cores" may be stored on a tangible, machine-readable medium and supplied to various customers or manufacturing facilities to load into the fabrication machines that actually make the logic or processor.

Such machine-readable storage media may include, without limitation, non-transitory, tangible arrangements of articles manufactured or formed by a machine or device, including storage media such as hard disks, any other type of disk including floppy disks, optical disks, compact disk read-only memories (CD-ROMs), compact disk rewritables (CD-RWs), and magneto-optical disks, semiconductor devices such as read-only memories (ROMs), random access memories (RAMs) such as dynamic random access memories (DRAMs), static random access memories (SRAMs), erasable programmable read-only memories (EPROMs), flash memories, electrically erasable programmable read-only memories (EEPROMs), magnetic or optical cards, or any other type of media suitable for storing electronic instructions.

Accordingly, embodiments of the disclosure may also include non-transitory, tangible machine-readable media containing instructions or containing design data, such as Hardware Description Language (HDL), which defines structures, circuits, apparatuses, processors and/or system features described herein. Such embodiments may also be referred to as program products.

In some cases, an instruction converter may be used to convert an instruction from a source instruction set to a target instruction set. For example, the instruction converter may translate (e.g., using static binary translation, dynamic binary translation including dynamic compilation), morph, emulate, or otherwise convert an instruction to one or more other instructions to be processed by the core. The instruction converter may be implemented in software, hardware, firmware, or a combination thereof. The instruction converter may be on processor, off processor, or part-on and part-off processor.

Thus, techniques for performing one or more instructions according to at least one embodiment are disclosed. While certain exemplary embodiments have been described and shown in the accompanying drawings, it is to be understood that such embodiments are merely illustrative of and not restrictive on other embodiments, and that such embodiments not be limited to the specific constructions and arrangements shown and described, since various other modifications may occur to those ordinarily skilled in the art upon studying this disclosure. In an area of technology such as this, where growth is fast and further advancements are not easily foreseen, the disclosed embodiments may be readily modifiable in arrangement and detail as facilitated by enabling technological advancements without departing from the principles of the present disclosure or the scope of the accompanying claims.

In some embodiments of the present disclosure, a processor for floating point underflow detection may include circuitry to decode a first instruction and an execution unit. The first instruction when executed by the processor may be for performing a fused multiply-add (FMA) operation. The floating point unit may include circuitry to determine a non-normalized result of the first instruction and circuitry to determine whether underflow exists in the non-normalized result. The non-normalized result of the first instruction may be based on a first input, a second input, and a third input. The determination whether underflow exists in the non-normalized result may be based on a first exponent of the first input, a second exponent of the second input, and a third exponent of the third input.

In combination with any of the above embodiments, in an embodiment the floating point unit may include circuitry to determine a unrounded normalized result and an unrounded result bypass extension. The circuitry may be based on the non-normalized result. In combination with any of the above embodiments, in an embodiment the floating point unit may include circuitry to route the unrounded normalized result and the unrounded result bypass extension via a bypass path to the floating point unit for a second instruction. The second instruction when executed by the processor may be for performing an FMA operation. In combination with any of the above embodiments, in an embodiment the first instruction may include a subtraction operation. In combination with any of the above embodiments, in an embodiment the first instruction may include an addition operation. The addition operation may include a subtraction. In combination with any of the above embodiments, in an embodiment the circuitry to determine whether underflow exists in the non-normalized result may include circuitry to determine whether positive underflow exists in the non-normalized result and circuitry to determine whether negative underflow exists in the non-normalized result. In combination with any of the above embodiments, in an embodiment the circuitry to determine whether underflow exists may include circuitry to determine whether early underflow detection is enabled. In combination with any of the above embodiments, in an embodiment the circuitry to determine the unrounded normalized result and the unrounded result bypass extension may include circuitry to determine whether rounder bypass is enabled.

In some of the present embodiments, a method of floating point underflow detection may include decoding a first instruction for fused multiply-add (FMA) operation, determining a non-normalized result of the first instruction, and determining whether underflow exists in the non-normalized result. The first instruction when executed may be for performing a fused multiply-add (FMA) operation. The non-normalized result of the first instruction may be determined based on a first input, a second input, and a third input. The determination whether underflow exists in the non-normalized result may be based on a first exponent of the first input, a second exponent of the second input, and a third exponent of the third input.

In combination with any of the above embodiments, the method may include determining an unrounded normalized result and an unrounded result bypass extension based on the non-normalized result. In combination with any of the above embodiments, the method may include routing the unrounded normalized result and the unrounded result bypass extension via a bypass path for a second instruction. The second instruction when executed may be for performing an FMA operation. In combination with any of the above embodiments, the first instruction may include a subtraction operation. In combination with any of the above embodiments, the first instruction may include an addition operation. The addition operation may include a subtraction. In combination with any of the above embodiments, determining whether underflow exists in the non-normalized result may include determining whether positive underflow exists in the non-normalized result and determining whether negative underflow exists in the non-normalized result. In combination with any of the above embodiments, determining whether underflow exists may include determining whether early underflow detection is enabled. In combination with any of the above embodiments, determining the unrounded normalized result and the unrounded result bypass extension may include determining whether rounder bypass is enabled.

In some embodiments of the present disclosure, a system for floating point underflow detection may include circuitry to decode a first instruction and an execution unit. The first instruction when executed on the system may be for performing a fused multiply-add (FMA) operation. The floating point unit may include circuitry to determine a non-normalized result of the first instruction and circuitry to determine whether underflow exists in the non-normalized result. The non-normalized result of the first instruction may be based on a first input, a second input, and a third input. The determination whether underflow exists in the non-normalized result may be based on a first exponent of the first input, a second exponent of the second input, and a third exponent of the third input.

In combination with any of the above embodiments, in an embodiment the floating point unit may include circuitry to determine a unrounded normalized result and an unrounded result bypass extension. The circuitry may be based on the non-normalized result. In combination with any of the above embodiments, in an embodiment the floating point unit may include circuitry to route the unrounded normalized result and the unrounded result bypass extension via a bypass path to the floating point unit for a second instruction. The second instruction when executed on the system may be for performing an FMA operation. In combination with any of the above embodiments, in an embodiment the first instruction may include a subtraction operation. In combination with any of the above embodiments, in an embodiment the first instruction may include an addition operation. The addition operation may include a subtraction. In combination with any of the above embodiments, in an embodiment the circuitry to determine whether underflow exists in the non-normalized result may include circuitry to determine whether positive underflow exists in the non-normalized result and circuitry to determine whether negative underflow exists in the non-normalized result. In combination with any of the above embodiments, in an embodiment the circuitry to determine whether underflow exists may include circuitry to determine whether early underflow detection is enabled. In combination with any of the above embodiments, in an embodiment the circuitry to determine the unrounded normalized result and the unrounded result bypass extension may include circuitry to determine whether rounder bypass is enabled.

In some embodiments of the present disclosure, a floating point unit for underflow detection may include circuitry to determine a non-normalized result of the first fused multiply-add (FMA) operation and circuitry to determine whether underflow exists in the non-normalized result. The non-normalized result of the first FMA operation may be based on a first input, a second input, and a third input. The determination whether underflow exists in the non-normalized result may be based on a first exponent of the first input, a second exponent of the second input, and a third exponent of the third input.

In combination with any of the above embodiments, in an embodiment the floating point unit may include circuitry to determine a unrounded normalized result and an unrounded result bypass extension. The circuitry may be based on the non-normalized result. In combination with any of the above embodiments, in an embodiment the floating point unit may include circuitry to route the unrounded normalized result and the unrounded result bypass extension via a bypass path to the floating point unit for a second FMA operation to be performed by the floating point unit. In combination with any of the above embodiments, in an embodiment the first FMA operation may include a subtraction operation. In combination with any of the above embodiments, in an embodiment the first FMA operation may include an addition operation. The addition operation may include a subtraction. In combination with any of the above embodiments, in an embodiment the circuitry to determine whether underflow exists in the non-normalized result may include circuitry to determine whether positive underflow exists in the non-normalized result and circuitry to determine whether negative underflow exists in the non-normalized result. In combination with any of the above embodiments, in an embodiment the circuitry to determine whether underflow exists may include circuitry to determine whether early underflow detection is enabled. In combination with any of the above embodiments, in an embodiment the circuitry to determine the unrounded normalized result and the unrounded result bypass extension may include circuitry to determine whether rounder bypass is enabled.

In some embodiments of the present disclosure, at least one non-transitory machine readable storage medium may be included. The machine readable storage medium may comprise computer-readable instructions carried on the machine readable medium. The instruction may be readable by a processor. The processor may be a hardware processor. The instructions when read and executed may cause the processor to perform decoding a first instruction for fused multiply-add (FMA) operation, determining a non-normalized result of the first instruction, and determining whether underflow exists in the non-normalized result. The first instruction when executed may be for performing a fused multiply-add (FMA) operation. The non-normalized result of the first instruction may be determined based on a first input, a second input, and a third input. The determination whether underflow exists in the non-normalized result may be based on a first exponent of the first input, a second exponent of the second input, and a third exponent of the third input.

In combination with any of the above embodiments, the at least one non-transitory machine readable storage medium may comprise instructions to cause the processor to perform determining an unrounded normalized result and an unrounded result bypass extension based on the non-normalized result. In combination with any of the above embodiments, the at least one non-transitory machine readable storage medium may comprise instructions to cause the processor to perform routing the unrounded normalized result and the unrounded result bypass extension via a bypass path for a second instruction. The second instruction when executed may be for performing an FMA operation. In combination with any of the above embodiments, the first instruction may include a subtraction operation. In combination with any of the above embodiments, the first instruction may include an addition operation. The addition operation may include a subtraction. In combination with any of the above embodiments, determining whether underflow exists in the non-normalized result may include determining whether positive underflow exists in the non-normalized result and determining whether negative underflow exists in the non-normalized result. In combination with any of the above embodiments, determining whether underflow exists may include determining whether early underflow detection is enabled. In combination with any of the above embodiments, determining the unrounded normalized result and the unrounded result bypass extension may include determining whether rounder bypass is enabled.

In some of the present embodiments, an apparatus for floating point underflow detection may include a means for decoding a first instruction for fused multiply-add (FMA) operation, a means for determining a non-normalized result of the first instruction, and a means for determining whether underflow exists in the non-normalized result. The first instruction when executed by the apparatus may be for performing a fused multiply-add (FMA) operation. The means for determining the non-normalized result of the first instruction may be based on a first input, a second input, and a third input. The means for determining whether underflow exists in the non-normalized result may be based on a first exponent of the first input, a second exponent of the second input, and a third exponent of the third input.

In combination with any of the above embodiments, the apparatus may include a means for determining an unrounded normalized result and an unrounded result bypass extension based on the non-normalized result. In combination with any of the above embodiments, the apparatus may include a means for routing the unrounded normalized result and the unrounded result bypass extension via a bypass path for a second instruction. The second instruction when executed by the apparatus may be for performing an FMA operation. In combination with any of the above embodiments, the first instruction may include a subtraction means. In combination with any of the above embodiments, the first instruction may include an addition means. The addition means may include a subtraction. In combination with any of the above embodiments, the means for determining whether underflow exists in the non-normalized result may include a means for determining whether positive underflow exists in the non-normalized result and a means for determining whether negative underflow exists in the non-normalized result. In combination with any of the above embodiments, the means for determining whether underflow exists may include a means for determining whether early underflow detection is enabled. In combination with any of the above embodiments, the means for determining the unrounded normalized result and the unrounded result bypass extension may include a means for determining whether rounder bypass is enabled.

What is claimed is:

1. A processor for floating point underflow detection, comprising:
   circuitry to decode a first instruction, the first instruction when executed by the processor is to perform a fused multiply-add (FMA) operation; and
   a floating point unit including circuitry to:
   determine a non-normalized result of the first instruction based on a first input, a second input, and a third input;
   determine whether underflow exists in the non-normalized result based on a first exponent of the first input, a second exponent of the second input, and a third exponent of the third input;
   determine an unrounded normalized result and an unrounded result bypass extension based on the non-normalized result; and
   route the unrounded normalized result and the unrounded result bypass extension via a bypass path to the floating point unit for a second instruction, the second instruction when executed by the processor is to perform another FMA operation.

2. The processor of claim 1, wherein the first instruction includes a subtraction operation.

3. The processor of claim 1, wherein the first instruction includes an addition operation, the addition operation including a subtraction.

4. The processor of claim 1, wherein the circuitry to determine whether underflow exists in the non-normalized result includes circuitry to:

determine whether positive underflow exists in the non-normalized result; and determine whether negative underflow exists in the non-normalized result.

5. The processor of claim 1, wherein the circuitry to determine whether underflow exists includes circuitry to determine whether early underflow detection is enabled.

6. The processor of claim 1, wherein the circuitry to determine the unrounded normalized result and the unrounded result bypass extension includes circuitry to determine whether rounder bypass is enabled.

7. At least one non-transitory machine readable storage medium, comprising computer-readable instructions carried on the machine readable storage medium, the instructions readable by a hardware processor, the instructions, when read and executed, for causing the processor to perform:

decoding a first instruction, the first instruction when executed is for performing a fused multiply-add (FMA) operation;

determining a non-normalized result of the first instruction based on a first input, a second input, and a third input;

determining whether underflow exists in the non-normalized result based on a first exponent of the first input, a second exponent of the second input, and a third exponent of the third input;

determining an unrounded normalized result and an unrounded result bypass extension based on the non-normalized result; and routing the unrounded normalized result and the unrounded result bypass extension via a bypass path for a second instruction, the second instruction when executed is for performing another FMA operation.

8. The at least one non-transitory machine readable storage medium of claim 7, wherein the first instruction includes a subtraction operation.

9. The at least one non-transitory machine readable storage medium of claim 7, wherein the first instruction includes an addition operation, the addition operation including a subtraction.

10. The at least one non-transitory machine readable storage medium of claim 7, wherein the instructions for causing the processor to perform determining whether underflow exists in the non-normalized result further comprise instructions for causing the processor to perform:

determining whether positive underflow exists in the non-normalized result; and determining whether negative underflow exists in the non-normalized result.

11. The at least one non-transitory machine readable storage medium of claim 7, wherein the instructions for causing the processor to perform determining whether underflow exists further comprise instructions for causing the processor to perform determining whether early underflow detection is enabled.

12. A floating point unit for underflow detection, comprising circuitry to:

determine a non-normalized result of a first fused multiply-add (FMA) operation based on a first input, a second input, and a third input;

determine whether underflow exists in the non-normalized result based on a first exponent of the first input, a second exponent of the second input, and a third exponent of the third input;

determine an unrounded normalized result and an unrounded result bypass extension based on the non-normalized result; and route the unrounded normalized result and the unrounded result bypass extension via a bypass path to the floating point unit for a second FMA operation to be performed by the floating point unit.

13. The floating point unit of claim 12, wherein the first FMA operation includes a subtraction operation.

14. The floating point unit of claim 12, wherein the first FMA operation includes an addition operation, the addition operation including a subtraction.

15. The floating point unit of claim 12, wherein the circuitry to determine whether underflow exists in the non-normalized result includes circuitry to:

determine whether positive underflow exists in the non-normalized result; and determine whether negative underflow exists in the non-normalized result.

16. The floating point unit of claim 12, wherein the circuitry to determine whether underflow exists includes circuitry to determine whether early underflow detection is enabled.

17. The floating point unit of claim 12, wherein the circuitry to determine the unrounded normalized result and the unrounded result bypass extension includes circuitry to determine whether rounder bypass is enabled.

* * * * *